United States Patent
Himoto et al.

(12) 
(10) Patent No.: US 6,478,679 B1
(45) Date of Patent: Nov. 12, 2002

(54) MEMORY DEVICE, CONTROLLER AND ELECTRONIC DEVICE

(75) Inventors: Atsunori Himoto; Kenji Tosaki; Madoka Nakayama; Miyuki Yasuoka; Koji Tsuchiya, all of Tokyo (JP)

(73) Assignee: Sega Enterprises, Ltd. (JP)

(*) Notice: Subject to any disclaimer, the term of this patent is extended or adjusted under 35 U.S.C. 154(b) by 0 days.

(21) Appl. No.: 09/269,973

(22) PCT Filed: May 12, 1998

(86) PCT No.: PCT/JP98/02097
§ 371 (c)(1),
(2), (4) Date: Jul. 21, 1999

(87) PCT Pub. No.: WO99/08231
PCT Pub. Date: Feb. 18, 1999

(30) Foreign Application Priority Data

Aug. 8, 1997 (JP) .............................................. 9-214322
Sep. 1, 1997 (JP) .............................................. 9-235875
Mar. 6, 1998 (JP) .......................................... 10-054814

(51) Int. Cl.[7] ................................................ A63F 13/02
(52) U.S. Cl. ............................. 463/36; 463/37; 463/43; 463/46
(58) Field of Search ................................ 463/36, 38, 7, 463/43, 44, 47, 37, 46; 273/148 B

(56) References Cited

U.S. PATENT DOCUMENTS 5,394,168 A * 2/1995 Smith, III et al. .......... 345/156
5,759,100 A * 6/1998 Nakanishi ..................... 463/37
5,903,257 A * 5/1999 Nishiumi et al. ............ 345/157
6,001,015 A * 12/1999 Nishiumi et al. ............. 463/38
6,007,428 A * 12/1999 Nishiumi et al. ............. 463/36
6,022,274 A * 2/2000 Takeda et al. ................ 463/44
6,132,315 A * 10/2000 Miyamoto et al. ........... 463/43

FOREIGN PATENT DOCUMENTS

| JP | 62-288991 | 12/1987 |
|---|---|---|
| JP | 3-278994 | 12/1991 |
| JP | 5-25557 | 4/1993 |
| JP | 6-259615 | 9/1994 |
| JP | 8-161438 | 6/1996 |
| JP | 9-056927 | 3/1997 |
| JP | 30-43705 | 9/1997 |

* cited by examiner

Primary Examiner—Joe H. Cheng
Assistant Examiner—Kathleen M. Christman
(74) Attorney, Agent, or Firm—Dickstein Shapiro Morin & Oshinksy LLP

(57) ABSTRACT

A memory device has a small-sized LCD disposed on an upper part of the front side of a case, and operation buttons disposed below the LCD. An external connection terminal for connecting a game apparatus or others to an outside apparatus is disposed in the lower side of the case nearer the front side thereof. A controller has a card slot for the memory device to be loaded in, which is provided in an upper part of an operation side thereof. The card slot has a window opened so as to expose a required part of the memory device when the memory device is loaded in the controller. With the memory device loaded in the controller a game player operates the operation buttons while watching the LCD of the memory device.

21 Claims, 44 Drawing Sheets

FIG. 2A
FIG. 2B
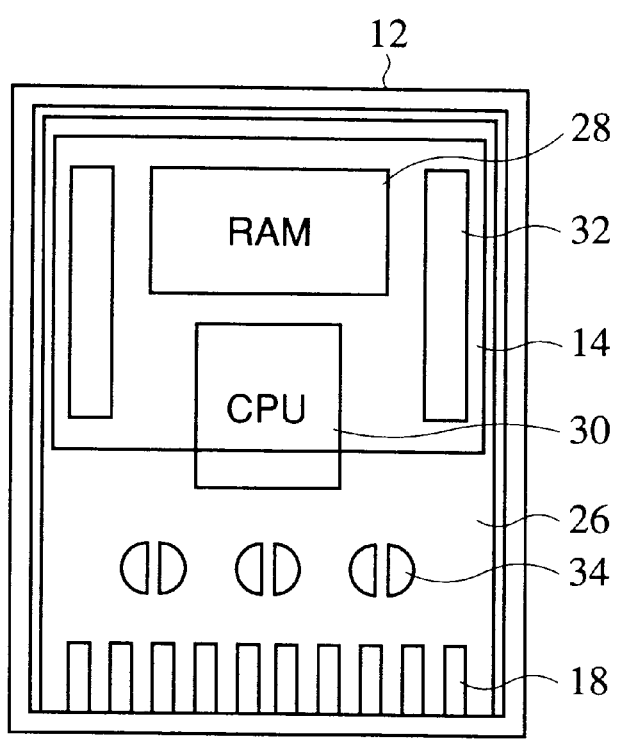
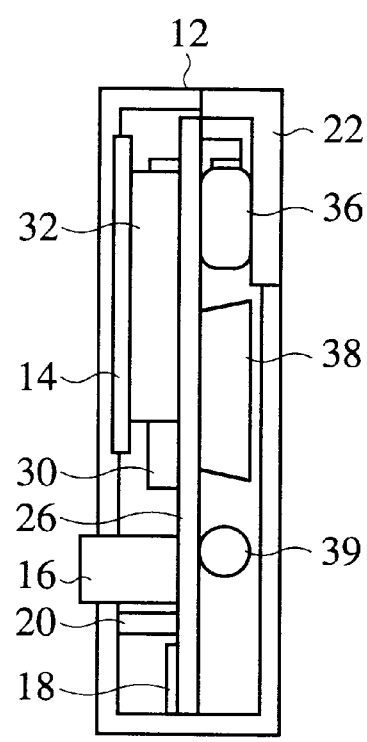

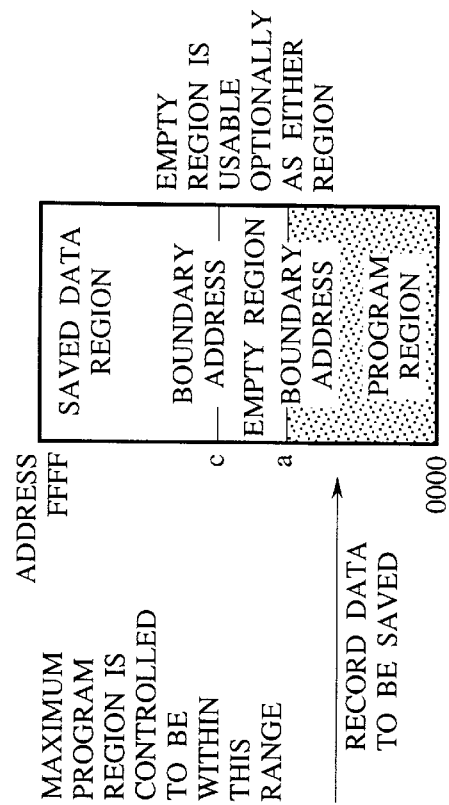
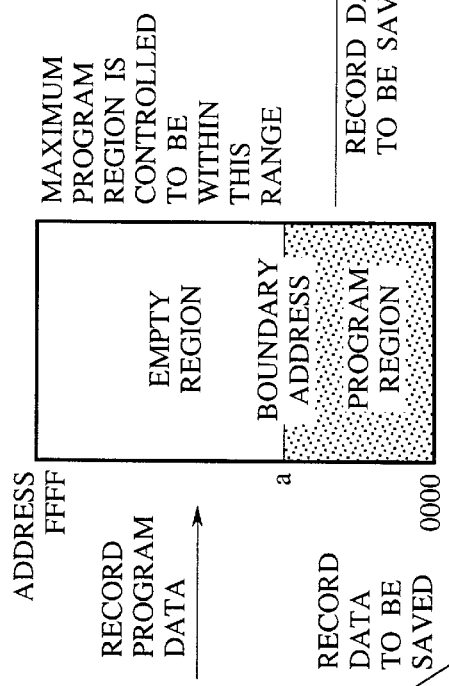
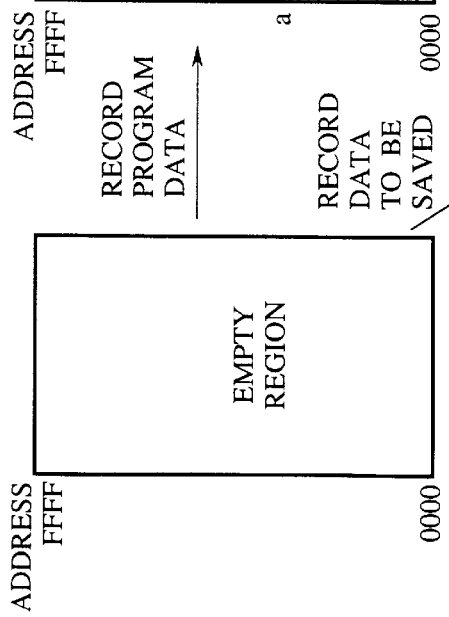
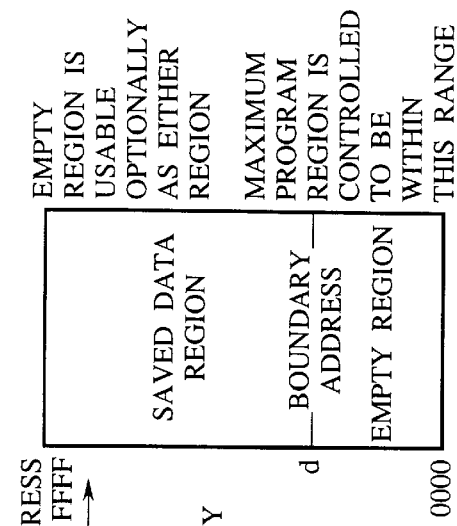
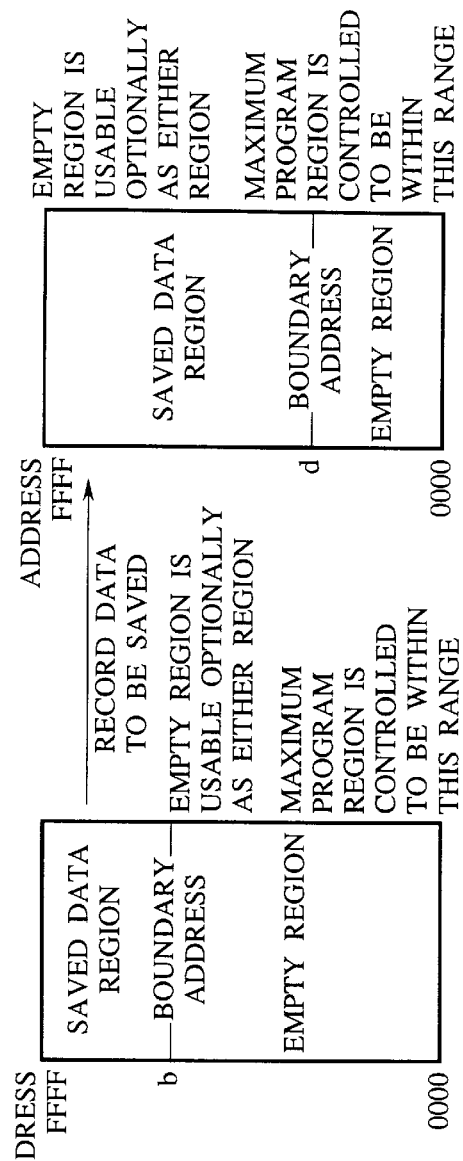

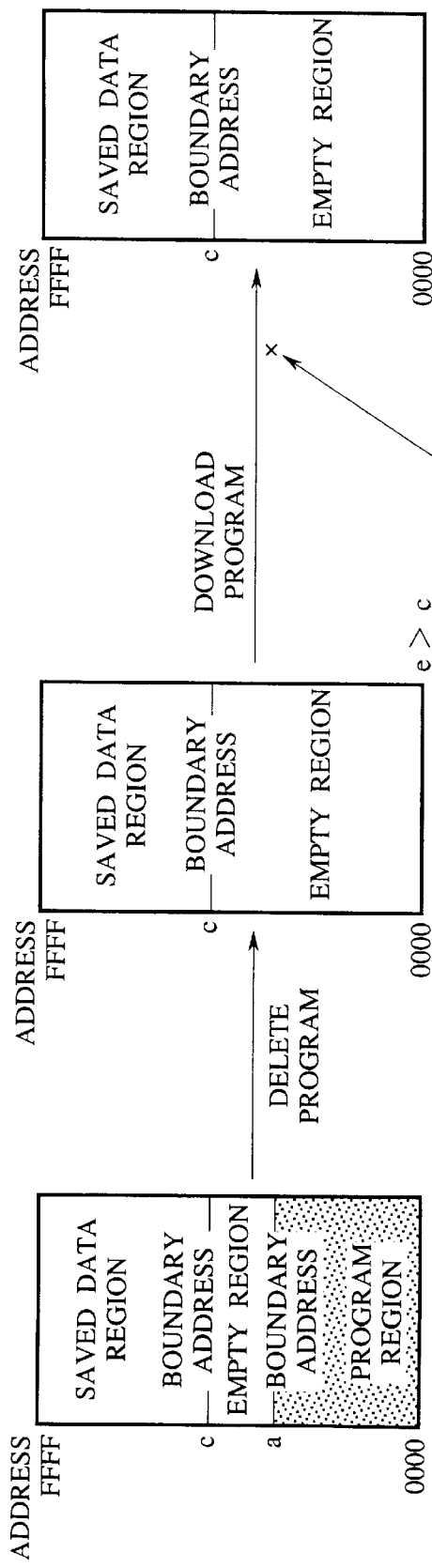

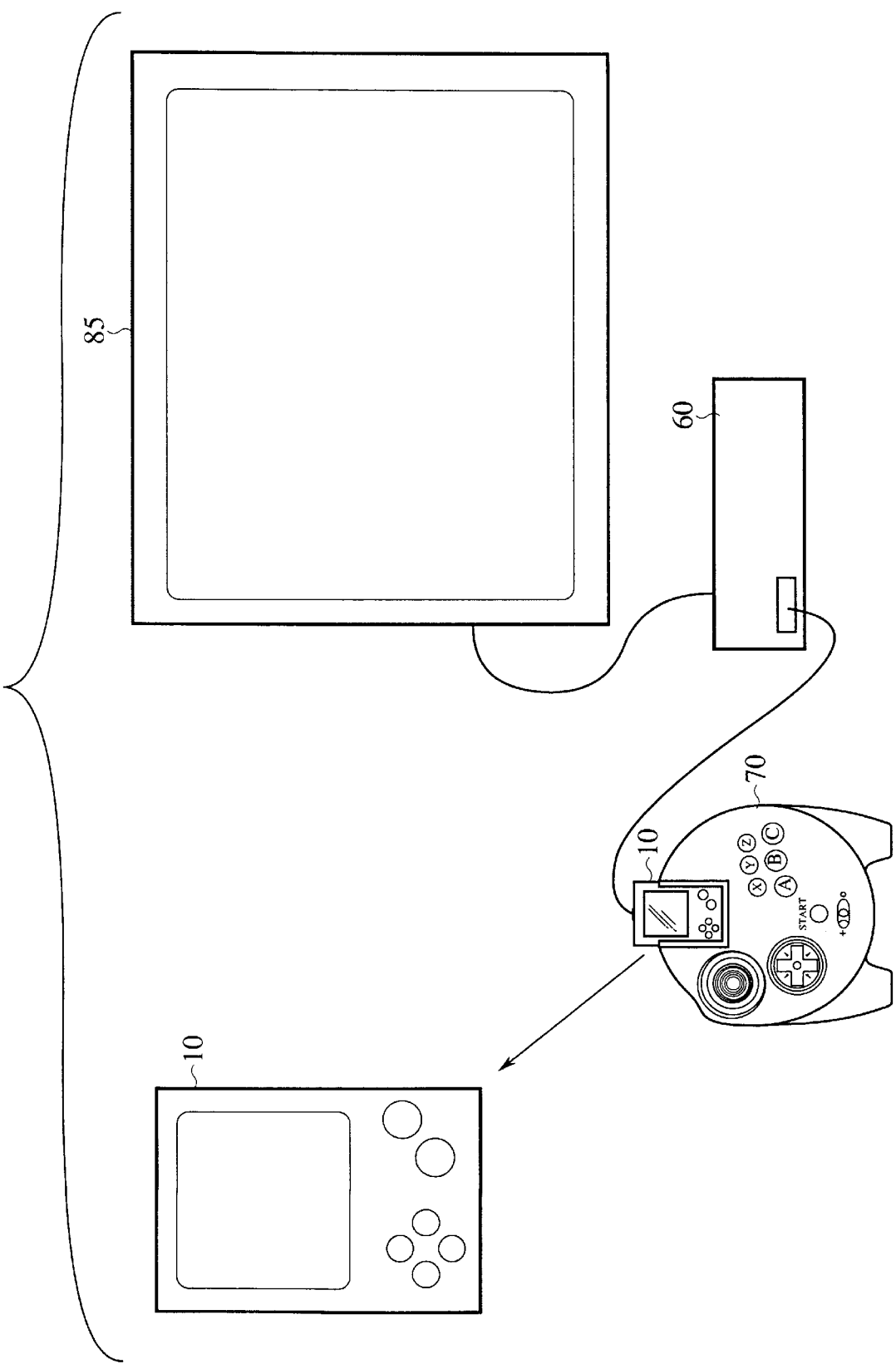

MEMORY DEVICE, CONTROLLER AND ELECTRONIC DEVICE

TECHNICAL FIELD

The present invention relates to a memory device including a memory for storing information in a case and connection terminals for inputting and outputting the information provided on one end of the case, a controller, and an electronic device.

BACKGROUND ART

Domestic game apparatuses are very popular as an amusement as various interesting games have been recently developed. As the contents of the games become sophisticated, memory cards for temporarily storing game progress information of respective game players, game setting information, etc. are increasingly demanded. Some game apparatuses have backup memories built in. However, the backup memories usually have small capacities, and separate memory cards are required for sophisticated games. The memory cards are used inserted in connectors for memories of the game apparatus bodies.

The conventional memory cards are mounted on the game apparatus bodies as described above to back up game data. To back up game data is only one function the conventional memory cards have.

Some players own a plurality of memory cards to back up game data of a plurality of games. However, when they own a plurality of memory cards, they are often at a loss to locate the memory cards storing game data they require. All that they can do is confirm stored contents is to load the memory cards in game apparatuses for the confirmation.

On the other hand, as storage mediums storing game programs having larger capacities, the games themselves have larger scales and take too a long time to be completed, which results in a disadvantage that the game players are contrarily bored. As a countermeasure to this disadvantage, storage mediums of large capacities are used so that one game contains various games which can be played for relatively short periods of time. For example, a game which is a main game contains smaller sub-games, or a plurality of games make up a main game.

The inventors of the present application halve obtained an idea that functions of a conventional memory card are expanded to enable execution of smaller games, and various sub-games are played by using the memory card, whereby an innovational interesting game system which has not been available can be realized.

An object of the present invention is to provide a memory device having functions of a conventional memory device expanded.

Another object of the present invention is to provide a memory device which allows the stored information to be confirmed.

A further another object of the present invention is to provide an electronic device using the memory device having the functions expanded.

A further another object of the present invention is to provide an innovational game system using the memory device having the functions expanded.

DISCLOSURE OF THE INVENTION

The above-described object is achieved by a memory device including a case, a memory disposed in the case and storing information, and a connection terminal disposed on one end of the case and inputting/outputting information, comprising: a display disposed on one side of the case and displaying information; and a memory device disposed on one side of the case and including operation buttons to be operated by an operator.

In the above-described memory device it is possible that the memory stores backup data and/or a program.

In the above-described memory device it is possible that one of the backup data and the program is stored first in an upper address of the memory toward an lower address, and the other of the backup data and the program is stored first in lower address of the memory toward an upper address.

In the above-described memory device it is possible that contents stored in the memory are displayed on the display unit.

In the above-described memory device it is possible that the operation buttons are operated to designate a contents stored in the memory to erase the content or to protect the content from writing.

In the above-described memory device it is possible that the memory stores a first program to be executed when the memory device is singly operated, and a second program to be executed when the memory device is connected, the first program is executed when the connection terminal is not connected to an outside apparatus, and the second program is executed when the connection terminal is connected to an outside apparatus.

The above-described object is achieved by a game system including a game apparatus body, display device connected to the game apparatus body, and a controller connected to the game apparatus body, the game system comprising the above-described memory device being loaded in the loading portion of the controller, and a game display which is different from that displayed on the display means being displayed on the display of the memory device.

In the above-described game system it is possible that a plurality of the controllers are connected to the game apparatus body, the memory device is connected to the respective controllers, and game displays which are different from each other between the displays of the memory devices are displayed on the displays.

The above-described object is achieved by a game system including a game apparatus body, display means connected to the game apparatus body, and a controller connected to the game apparatus body, the above-described memory device being loaded in a loading portion of the controller, data or a program being transferred from the game apparatus body to the memory device.

The above-described object is achieved by a game system including a game apparatus body, display means connected to the game apparatus body, and a controller connected to the game apparatus body, the above-described memory device being loaded in a loading portion of the controller, and data or a program being transferred from the memory device to the game apparatus body.

In the above-described memory device it is possible that the connection terminal has a first male connection terminal and a second female connection terminal.

The above-described object is achieved by a game system including the above-described two memory devices, wherein the first connection terminal of one of the two memory devices being connected to the second connection terminal of the other of the two memory devices, and the second connection terminal of the one of the two memory devices being connected to the first connection terminal of the other of the two memory devices, whereby the one of the two memory devices is connected directly to the other of the two memory devices.

The above-described object is achieved by a memory device comprising: a case; a memory disposed in the case and storing information; a connection terminal disposed on one end of the case, and inputting/outputting the information; a display disposed on one side of the case, and displaying the information; and a save key inputting information through the connection terminal to save the information in the memory.

The above-described object is achieved by a memory device comprising: a case; a memory disposed on one end of the case and inputting/outputting through a connection terminal; a display disposed on one side of the case and displaying information; and a selection key selecting arbitrary one of a plurality of information.

The above-described object is achieved by a memory device comprising: a case; a memory disposed in the case, and storing information; a connection terminal disposed on one side of the case, and inputting/outputting information; a display unit disposed on one side of the case, and displaying information; a selection key selecting arbitrary information out of a plurality of information; and a save key inputting information through the connection terminal, and saving the information in the memory.

The above-described object is achieved by a controller including a prescribed operation key, and outputting a prescribed command signal to an electronic device, comprising: a loading portion for the above-described memory device to be loaded in.

The above-described object is achieved by a controller comprising: a loading portion for the above-described memory device to be loaded in; and a selection key selecting arbitrary one of a plurality of information, a required command signal being outputted to an electronic device.

The above-described object is achieved by a controller comprising: a loading portion for the above-described memory device to be loaded in; and a save key inputting information through the connection terminal and saving the information in the memory, a required command signal being outputted to an electronic device.

The above-described object is achieved by a controller comprising: a loading portion for the above-described memory device to be loaded in; and a selection key selecting arbitrary one of a plurality of information; and a save key inputting information through the connection terminal and saving the information in the memory, a required command signal being outputted to an electronic device.

The above-described object is achieved by a controller comprising: a loading portion for a memory device including a case, a memory disposed in the case and storing information, a connection terminal disposed on one end of the case and inputting/outputting information, and a display disposed on one side of the case and displaying information; a selection key selecting arbitrary one of a plurality of information; and a save key inputting information through the connection terminal and saving the information in the memory, a required command signal being outputted to an electronic device.

The above-described object is achieved by an electronic device connected to a controller outputting a required command signal, comprising: a loading portion for the above-described memory device to be loaded in.

The above-described object is achieved by an electronic device connected to a controller outputting a required command signal, comprising: a loading portion for the above-described memory device to be loaded in; and the controller including a selection key selecting arbitrary one of a plurality of information.

The above-described object is achieved by an electronic device connected to a controller outputting a required command signal, comprising: a loading portion for the above-described memory device to be loaded in; and the controller including a save key inputting information through the connection terminal and saving the information in the memory.

The above-described object is achieved by an electronic device connected to a controller outputting a required command signal, comprising: a loading portion for the above-described memory device, and selection means selecting arbitrary one of a plurality of information.

The above-described object is achieved by an electronic device connected to a controller outputting a required command signal, comprising: a loading portion for the above-described memory device to be loaded in; and save means inputting information through the connection terminal and saving the information.

The above-described object is achieved by an electronic device connected to a controller outputting a required command signal, comprising: selecting means selecting arbitrary one of a plurality of information; and saving means inputting information through the connection terminal and saving the information in the memory.

The above-described object is achieved by an electronic device connected to a controller outputting a required command signal, comprising: a loading portion for a memory device to be loaded in, the memory device including a case, a memory disposed in the case and storing information, a connection terminal disposed on one end of the case and inputting/outputting information, and a display disposed on one side of the case and displaying information; selecting means selecting arbitrary one of a plurality of information; and saving means inputting information through the connection terminal and saving the information in the memory.

The above-described object is achieved by an electronic device connected to a controller outputting a required command signal, the controller including: a loading portion for the above-described memory device, the electronic device including: selecting means selecting arbitrary one of a plurality of information.

The above-described object is achieved by an electronic device connected to a controller outputting a required command signal, the controller including: a loading portion for the above-described memory device, the electronic device including: saving means inputting information through the connection terminal and saving the information in the memory.

The above-described object is achieved by an electronic device connected to a controller outputting a required command signal, the controller including: a loading portion for the above-described memory device, the electronic device including: selecting means selecting arbitrary one of a plurality of information; and saving means inputting information through the connection terminal and saving the information in the memory.

The above-described object is achieved by an electronic device connected to a controller outputting a required command signal, the controller including: a loading portion for a memory device to be loaded in, the memory device including a case, a memory disposed in the case and storing information, a connection terminal disposed on one end of the case and inputting/outputting information, and a display disposed on one side of the case and displaying information, the electronic device including: selecting means selecting arbitrary one of a plurality of information, and saving means inputting information through the connection terminal and saving the information in the memory.

In the above-described electronic device it is possible that the selecting means selecting information, based on a development scene of a program.

In the above-described electronic device it is possible that the information selected based on a development scene of the program is a game program.

In the above-described electronic device it is possible that the saving means detects loading of the memory in the loading portion and starts.

In the above-described electronic device it is possible that the saving means detects connection of the memory to the loading portion of the controller and starts.

In the above-described electronic device it is possible that the saving means detects connection of the controller to the electronic device and starts.

The above-described object is achieved by a game playing method for playing a main game which has a plurality of scenes and advances said plurality of scenes in a prescribed sequence, a subgame being selected based on an advanced one of said a plurality of scenes, and being saved in a memory device loaded in a game apparatus body, and the subgame being played on the memory device.

The above-described object is achieved by a memory device comprising: a case; memory disposed in the case and storing information; a display disposed on one side of the case and displaying information; an operation button disposed on one side with respect to the display on said one side of the case and operated by an operator; and a connection terminal disposed on the other side with respect to the display on said one side of the case and inputting/outputting information.

The above-described object is achieved by a controller including a required key and outputting required command signal to an electronic device, comprising: a loading portion for a memory device to be loaded in, and having a window therein; and a required region of the memory device being exposed in the window when the memory device is loaded in the loading portion.

In the above-described object it is possible that the controller further comprises an additional loading portion for the memory device to be loaded in.

In a memory device connected to the above-described controller it is possible that the memory device comprises: a display displaying information, the display being disposed at a position where the display is exposed in the window when the memory device is loaded in the loading portion of the controller.

In a memory device connected to the above-described controller it is possible that the memory device comprises: a memorandum portion on which a memorandum can be written down; the memorandum portion is disposed at a position where the memorandum portion is exposed in the window when the memory device is loaded in the loading portion of the controller.

In a memory device connected to the above-described controller it is possible that the memory device comprises: an operation button operated by an operator, the operation button being disposed at a position where the operation button is exposed in the window when the memory device is loaded in the loading portion of the controller.

In a memory device connected to the above-described controller it is possible that the memory device comprises: a microphone inputting sounds, the microphone being exposed at a position where the microphone is exposed in the window when the memory device is loaded in the loading portion of the controller.

The above-described object is achieved by a game system including the above-described two memory devices, the connection terminal of one of the two memory devices being connected to the connection terminal of the other of the two memory devices, whereby the two memory devices are connected directly to each other with the displays of the two memory devices located near each other, and the operation buttons of the two memory devices being operable on the opposed sides.

The above-described object is achieved by a memory device comprising: a case; a memory disposed in the case and storing information; a display disposed on one side of the case and displaying information; an operation button disposed on one side of the case and displaying information; and a photo-information inputting/outputting unit disposed on one end of the case and inputting/outputting information by the use of light.

In the above-described memory device it is possible that the photo-information inputting/outputting unit includes a light emitting unit emitting light and a light detecting unit detecting light; the light emitting unit is disposed so as to be opposed to the light detecting unit of the photo-information inputting/outputting unit of another memory device, and the light detecting unit is disposed so as to be opposed to the light emitting unit of the photo-information inputting/outputting unit of said another memory device.

In the above-described memory device it is possible that the light detecting unit of the photo-information inputting/outputting unit transforms detected light to electric energy to supply electric power.

The above-described object is achieved by a game system including the above-described two memory devices, wherein the light emitting unit of the photo-information inputting/outputting unit of one of the two memory devices is opposed to the light detecting unit of the photo-information inputting/outputting unit of the other of the two memory device, and the light detecting unit of the photo-information inputting/outputting unit of the one of the two memory devices is opposed to the light emitting unit of the photo-information inputting/outputting unit of the other of the two memory devices, whereby the two memory devices are coupled to each other.

BRIEF DESCRIPTION OF THE DRAWINGS

FIG. 2 is views of the memory card according to the first embodiment of the present invention, which show an internal structure thereof.

FIG. 5 is views explaining co-use of a nonvolatile RAM of the memory card according to the first embodiment of the present invention (Part 1).

FIG. 6 is views explaining co-use of a nonvolatile RAM of the memory card according to the first embodiment of the present invention (Part 1).

FIG. 24 is a view of the memory card according to a fourth embodiment of the present invention loaded in a controller.

BEST MODES OF PRACTICING THE INVENTION

A First Embodiment

Figure 3:
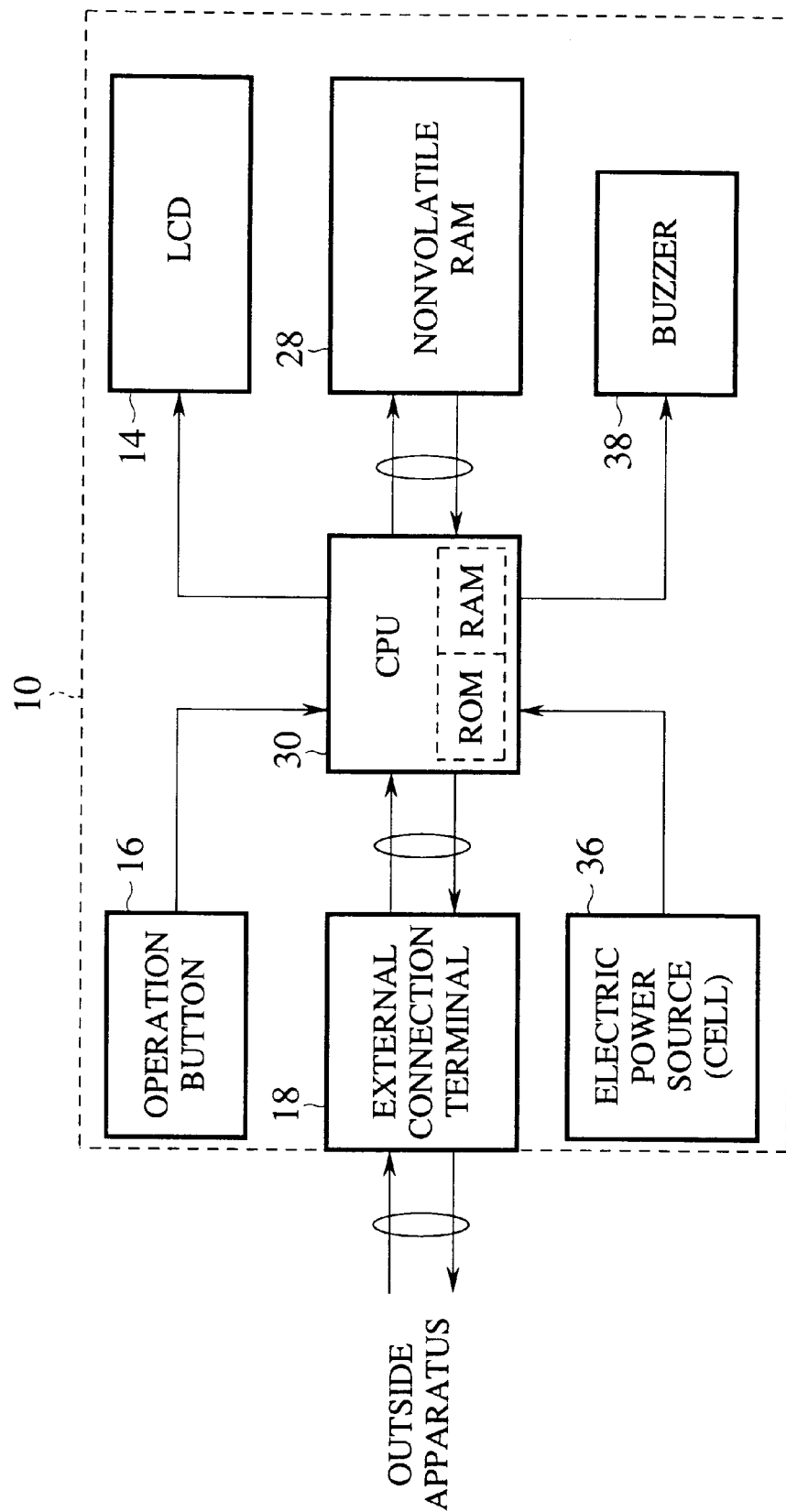
FIG. 3 is a block diagram of the memory card according to the first embodiment of the present invention.

The memory card according to a first embodiment of the present invention will be explained with reference to FIGS. 1 to 6. FIG. 1 is views of the six sides of the memory card according to the present embodiment, which show an appearance of the memory card, FIG. 2 is views of the memory card according to the present embodiment, which show an interior structure of the memory card, and FIG. 3 is a block diagram of the memory card according to the present embodiment.

Figure 1E:
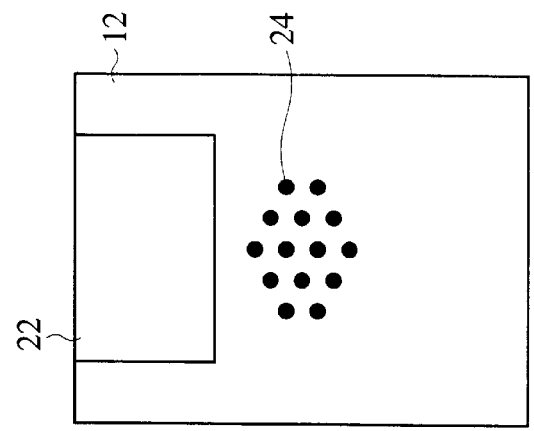
FIG. 1 is six side views of the memory card according to a first embodiment of the present invention, which show an appearance of the memory card.
Figure 1D:
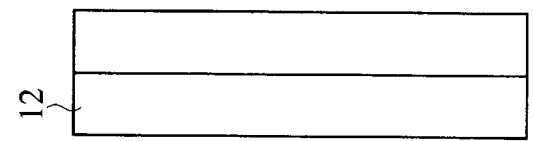
Figure 1A:
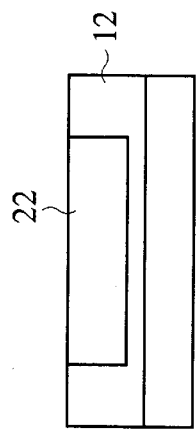
Figure 1B:
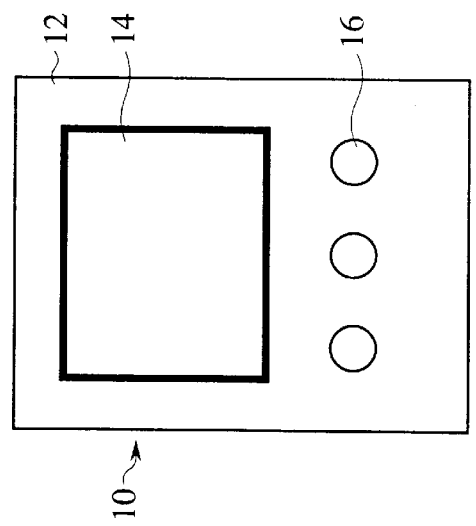
Figure 1C:
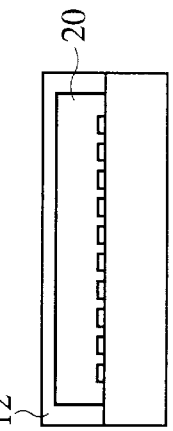

As shown in FIG. 1, the memory card 10 according to the present embodiment includes a small-sized LCD (Liquid crystal display) 14 disposed on an upper part of the front side of a case 12, and operational buttons 16 below the LCD 14 (FIG. 1B). An external connection terminal 18 for connection with outside apparatuses, such as a game apparatus, etc. are provided on a side contiguous to the lower end of the front side of the case 12, and a shutter 20 for protecting the interior circuit from outside dust, etc. is provided inner of the external connection terminal 18 (FIG. 1C). A battery accommodation space 22 is provided in the back side of the case 12 at an upper part thereof, and sound holes 24 for a buzzer which will be described later are formed in the back side of the case 12 below the battery accommodation space 22 (FIG. 1E).

The memory card 10 has the interior structure shown in FIG. 2. In the case 12 there is disposed a PCB substrate 26 mounting various electronic components. A nonvolatile RAM 28 for storing information, and a CPU 30 for the general control are mounted on the front side of the PCB substrate 26. A pair of electrically conducting rubbers 32 are mounted on the PCB substrate, opposed to each other across the nonvolatile RAM 28 and the CPU 40, and an LCD 14 is mounted on the electrically conducting rubbers 14. Button contacts 34 for the operational buttons 16 are mounted on the front side of the PCB substrate 26 below the CPU 30. The external connection terminal 18 are formed on the PCBC substrate 26 below the button contacts 34.

A battery 36 which is an electric power source of the memory card 10 is mounted on the back side of the PCB substrate 26. A buzzer 38 is mounted on the PCB substrate 26 below the battery 36, and a crystal oscillator 39 is mounted on the PCB substrate 26 below the buzzer 38.

A block diagram of the memory card 10 is shown in FIG. 3. The operational buttons 16, the LCD 14, the external connection terminal 18, the nonvolatile RAM 28, the battery 36 and the buzzer 38 are connected to the CPU 30 for the general control. The CPU 30 incorporates a ROM and a RAM. Outside apparatuses (not shown) are connected to the external connection terminal 18.

The CPU 30 performs the general control of the memory card 10. The ROM built in the CPU 30 stores a basic control program, and the RAM built in the CPU 30 functions as a temporary memory for executing a program. The nonvolatile RAM 28 is a memory for storing backup data to be stored but stores the execution program, etc. in a part or all thereof as required.

(Program Structure of the Memory Card)

Figure 4:
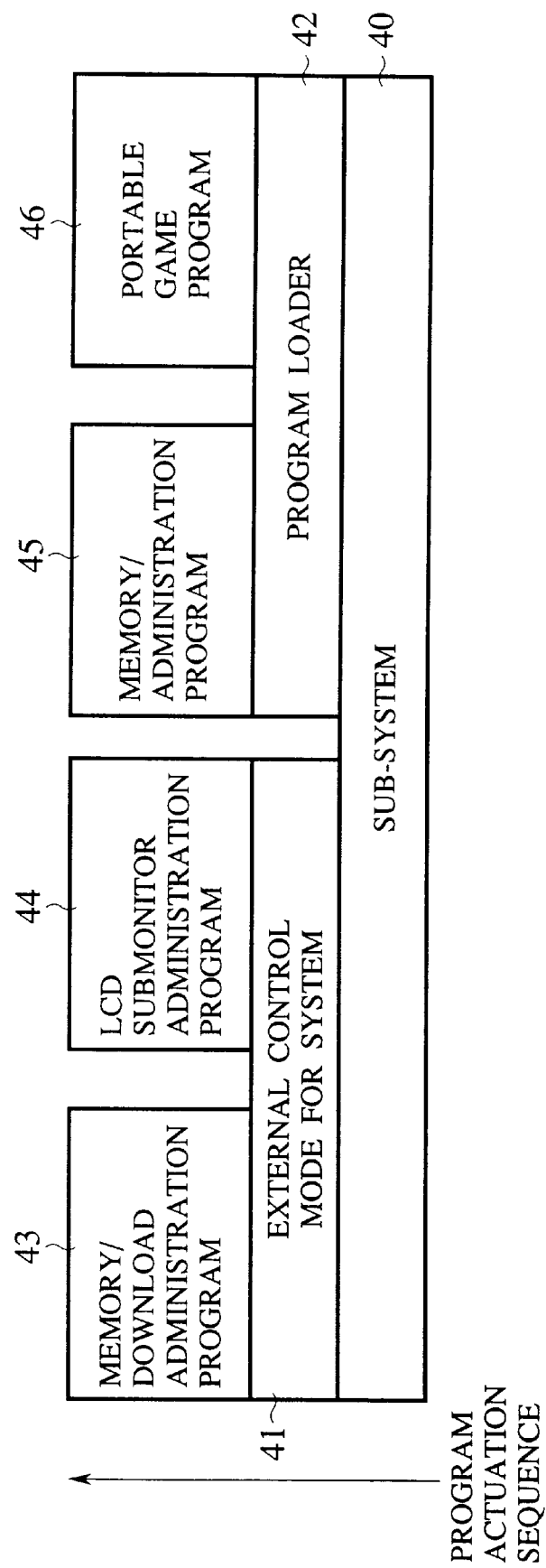
FIG. 4 is a view of a program structure of the memory card according to the first embodiment of the present invention.

A program structure of the memory card according to the present embodiment is shown in FIG. 4. In FIG. 4 programs are shown in modules arranged in a sequence which is started upper from the bottom.

A basic program which is started first of all is a SUB-SYSTEM 40. The SUB-SYSTEM 40 is a program for controlling connection of the programs with an outside apparatus, and controls all the programs. A SYSTEM 41 for the external control mode, and a program LOADER 42 are upper of the SUB-SYSTEM 40. The SUB-SYSTEM 40 starts the SYSTEM 41 for the external control mode or the program LOADER 42, depending on a connection of the external connection terminal 18.

The SYSTEM 41 for the external control mode communicates with a game apparatus, which is an outside apparatus, and reads an upper program and changes over the program. When the external connection terminal 18 is connected to the outside apparatus, the SUB-SYSTEM 40 actuates the SYSTEM 41 for the external control mode.

Upper of the SYSTEM 41 for the external control are a memory/download administration program 43 and a LCD submonitor administration program 44. The SYSTEM 41 for the external control actuates, as required, the memory/download administration program 43 or the LCD submonitor administration program 44.

A program LOADER 42 is for reading upper programs for change-over by the button operation. When the external connection terminal 18 is not connected to an outside apparatus, the SUB-SYSTEM 40 actuates the program LOADER 42.

A memory administration program 45 and a portable game program 46 are upper of the program LOADER 42. The program LOADER 42 actuates, as required the memory administration program 45 or the portable game program 46.

(The Memory Card Connected to an Outside Apparatus)

An operation of the memory card 10 connected to an outside apparatus will be explained.

When the memory card 10 is connected to an outside apparatus, the outside apparatus controls the memory card 10. The electronic source is supplied by the external connection terminal 18, and the battery 36 is not used. The SUB-SYSTEM 40 actuates the SYSTEM 42 for the external control, based on a connection state of the external connection terminal 18. The SYSTEM 41 for the external control actuates, as required, the memory/download administration program 43 or the LCD submonitor administration program 44.

Data inputted by the outside apparatus is analyzed by the SYSTEM 41 for the external control to judge whether the data is for controlling the LCD 14 or for controlling the nonvolatile RAM 28, and based on an analysis result, the LCD sub administration program 44 or the memory/download administration program 43 is actuated.

In controlling the LCD 14 display of the LCD 14 is controlled, and contents corresponding to the data inputted to the outside apparatus are displayed on the LCD 14.

In controlling the nonvolatile RAM 28 the data inputted by the outside apparatus is written in or read from the nonvolatile RAM 28.

In writing in the memory card 10 the data from the outside apparatus the data is inputted to the CPU 30 via the outside connection terminal 18. The CPU 30 converts the data in accordance with the program stored in the built-in RAM and written in the nonvolatile RAM 28. The nonvolatile RAM 28 stores and retains the converted data.

In reading the data stored in the nonvolatile RAM 28 a read command is outputted from the outside apparatus to the memory card 10. The CPU 30 reads the data from the nonvolatile RAM 28 in accordance with the read command, and converts and outputs the data to the outside apparatus via the external connection terminal 18.

(Memory Card Singly Used)

An operation of the memory card 10 disconnected to the outside apparatus and singly used will be explained. An electric power source is the battery 36. The SUB-system 40 actuates the program LOADER 42, based on a connection state of the external connection terminal 18. The program LOADER 42 actuates the memory administration program 45 or the portable game program 46 as required. For example, by the operation of the operation buttons 16 the memory mode or the game mode is changed over to the other. In the memory mode the memory administration program 45 is actuated, and the portable game program 46 is actuated in the game mode.

In the memory mode contents of the nonvolatile RAM 28 are processed. The stored contents are made graphic and displayed on the LCD 14 and operated by the operation buttons 16.

In the game mode a game stored in the nonvolatile RAM 28 is executed. For example, the stored portable game program 46 is executed, and the memory card 10 is singly operated by the operation of the operation buttons 16 to play the mini-game.

In the present embodiment it is possible that a part or all of a program in the nonvolatile RAM 28 is transferred to the RAM built in the CPU 30 to be executed there.

In the present embodiment the nonvolatile RAM 28 is used by the control of the CPU 30 as a region where backup data is stored or a region where a downloaded program is stored.

When no operation of the operation buttons 16 is made, the electric power source is automatically turned off for electric power saving.

(Shared Nonvolatile RAM)

A method for sharing the nonvolatile RAM 28 will be explained with reference to FIGS. 5 and 6.

When no data is stored, as shown in FIG. 5A an empty region is from address 0000 (hexadecimal notation) to address FFFF(hexadecimal notation).

When a program is stored, as shown in FIG. 5B the program is stored first in address 0000 and sequentially upward. A boundary address (address a) is determined depending on a size of the program.

Then, when preserved data is recorded, as shown in FIG. 5C the preserved data is recorded first in address FFFF and sequentially downward. A boundary address (address c) is determined depending on a size of the preserved data.

On the other hand, when preserved data is recorded in the nonvolatile RAM 28 in the state of FIG. 5A, as shown in FIG. 5D the preserved data is recorded first in address FFFF and sequentially downward. A boundary address (address b) is determined depending on a size of the preserved data.

Then, when additional preserved data is recorded, as shown in FIG. 5E the additional preserved data is recorded downward next to the previously recorded data. A boundary address (address d) is determined depending on a size of the additional preserved data.

When the program is erased from the nonvolatile RAM 28 in the state of FIG. 6C (FIG. 5C), as shown in FIG. 6C an empty region is from address 0000 to address a, and a boundary address is address d.

Then, when a program of a size of address 0000 to address e as shown in FIG. 6C is downloaded, with address e<address c the program can be recorded in the nonvolatile RAM 28, but with address e>address c a capacity of the nonvolatile RAM 28 is insufficient, and the program is not downloaded. The nonvolatile RAM 28 has a state of FIG. 6D.

As described above, a program is recorded in the nonvoltalite RAM 28 in the region from address 0000 upward, and preserved data is recorded in the region from address FFFF downward. Both regions are set by the respective boundary addresses uninvasively to each other, so that a program and data are never erased.

It is possible that oppositely a program is recorded in the nonvolatile RAM 28 in the region from address FFFF downward, and preserved data is recorded from address 0000 upward.

The nonvolatile RAM 28 storing information, such as game data, etc. can be a memory, such as a flash memory, battery backup memory, etc., which can retain stored contents.

As described above, according to the present embodiment, the memory card, which includes the LCD and the operation buttons, can display stored contents by itself and can be operated by the use of the operation buttons. The memory card can be used in the same was as a small-sized portable game apparatus. Furthermore, according to the present embodiment, the memory card, which includes the external connection terminals, can be connected to a game apparatus body, a controller or others, whereby an innovational game system which will be described later can be realized.

A Second Embodiment

Figure 7:
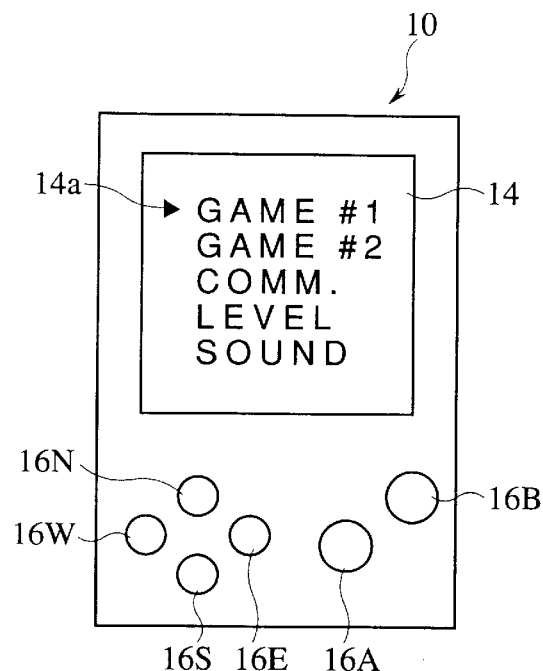
FIG. 7 is a view of the memory card according to a second embodiment of the present invention, which shows an appearance thereof.

The memory card according to a second embodiment of the present invention will be explained with reference to FIGS. 7 to 18. FIGS. 7 and 8 are appearance views of the memory card according to the present embodiment. FIG. 9 is views of the memory card according to the present embodiment, which show an internal structure thereof. The same or similar members of the present embodiment as or to those of the memory card according to the above-described first embodiment are represented by the same reference numbers not to repeat or to simplify their explanation.

As shown in FIG. 7, the memory card 10 according to the present embodiment includes a small-sized LCD (Liquid Crystal Display) on an upper part of front side of a case 12, and operation buttons 16 on the front side below the LCD 14. The operation buttons 16 include direction buttons 16N, 16S, 16E, 16W, a decision button 16A and a cancel button 16B. The rest constitution is the same as that of the first embodiment.

The operation buttons 16 are effective when the memory card 10 is singly used. The memory card with the electric source power off is turned on by pressing the decision button 16A. It is possible that a separate electric power source switch (not shown) is provided, and the electric source power is turned on and off by the use of the electric power source switch.

Figure 8A:
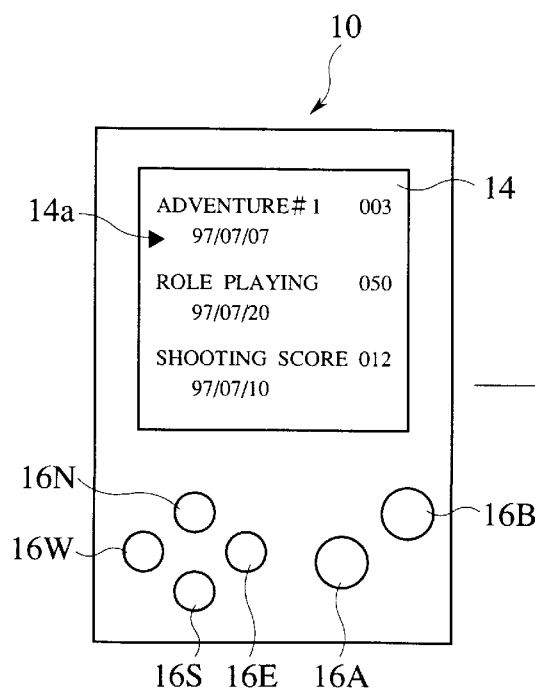
FIG. 8 is views of the memory card according to the second embodiment of the present invention, which show an appearance thereof.

When the electric source power is turned on, a menu of stored data as shown in FIG. 8A is displayed on the LCD 14. An operator manipulates the direction buttons 16N, 16S, 16E, 16W to move a cursor 14a to required one of data in the menu including e.g., Adventure #1, Roll Playing, Shooting SCORE and presses the decision button 16A to decide the required data.

Figure 8B:
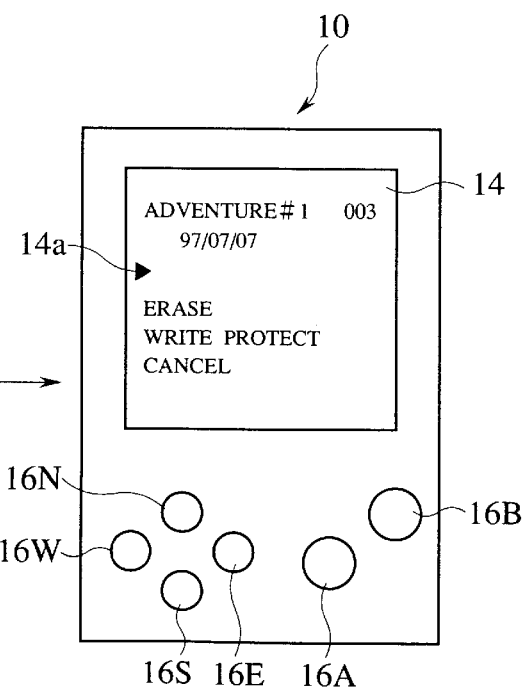

For example, when a decision is made at the position of the cursor 14a shown in FIG. 8A, and Adventure #1 is selected, a processing menu shown in FIG. 8B is displayed. For the program of Adventure #1, ERASE, WRITE PROTECT or CANCEL can be selected. Thus, the data and the program stored in the memory card 10 can be processed by the memory card alone. When ERASE is selected, and the decision button 16A is pressed, the program of Adventure #1 is erased. When WRITE PROTECT is selected, and the decision button 16A is pressed, the program of Adventure #1 cannot be rewritten or erased. When CANCEL is selected, and the decision button 16A is pressed, the selection made so far are canceled.

When a game is selected, the direction buttons 16N, 16S, 16E, 16W and the decision button 16B are given functions corresponding to a program of the game. In a race game, for example, the direction buttons 16E, 16W command advance directions, the decision button 16A commands acceleration, the erase button 16B commands brake, and the direction buttons 16N, 16S are concurrently pressed for pause.

External connection terminals 18 of the memory card 10 according to the present embodiment have the structure shown in FIG. 9. Considering that the memory card 10 is singly used, the case 12 has a shutter 50 for covering the external connection terminals 18 for the prevention of dust and wastes, electric short circuit and contact, etc.

When the memory card 10 is not connected to an outside apparatus, the shutter 50 is urged outward by a spring 52 provided inside the case 12 to be located at the outermost end of the case 12. The shutter 50 protectively locates the external connection terminals 18 inside the case 12 (FIGS. 9A to 9D).

Figure 9A:
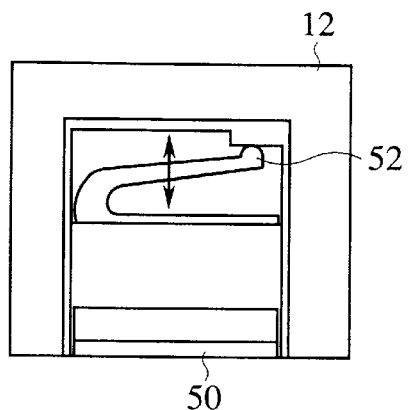
FIG. 9 is views of the memory card according to the second embodiment, which show an internal structure thereof.
Figure 9B:
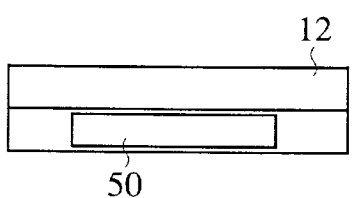
Figure 9C:
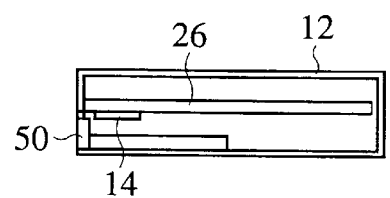
Figure 9D:
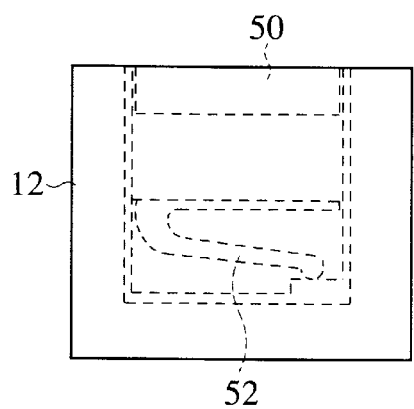
Figure 9E:
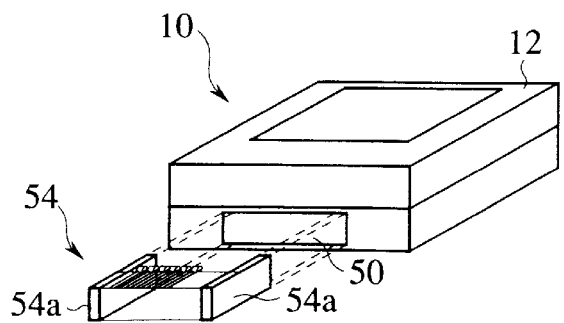
Figure 9F:
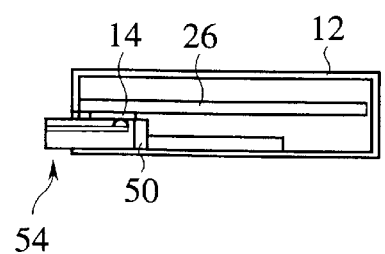

In connecting an outside apparatus to the memory card 10, when a connector 54 of the outside apparatus is inserted, the shutter 50 is pushed open by a guide pin 54 of the connector 54, and the external connection terminal 14 is exposed. The connector terminal of the connector 54 contacts the external connection terminal 14 (FIGS. 9E and 9F).

(Connection Mode of the Memory Card with an Outside Apparatus) RAM 65, an

Then, a connection mode of the memory card 10 with an outside apparatus will be explained with reference to FIGS. 10 to 14.

Figure 10:
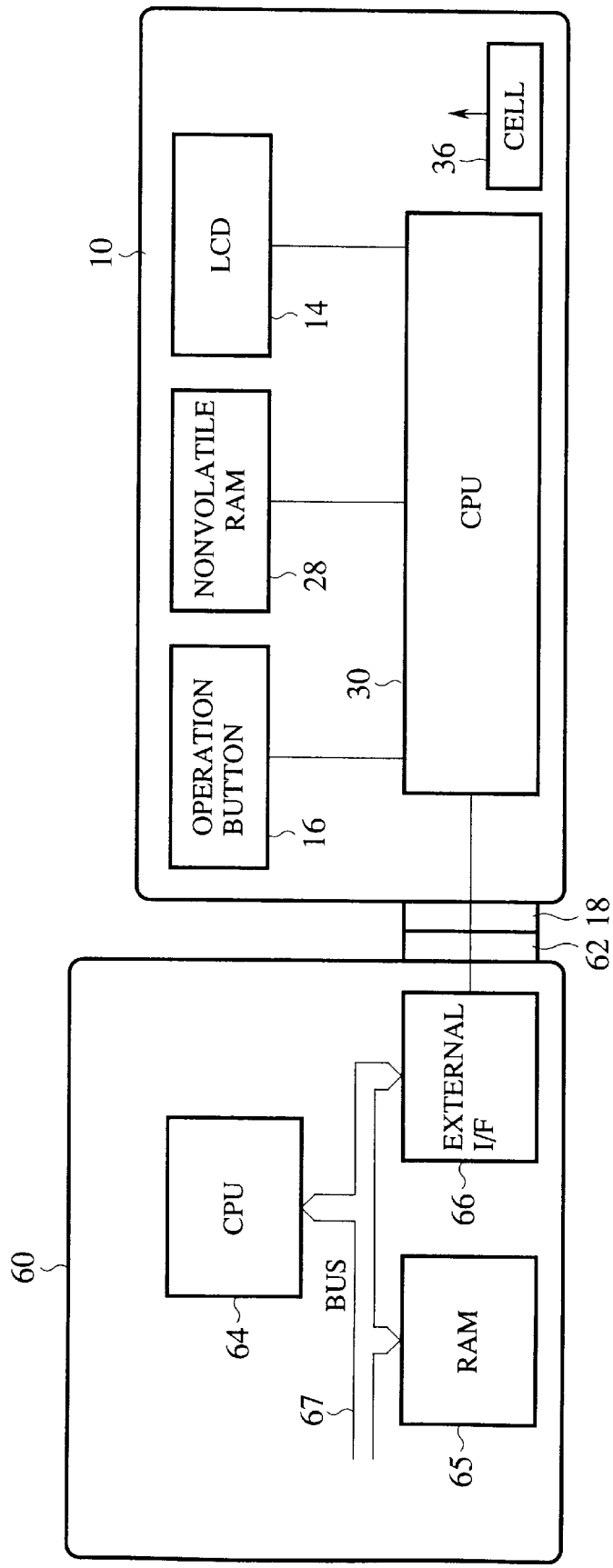
FIG. 10 is a block diagram of the memory card according to the second embodiment of the present invention.

A case that the memory card 10 is connected to a game apparatus body 10 will be explained. FIG. 10 is a block diagram of the memory card 10 connected to the game apparatus body 60.

The game apparatus body 60 has a connector 62 for the memory. The memory card 10 is connected to the connector 62 for the memory. The game apparatus body 60 has a CPU 64. The CPU 64 is connected through a bus 67 to RAM 65, an external I/F 66, etc. The external connection terminal 18 of the memory card 10 is connected to the connector 62 for the memory and is connected to the CPU 64, etc. through the bus 67.

Figure 11:
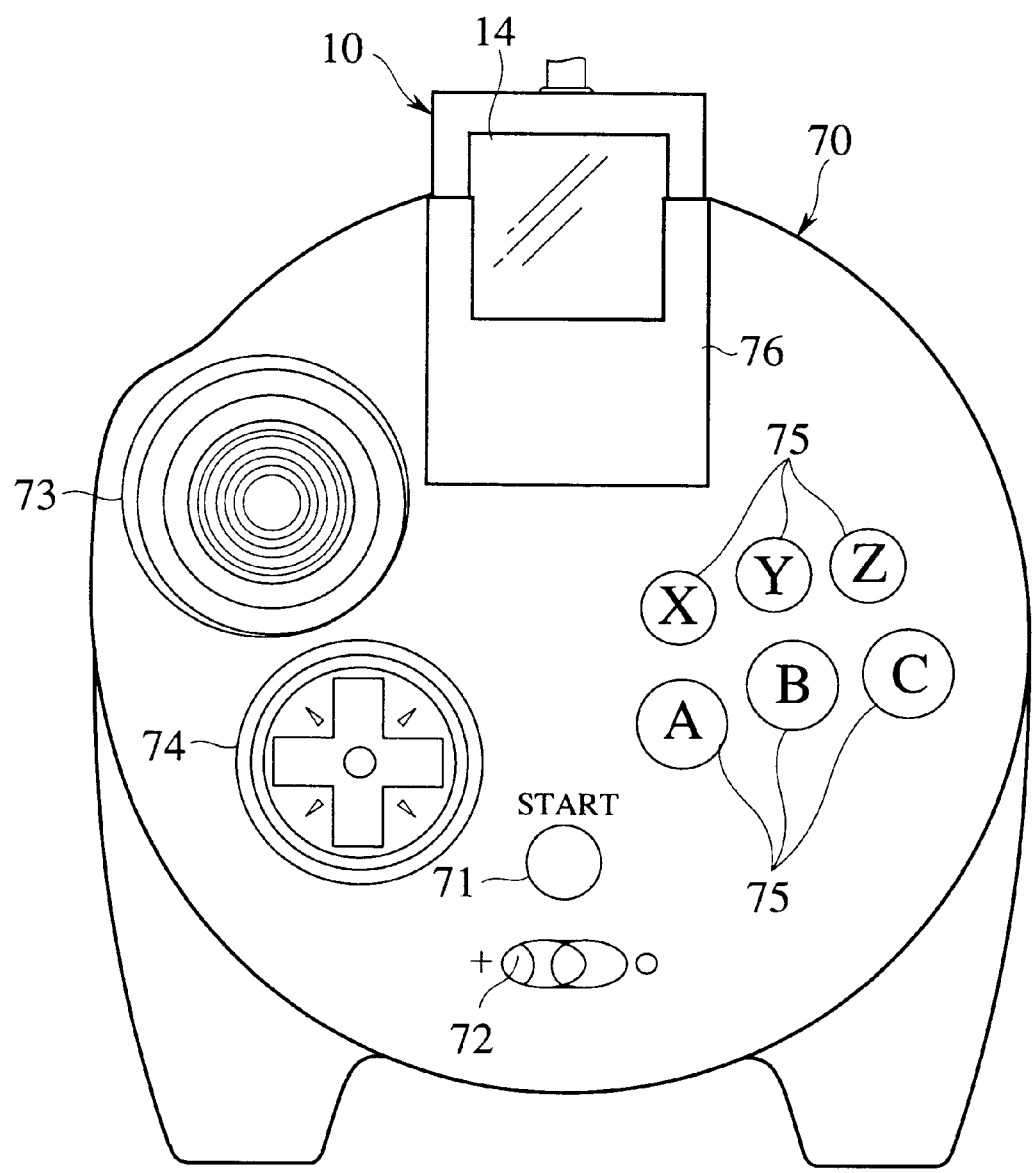
FIG. 11 is a view of the memory card according to the second embodiment of the present invention connected to a controller.
Figure 12:
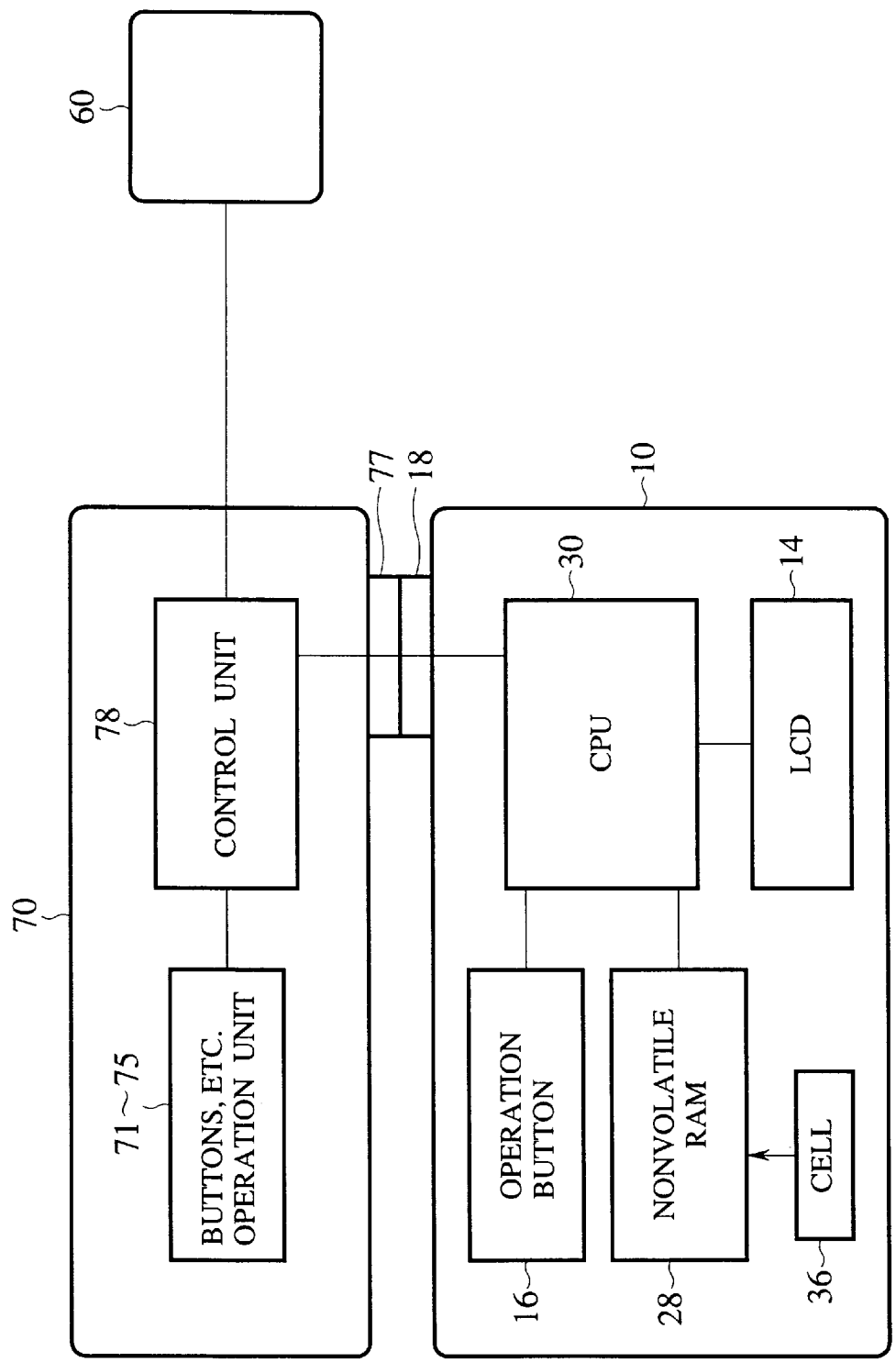
FIG. 12 is a block diagram of the memory card according to the second embodiment connected to the controller.

A case that the memory card 10 is connected to a controller 70 of a game apparatus will be explained. FIG. 11 shows a state of the memory card 10 according to the present embodiment connected to the controller 70. FIG. 12 is a block diagram of the memory card 10 according to the present embodiment connected to the controller 70.

As shown in FIG. 11, a start button 71 and a change-over switch 72 are provided at a lower central part of an operation surface of the controller 70. On the left side of the operation surface there are provided an analog direction key 73 and a digital direction key 74. On the right side of the operation surface there are provided six command buttons 75. A card slot 76 for the memory card 10 to be inserted into is provided in an upper part of the operation surface of the controller. A connector 77 for the memory is provided in the card slot 76.

As shown in FIG. 12, the controller 70 is connected to the game apparatus body 60, and the memory card 10 is loaded in the controller 70. The controller 70 has a connector 77 for the memory. The memory card 10 is connected to the connector 77 for the memory. The controller 70 has a control unit 78, and the control unit 78 is connected to the operational members 71 75. The external connection terminal 18 of the memory card 10 is connected to the connector 77 for the memory and connected to the control unit 78 of the controller 70.

Figure 13:
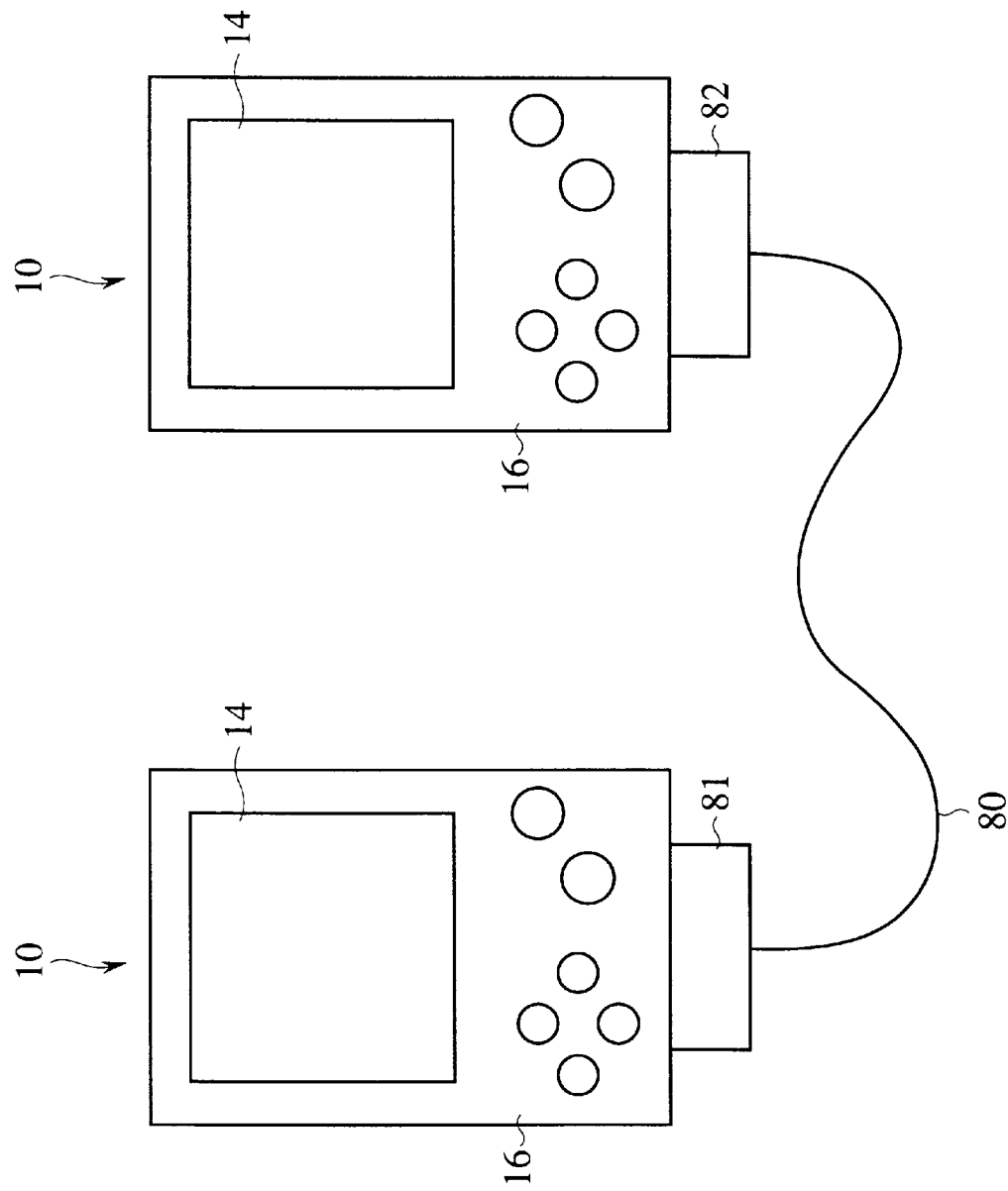
FIG. 13 is a view of the memory cards according to the second embodiment of the present invention connected to each other by a connection cable.
Figure 14:
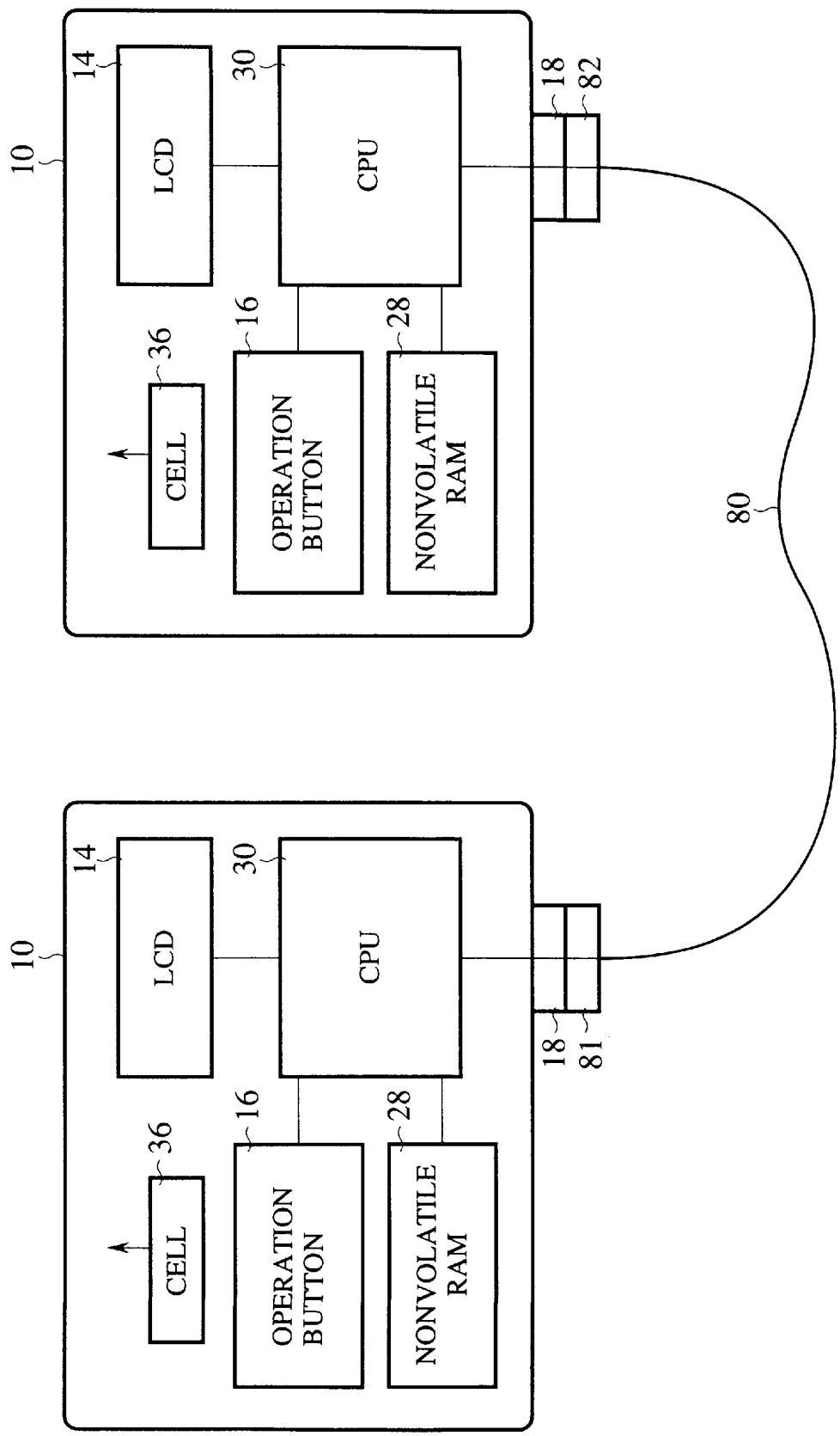
FIG. 14 is a block diagram of the memory cards according to the second embodiment of the present invention connected to each other.

A case that the memory cards are connected to each other will be explained. FIG. 13 shows a state of the memory cards 10 according to the present embodiment connected to each other by a connection cable 80. FIG. 14 is a block diagram of the memory cards 10 according to the present embodiment connected to each other.

As shown in FIG. 13, connectors 81, 82 are provided on both ends of the connection cable 80. The memory cards 10 are respectively connected to the connectors 81, 82 to thereby connect the memory cards 10 to each other.

As shown in FIG. 14, the external connection terminals 18 of the respective memory cards 10 are respectively connected to the connectors 81, 82 of the connection cable 80. The connection cable 80 interconnects CPU 30 of the respective memory cards 10.

The memory cards 10 are connected to each other, whereby communication games can be played, and data programs can be exchanged.

(Game System using the Memory Card)

Then, an example of the innovational game system using the memory card according to the present embodiment will be explained with reference to FIGS. 15 to 18.

Figure 15:
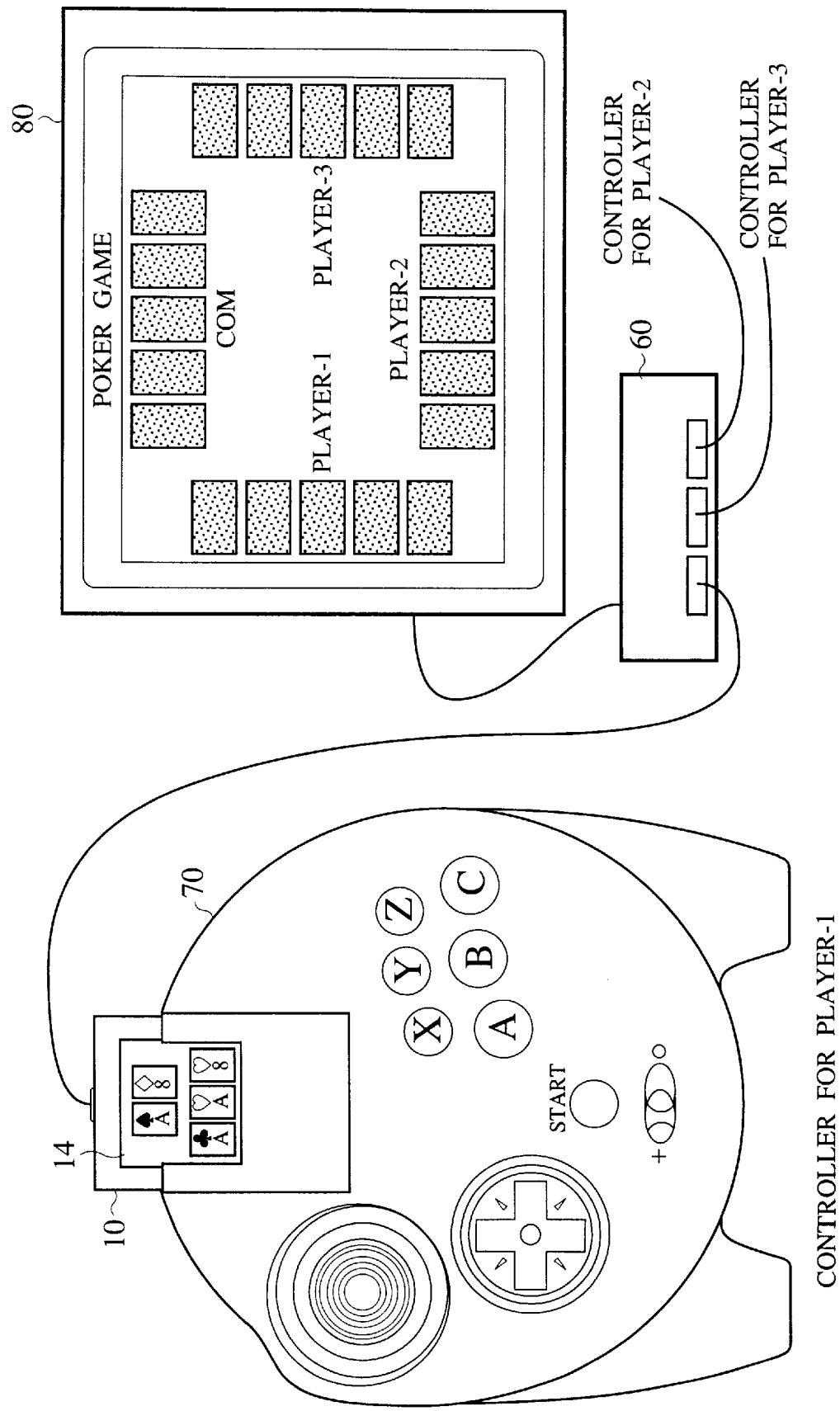
FIG. 15 is a view explaining a game system using as a subscreen the memory card according to the second embodiment of the present invention.

FIG. 15 is explanatory views of the game system using the memory card as a subscreen.

The controllers 70 in a number of game players are connected to the game apparatus body 60. The memory card 10 is loaded in the card slot 76 of each controller 70. In the game system a video game monitor 80 is a main screen, and the LCD 14 of the memory card 10 loaded in each controller 70 is the subscreen.

In a poker game, for example, the back sides of the cards of each game player are displayed on the video monitor 80. A hand of each game player is displayed on the LCD 14 of the memory card 10. Each player advances the poker game watching displays of the controller 70.

Figure 16:
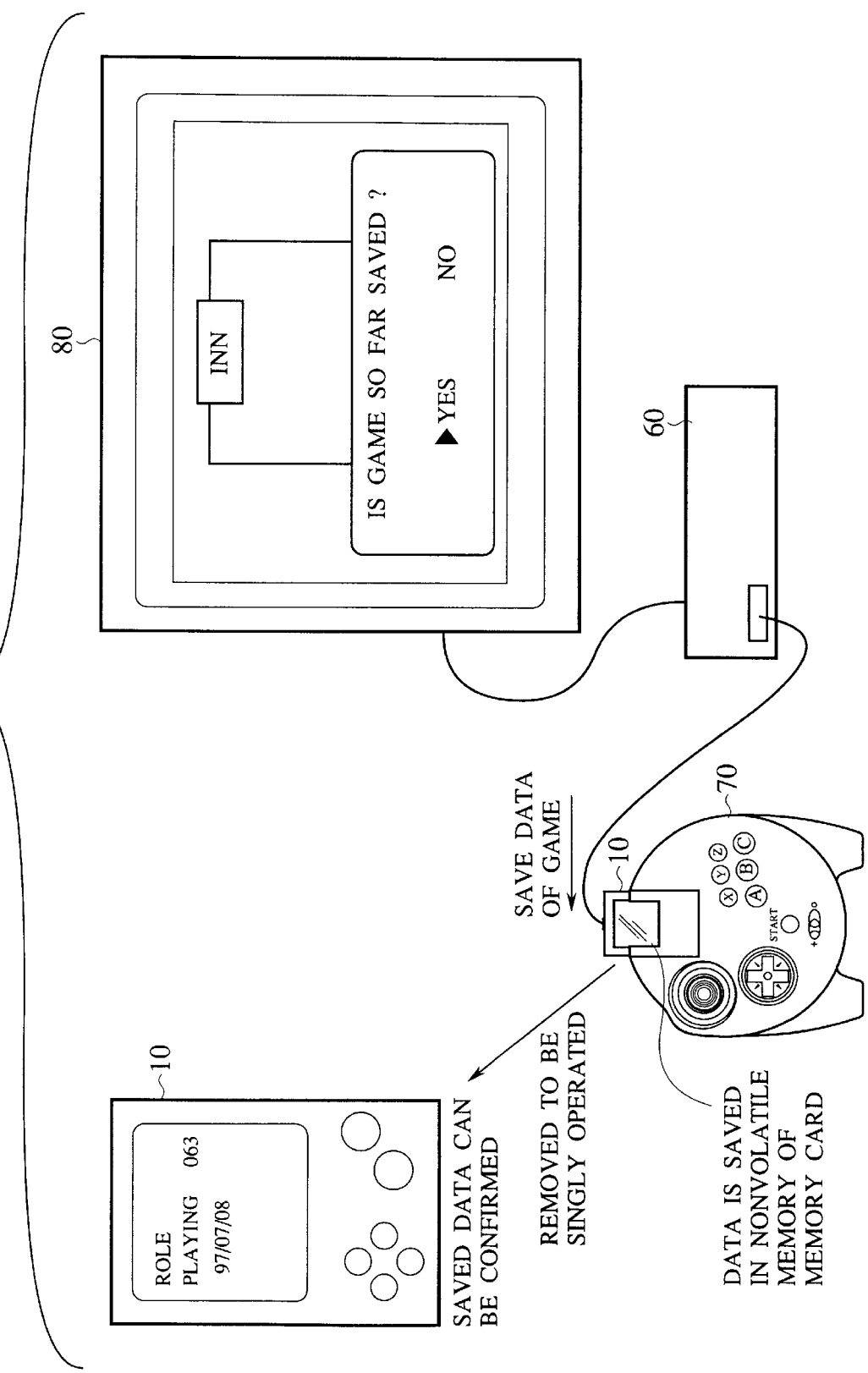
FIG. 16 a view explaining a game system which saves game data in the memory card according to the second embodiment of the present invention.

FIG. 16 is an explanatory view of the game system in which game data are stored in the memory card.

The memory card 10 is loaded in the card slot 76 of the controller 70 connected to the game apparatus body 60. The controller 70 is operated to execute a game by the game apparatus body 60. While the game is being executed, in order to preserve game data the game data is downloaded from the game apparatus body 60 to be stored in the nonvolatile RAM 28. The game data preserved in the memory card 10 can be displayed on the LCD 14. The game data preserved in the memory card 10, which is removed from the controller 70, can be displayed on the LCD 14 for the confirmation of the contents.

Figure 17:
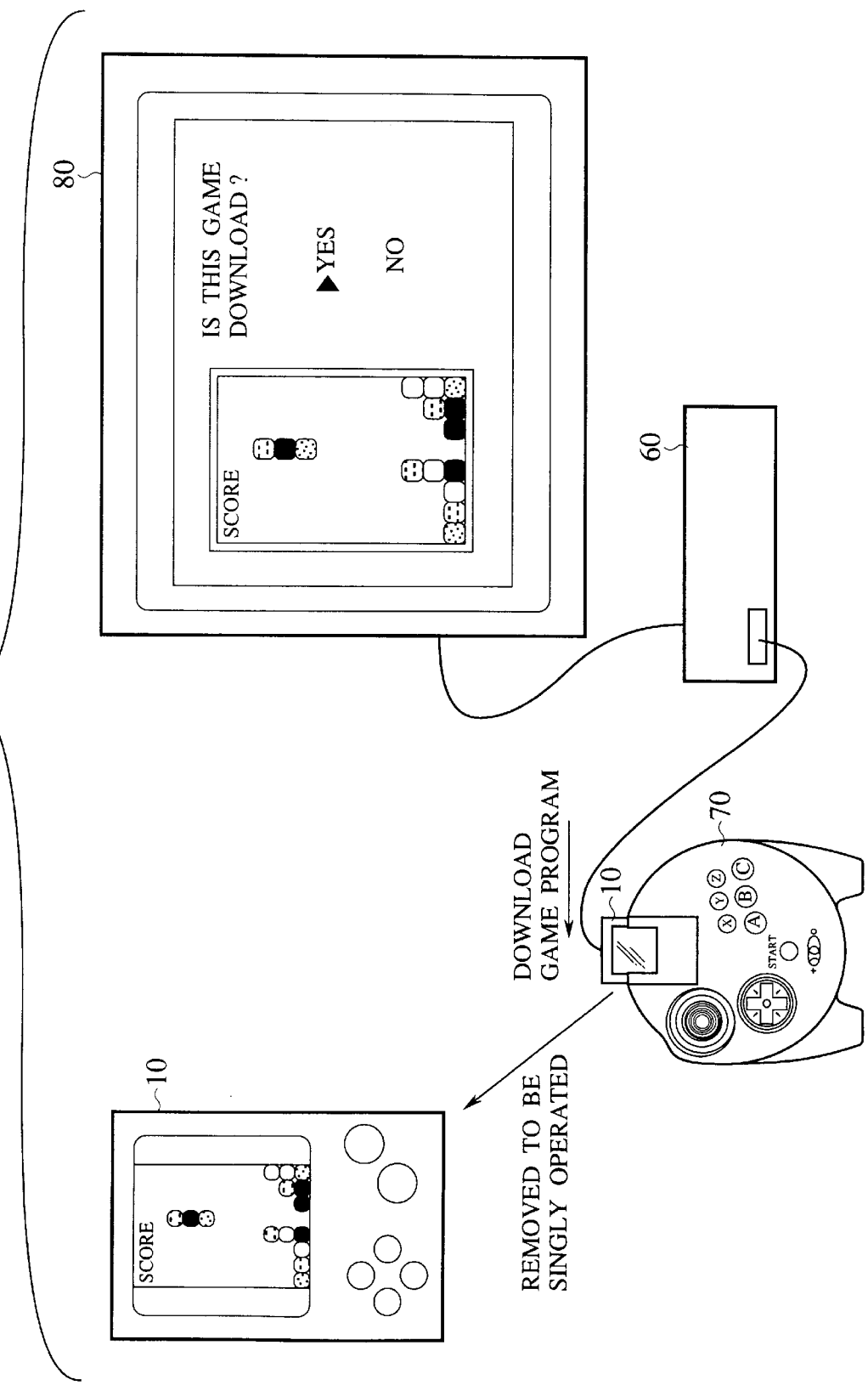
FIG. 17 is a view explaining a game system which downloads a minigame to the memory card according to the second embodiment of the present invention so that the memory card is used as a portable game apparatus.

FIG. 17 is an explanatory view of the game system in which a mini-game is downloaded in the memory card, and the memory card is used as a portable game apparatus.

The memory card 10 is loaded in the card slot 76 of the controller 70 connected to the game apparatus body 60. The controller 70 is operated to download the mini-game from the game apparatus body 60, and the mini-game is stored in the nonvolatile RAM 28 of the memory card 10. A player removes the memory card 10 from the controller 70 and operates the memory card 10 as a single portable game apparatus. By downloading different games various mini-games can be enjoyed on the memory card 10.

Figure 18:
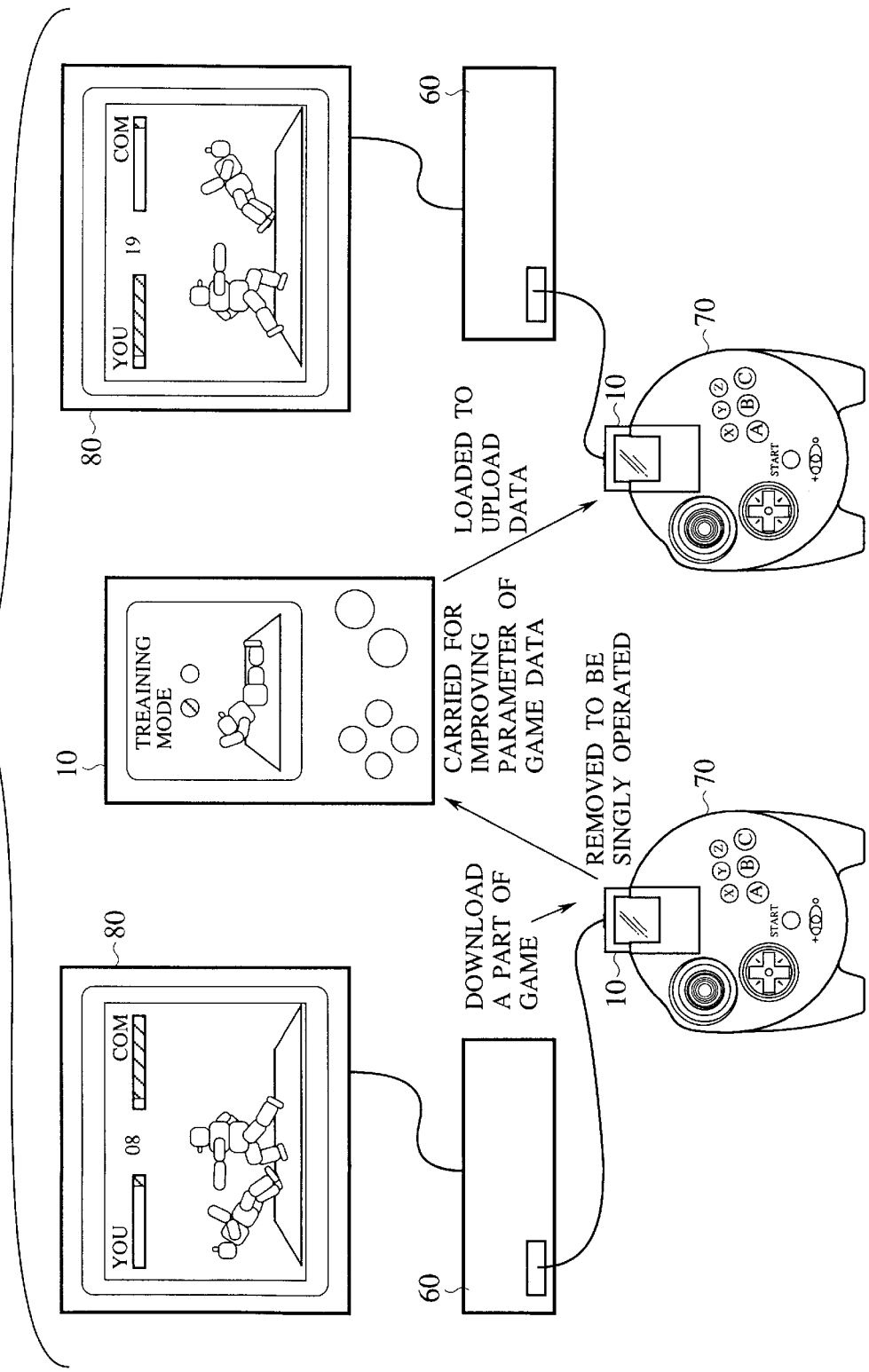
FIG. 18 is views explaining a game system in which a part of a game of a game apparatus body is taken out to the memory card according to the second embodiment of the present invention so that the part of the game is played on the memory card.

FIG. 18 is an explanatory views of the game system in which a part of a game of the game apparatus body is cut out into the memory card as a mini-game, and the game is played on the memory card.

First, the controller 70 with the memory card 10 loaded in is connected to the game apparatus body 60 on the left side of FIG. 18. A game player plays the game by operating the controller, watching a videomonitor 80. For example, it is assumed that the game player plays a fighting game and defeated by the computer. The player downloads a mini-game of the fighting game together with game data of his own character into the memory card 10.

Then, the game player removes the memory card 10 and operates the memory card alone to play the downloaded mini-game. In the operation of the memory card alone, the game player plays a training game, for example, to increase power of his own character and renews the game data.

When the game player judges that the power increase has been made, the game player loads the memory card 10 into the controller 70 of the game apparatus body 60 on the right side of FIG. 18 to upload game data of his own character stored in the memory card 10 into the game apparatus body 60. In the fighting game played by using the game apparatus body 60 the game player can fight by using the character having the power increased, whereby the game player can defeat the computer.

As described above, according to the present embodiment the memory card includes the LCD and the operation buttons, whereby the memory card itself can display the stored contents or can be operated by the operation buttons. The memory card can be used in the same way as a small-sized portable game apparatus. According to the present embodiment, the memory card includes the external connection terminals, by which the memory card can be connected to the game apparatus body, the controller or others. Thus, an innovational game system can be realized.

A Third Embodiment

Figure 19:
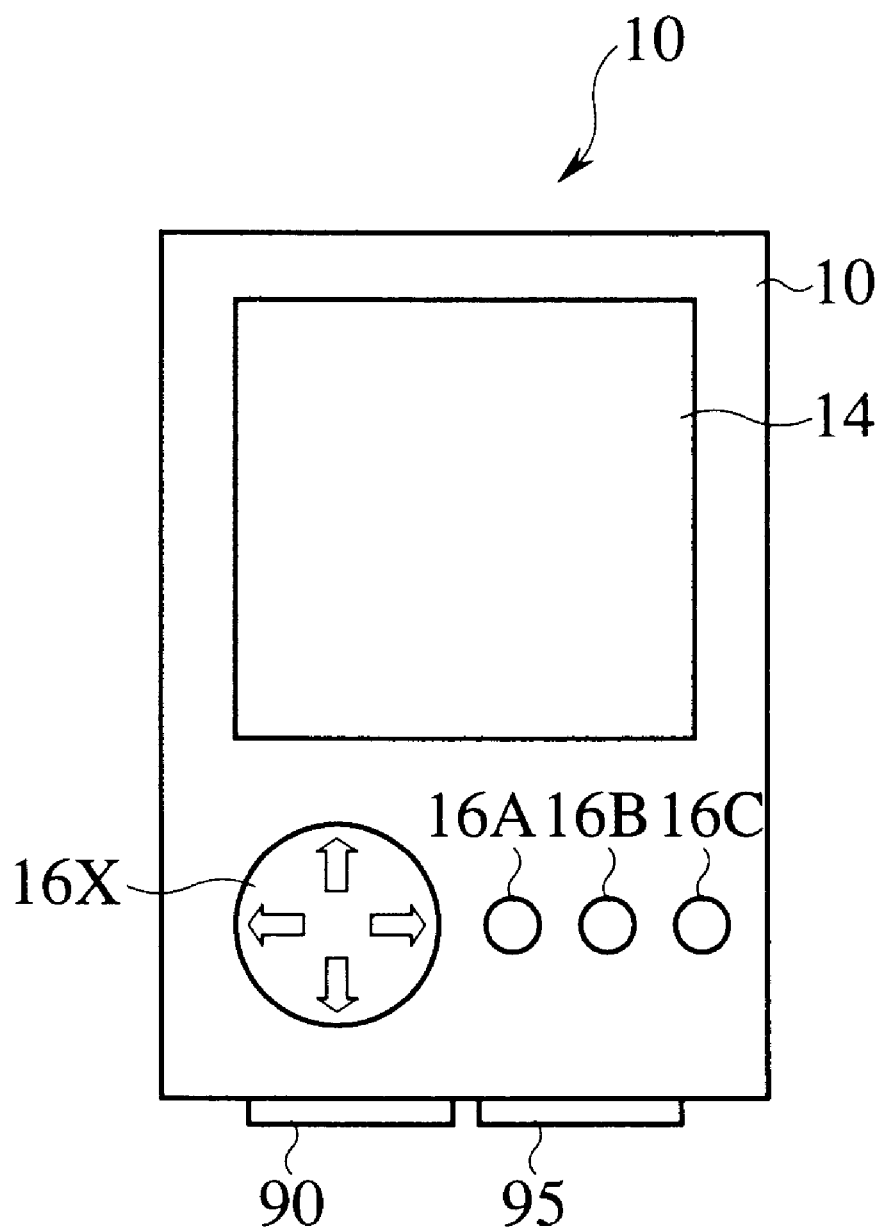
FIG. 19 is a view of the memory card according to a third embodiment of the present invention, which shows an appearance thereof.
Figure 20:
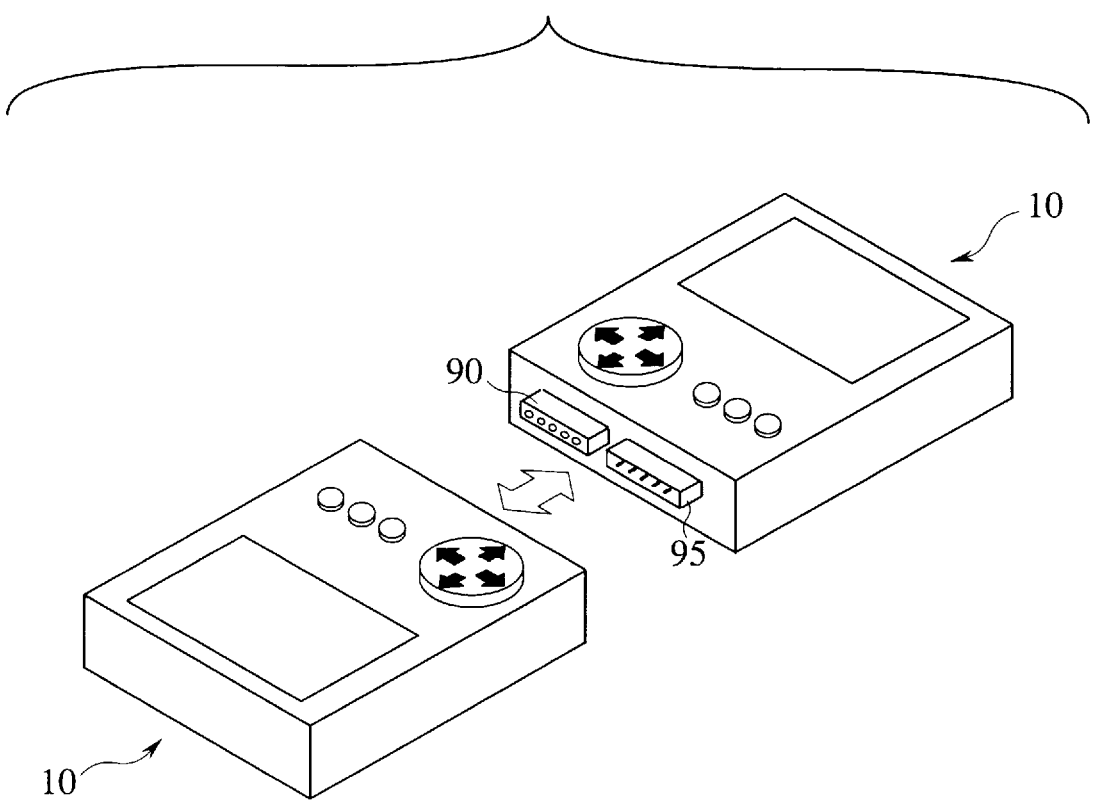
FIG. 20 is a view of the memory cards according to the third embodiment of the present invention connected directly to each other.

The memory card according to a third embodiment of the present invention will be explained with reference to FIGS. 19 to 23. FIG. 19 is an appearance view of the memory card according to the present embodiment. FIG. 20 is a view of the memory cards according to the present embodiment connected to each other. FIG. 21 is views of structures of the external connection terminals of the memory cards according to the present embodiment. The same or similar members of the present embodiment as or to those of the memory card according to the above-described first or the second embodiment are represented by the same reference numbers not to repeat or simplify their explanation.

As shown in FIG. 19, the memory card 10 according to the present embodiment has a small sized LCD (liquid crystal display) 14 provided on at an upper part of the front side of a case 12. Operational buttons 16 are provided below the LCD 14. The operational buttons 16 include a direction key 16X, and command buttons 16A, 16B, 16C. A pair of a male and a female connection connectors 95, 90 are provided on the bottom of the case 12. The rest constitution is the same as that of the first embodiment.

The connectors 95, 90, which are a pair of a male and a female connectors, enable the memory cards 10 to be connected directly to each other without using connection cords as shown in FIG. 20.

The connectors 90, 95 are detailed in FIG. 21. As shown in FIG. 21A, the female connector 90 and the male connector 95 are provided integral with the case at the bottom thereof. As shown in the sectional view of FIG. 21B and the bottom side view of FIG. 21C, the female connector 90 has, for example, 5 female connector pins arranged in one row, and the male connector 90 has, for example, five male connector pins 76 arranged in one row. The male connector pins 97 are protectively covered by a connector cover 95.

Figure 21A:
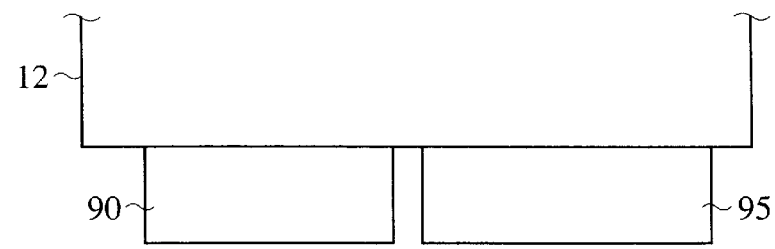
FIG. 21 is views of a connector of the memory card according to the third embodiment of the present invention.
Figure 21B:
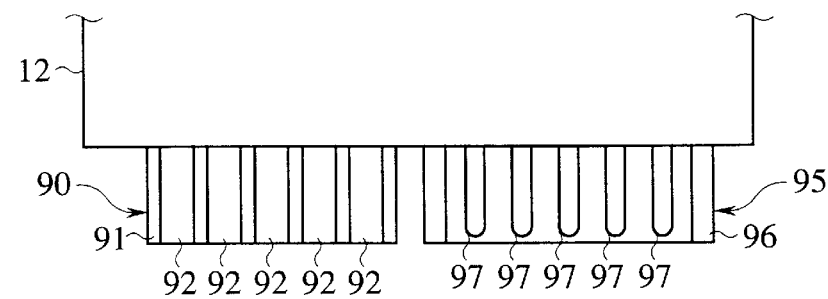
Figure 21C:
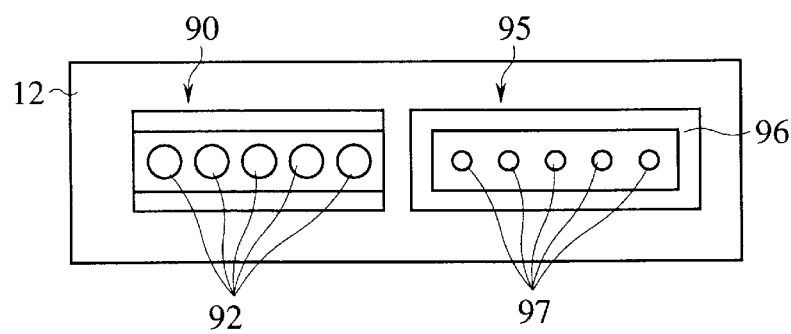
Figure 21D:
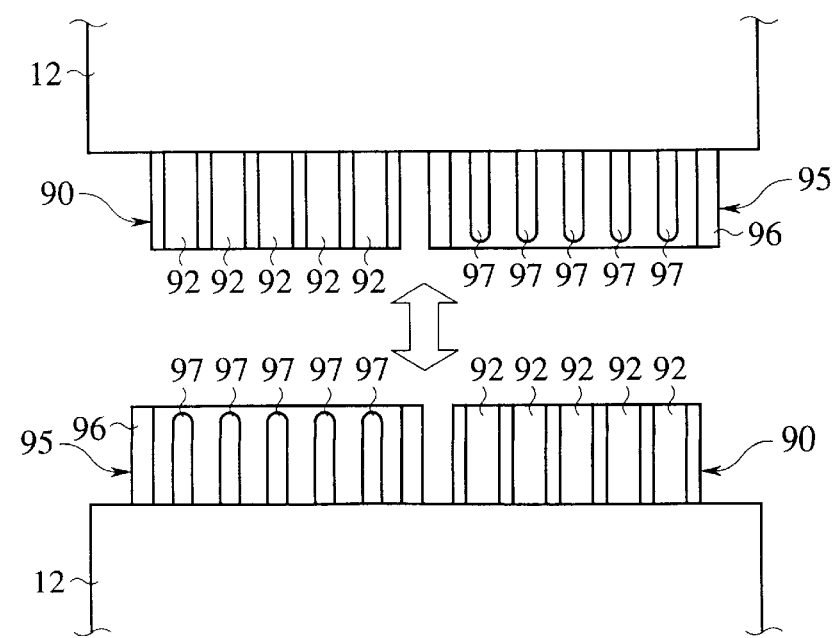

In connecting the memory cards 10 to each other this constitution enables, as shown in FIG. 21D, the male connector of one memory card 10 to be connected to the female connector 90 of the other memory card 10, and the female connector 90 of said one memory card 10 to be connected to the male connector 95 of said other memory card 10. The memory cards 10 are connected directly to each other.

Figure 22:
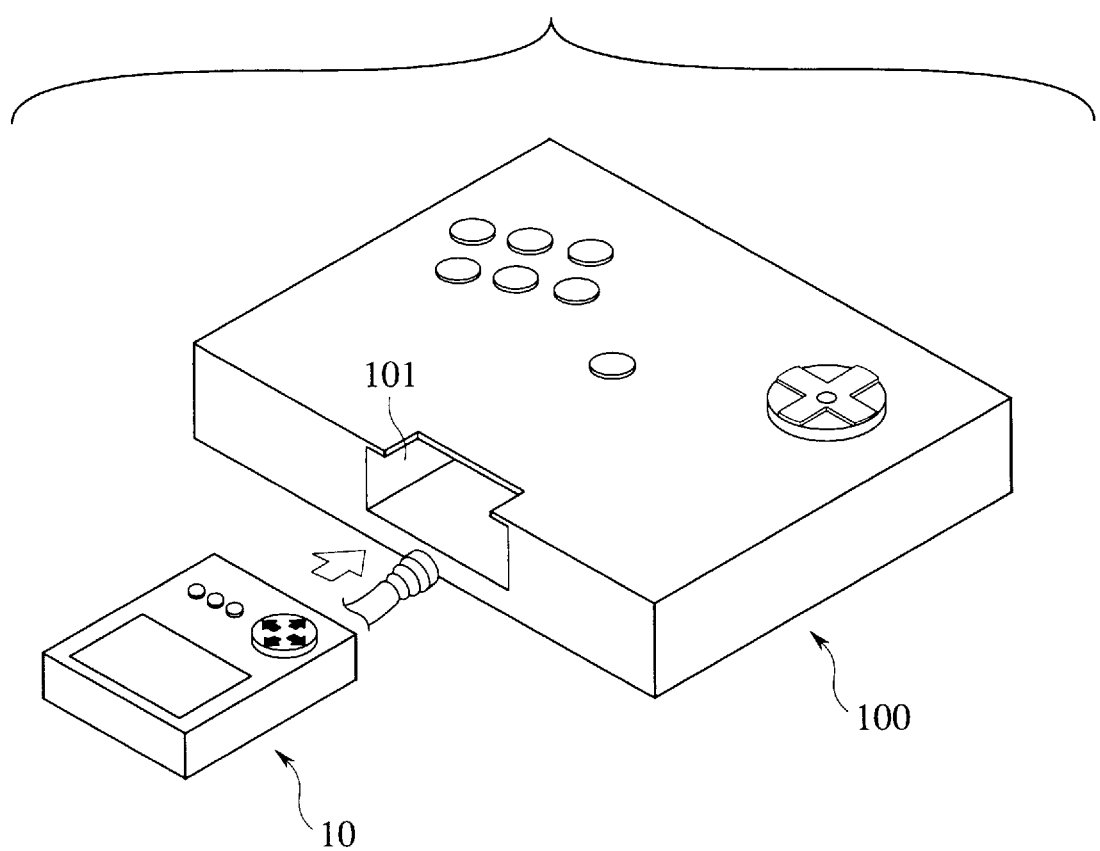
FIG. 22 is a view of the memory card according to the third embodiment of the present invention connected to a controller of a game apparatus.

FIG. 22 is a view of the memory card 10 connected to a controller 100 of a game apparatus. The controller 100 has a card slot 101 in which the memory card 10 to be loaded provided in the front side thereof. In the card slot 101 there are provided a pair of a male and a female connectors (not shown) having the same structure as those of the memory card 10. The memory card 10 is inserted into the card slot 101 of the controller 100 to connect the connectors.

Figure 23A:
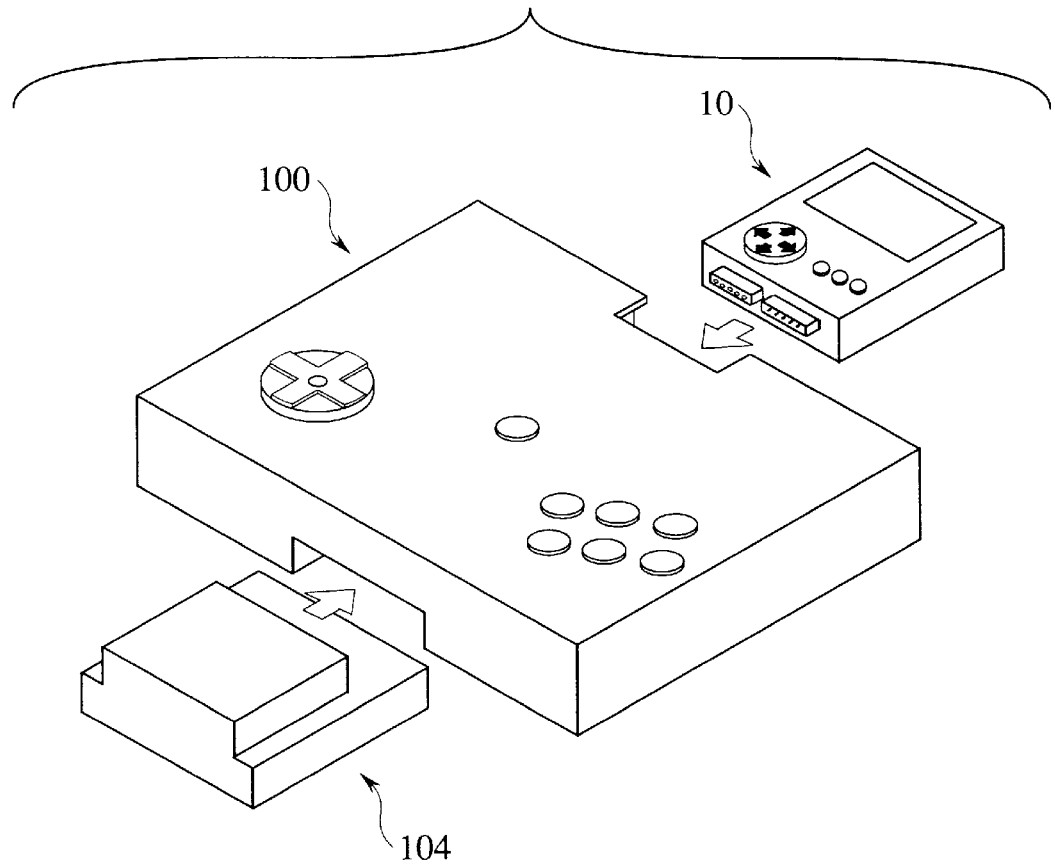
FIG. 23 is views of the memory card according to the third embodiment of the present invention and an expansion unit loaded in a controller of a game apparatus.
Figure 23B:
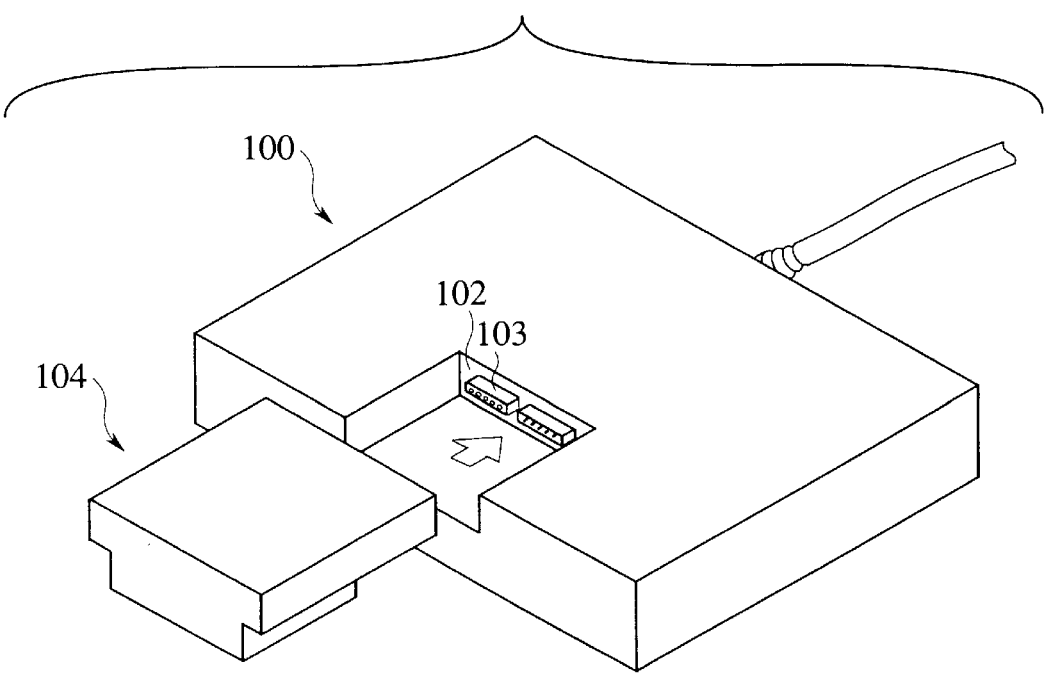

It is possible that, as shown in FIG. 23, another expansion for expanding the function of the controller 100, e.g., a vibration unit 104 has connectors of the same structure as those of the controller 100. The controller 100 has a pair of a male and a female connector 103 in an expansion unit loading portion 102 of the controller 100. The vibration unit 104 has connectors (not shown) of the same structure, and when the vibration unit 104 is loaded, the vibration unit 102 is inserted into the expansion unit loading portion 102.

The memory cards 10 are connected to each other to thereby move preserved data or game programs, or two memory cards 10 are used to thereby play more sophisticated games.

As described above, according to the present embodiment, the connectors of the memory card are a pair of a male and a female connectors, whereby in connecting the memory cards to each other the memory cards can be connected directly to each other without using connection cords.

A Fourth Embodiment

The game system according to a fourth embodiment of the present invention will be explained with the drawings. The game system according to the present embodiment is characterized in that a memory card having a display unit provided is used. The memory card is connected to a controller or a game apparatus body, or is removed therefrom to be singly used. Then, the game system according to the present embodiment will be detailed.

(Memory Card)

The memory card used in the game system according to the present embodiment is, e.g., the memory card according to the first embodiment shown in FIGS. 1 to 6, or the memory card according to the second embodiment shown in FIGS. 7 to 9. These memory cards have been detailed above, and their explanation is omitted.

(The Memory Card Singly Used)

An operation of the memory card 10 being singly used without connection to an external apparatus will be explained with reference to the block diagram of the memory card shown in FIG. 3 and the program structure of the memory card shown in FIG. 4.

An electric source power is supplied from the battery 36. The SUB-SYSTEM 40 actuates the program LOADER 42, based on a connection state of the external connection terminal 18. The program LOADER 42 actuates, as required, the memory administration program 45 or the portable game program 46. For example, the memory mode and the game mode are changed over to each other by using the operation buttons 16. In the memory mode the memory administration program 45 is actuated, and the portable game program 46 is actuated in the game mode.

In the memory mode contents of the nonvolatile RAM 28 are manipulated. The stored contents are processed into graphics by the CPU 30 and displayed on the LCD 14, and are manipulated by the use of the operation buttons 16.

In the game mode a game stored in the nonvolatile RAM 28 is executed. The stored portable game program 46, for example, is executed, and the memory card 10 is singly operated by the use of the operation buttons 16 to play a mini-game.

In the present embodiment it is possible that a part or all of a program in the nonvolatile RAM 28 is transferred to the RAM of the CPU 30 to be operated.

In the present embodiment, the nonvolatile RAM 28 is used by the control of the CPU 30 as a region for preserving backup data and also as a region for preserving a downloaded program.

When the operation buttons 16 are not operated for a set period of time, the electric source power is automatically turned off for electric power saving.

(Memory Card Connected to External Apparatus)

An operation of the memory card 10 connected to an external apparatus will be explained with reference to the block diagram of the memory card shown in FIG. 3 and the program structure of the memory card shown in FIG. 4.

When the memory card is connected to an external apparatus, the external apparatus controls the memory card 10. Electric source power is supplied from the external connection terminal 18, and the battery 36 is not used. The SUB-SYSTEM 40 actuates the SYSTEM for the external control mode 41, based on a connection state of the external connection terminal 18. The SYSTEM for the external control 41 actuates, as required, the memory/download administration program 43 or the LCD submonitor administration program 44.

Data inputted from the external apparatus is analyzed by the SYSTEM for the external control 41 as to whether the data is for controlling the LCD 14 or for controlling the nonvolatile RAM 28 and, based on an analysis result, actuates the LCD submonitor administration program 44 or the memory/download program 43.

Data inputted from the external apparatus is analyzed by the SYSTEM 41 for the external control as to whether the data is for controlling the LCD 14 or for controlling the nonvolatile RAM 28 and, based on an analysis result, actuates the LCD submonitor administration program or the memory/download administration program 43.

In controlling the LCD 14 display of the LCD 14 is controlled, or contents corresponding to data inputted from the external apparatus are displayed on the LCD 14.

In controlling the nonvolatile RAM 28, data inputted from the external apparatus is written in the nonvolatile RAM 28, or data is read from the nonvolatile RAM 28.

In writing data in the memory card 10 from the external apparatus, data is outputted to the memory card 10 from the external apparatus. The outputted data is inputted to the CPU 30 via the external connection terminal 18. The CPU 30 converts the data in accordance with a program stored in the built-in ROM and writes the data in the nonvolatile RAM 28. The nonvolatile RAM 28 retains the converted data.

In reading data stored in the nonvolatile RAM, a read command is outputted from the external apparatus to the memory card 10. The CPU 30 reads the data from the nonvolatile RAM 28 in response to the read command, converts the data and outputs the data to the external apparatus through the external connection terminal 18.

(Memory Card Loaded in Controller)

Figure 25:
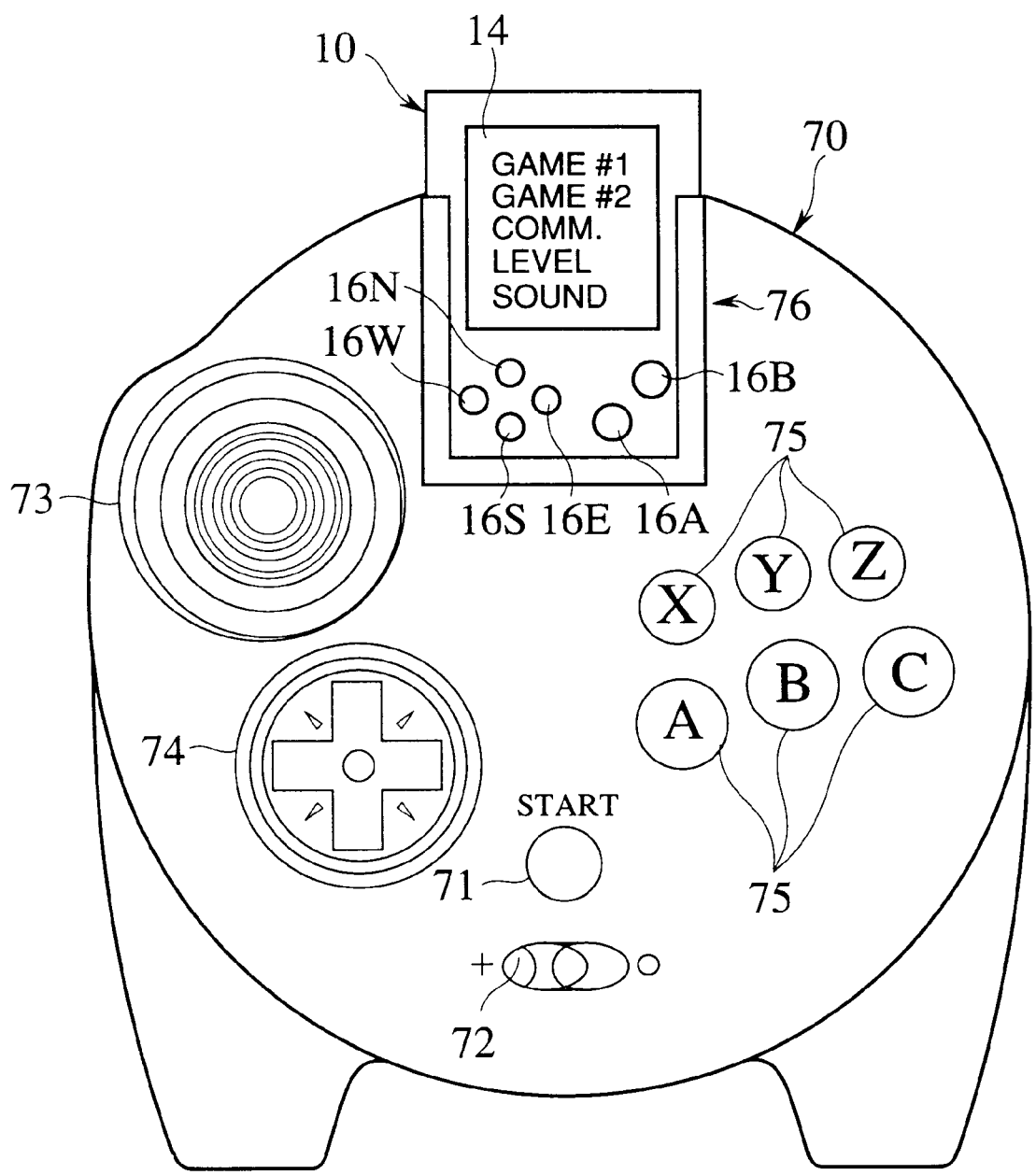
FIG. 25 is a view of the memory card according to the fourth embodiment of the present invention loaded in the controller.
Figure 26:
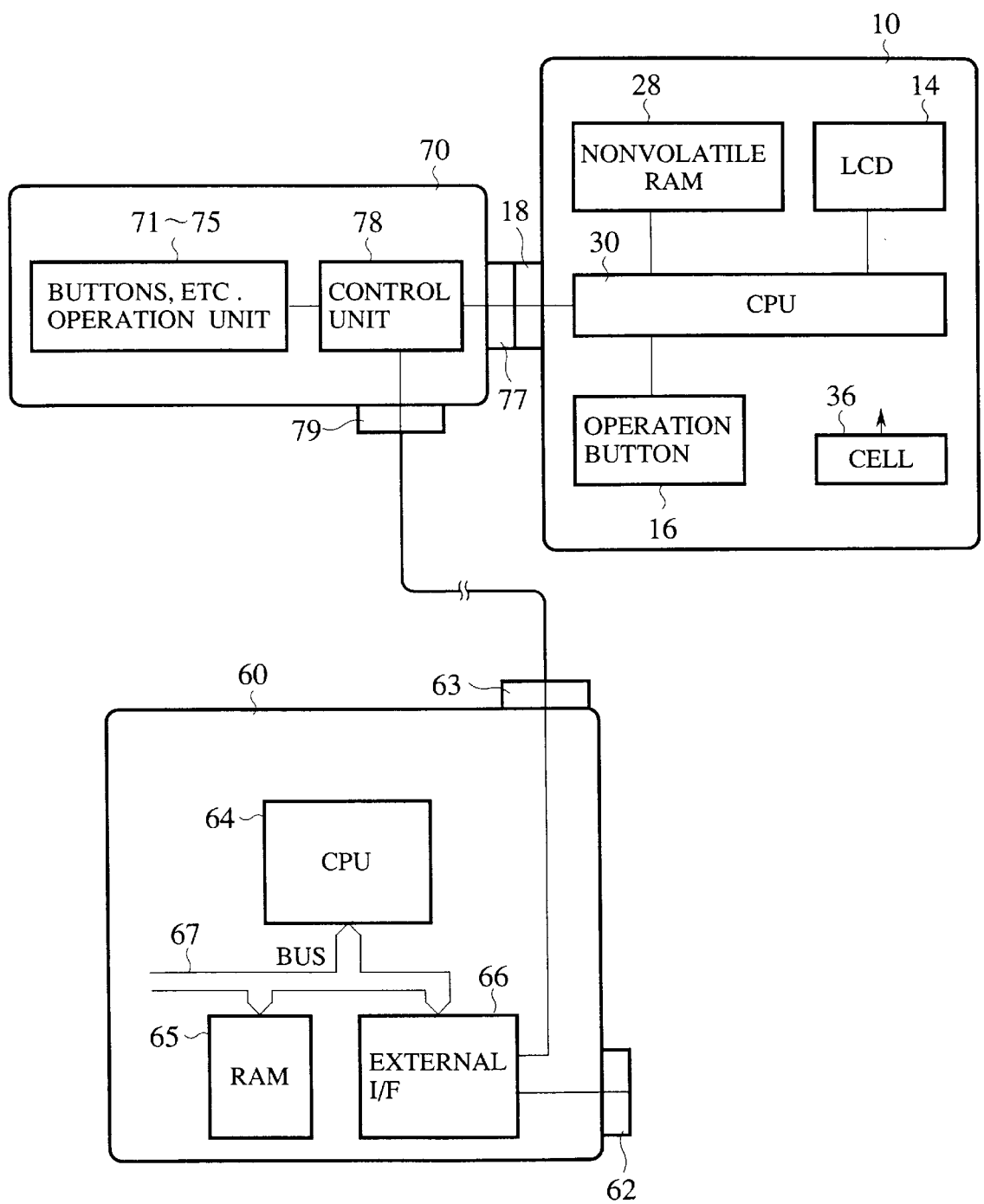
FIG. 26 is a block diagram of the memory card according to the fourth embodiment of the present invention loaded in the controller.

A case that the memory card 10 is loaded in the controller 70 connected to the game apparatus body 60 will be explained with reference to FIGS. 24 to 26. FIG. 24 is a view of the memory card 10 according to the present embodiment loaded in the controller 70. FIG. 25 is a view detailing the controller 70. FIG. 26 is a block diagram of the memory card 10 connected to the controller 70.

As shown in FIG. 24, the game apparatus body 60 is connected to a videomonitor 85 for displaying game displays, and to the controller to be operated by a game player. The memory card 10 is loaded in the controller 70. The memory card 10 can be unloaded from the controller 70 to be singly operated.

As shown in FIG. 25, the controller 70 has a start button 71 and a change-over switch 72 at a lower part of the center of the operation panel. An analog direction key 73 and a digital direction key 74 for indicating directions are disposed on the left side of the operation panel. Six command keys 75 are disposed on the right side of the operation panel. A card slot 76 for the memory card to be loaded in is provided in a part of the upper side of the operation panel of the controller 10. A connector for the memory 77 is provided inside the card slot 76.

As shown in FIG. 25, the card slot 76 has a shape opened large in the operation panel of the controller sufficiently to expose substantially all the front side of the memory card 10 loaded in the card slot 76. Thus a game player can operate the operation buttons (direction buttons 16N, 16S, 16E, 16W, a decision button 16A and cancel button 16B) below the LCD 14, watching the LCD 14 of the memory card 10 loaded in the controller 70.

As shown in FIG. 26, the game apparatus body 60 has a connector 62 for the memory and a connector for the controller 63. The connector for the memory 62 is for loading the memory card 10, and the connector for the controller 63 is for connecting the controller 70. The game apparatus body 60 has a CPU 64, and the CPU 64 is connected to a RAM 65, and external I/F 66, etc. via a bus 67. The external I/F 66 is connected to the connector for the memory 62 and the connector 63 for the controller.

The controller 70 is connected to the game apparatus body 60 through the connector for the controller 63 and the connector 79. The memory card 10 is loaded in the controller 70. The controller 70 has a control unit 78, and the controller unit 78 is connected to the operation units 71-75, such as the buttons, etc. The external connection terminal 18 of the memory card 10 is connected to the connector for the memory 77 and to the control unit 78 of the controller 70.

(Data Selecting Operation and Data Saving Operation for the Memory Card Connected to the Controller)

Then, a data selecting operation of selecting data to be stored in the memory card 10, and a data saving operation of saving the data in the memory card 10 will be explained.

A first example of the data selecting operation and the data saving operation is performed by using the keys of the controller 70.

A plurality of data which can be saved are displayed on the entire or a part of the videomonitor 85. A game player selects data by operating the cursor by the analog direction key 73 or the digital direction key 74 to select a required command button 75. The game player further operates the command buttons to save the selected data in the nonvolatile RAM 29 of the memory card 10. It is possible that a plurality of data which can be selected are displayed on the entire or a part of the LCD 14 of the memory card 10 in place of the videomonitor 85.

According to the present example, a game player can select data and save the data by operating the controller the game player is used to, which can preclude operational errors.

A second example of the data selecting operation and the data saving operation is performed by using the keys of the memory card 10.

A plurality of data which can be selected are displayed on the entire or a part of the videomonitor 85, and a game player operates the cursor by the direction buttons 16N 16W of the memory card 10 and selects data by the decision button 16A. When the game player operates the decision button 16A, the selected data is saved in the nonvolatile RAM 28 of the memory card 10. It is possible that a plurality of data which can be selected are displayed on the entire or a part of the LCD 14 of the memory card 10.

According to the present example, even while a game is being played, the data selection and the data saving operations can be performed without interrupting the game independently of the key operation of the controller 70. Usually, while a game is being advanced, operations of the operation buttons using in advancing the game are assigned to the controller. When the saving operation is inserted in a game being advanced, the assignment of the button operations is temporarily changed, which tends to cause operational errors of the game player. According to the present example, such operational errors can be effectively prevented.

In a third example of the data selecting operation and the data saving operation the data selection is performed without operating the keys of the controller 70 or the memory card 10.

A plurality of data which can be selected are displayed sequentially in connection with advance of a game. A game player saves required one of the data by operating a required key of, e.g., the controller 70 or the memory card 10 when a game display related with the data is presented. Performing the data saving operation on a specific one of game displays of a game being advanced is the data selecting operation. It is possible that information of data to be saved on a game display is displayed on the videomonitor 85 or the LCD 14.

According to the present example, a game player can perform the data selecting operation and the data saving operation without determinedly performing these operations.

In a fourth example of the data selecting operation and the data saving operation the data can be saved without operating the keys of the controller 70 or the memory card 10.

When that of the data to be saved is selected by the above-described examples, with the memory card 10 loaded, the data is automatically saved in the nonvolatile RAM 28 of the memory card 10. It is possible that in a case that the memory card 10 is loaded at the time that the data is selected, the loading of the memory card 10 is detected, and the data is automatically saved in the nonvolatile RAM 28 of the memory card 10.

In a case that the controller 70 with the memory card 10 loaded is connected to the game apparatus body 60, selected data is automatically saved in the nonvolatile RAM 28 of the memory card 10. It is possible that when the controller 7 is connected to the game apparatus body 60, the connection is detected, and selected data is automatically saved in the nonvolatile RAM 28 of the memory card 10.

According to the present example, a game player can perform the data saving operation automatically without determinedly performing the operation.

It is possible that the data selecting operations and the data saving operations according to the above-described first to the fourth examples are optionally combined.

(Memory Card Loaded in the Game Apparatus Body)

Figure 27:
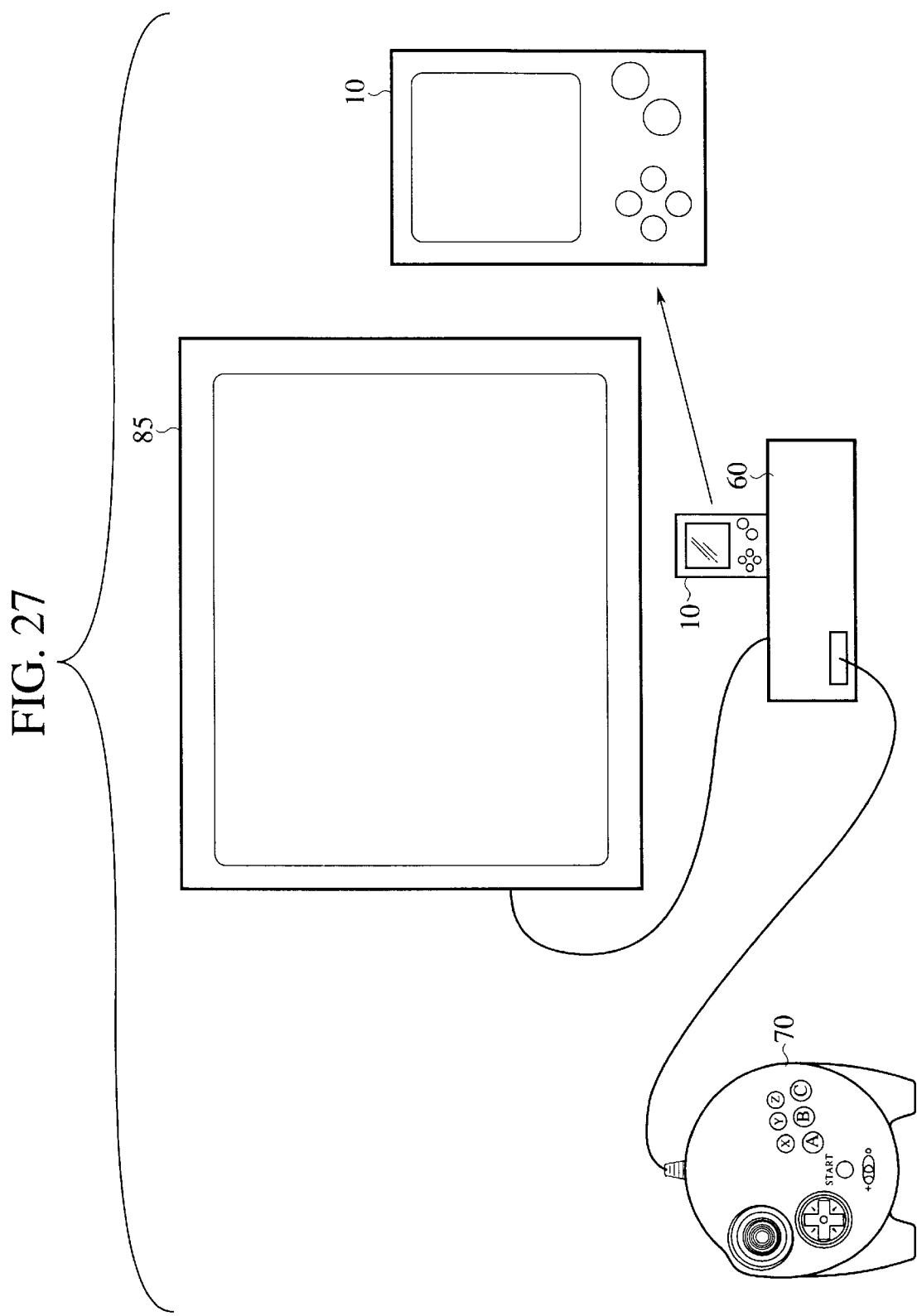
FIG. 27 is a view of the memory card according to the fourth embodiment of the present invention connected to a game apparatus body.
Figure 28:
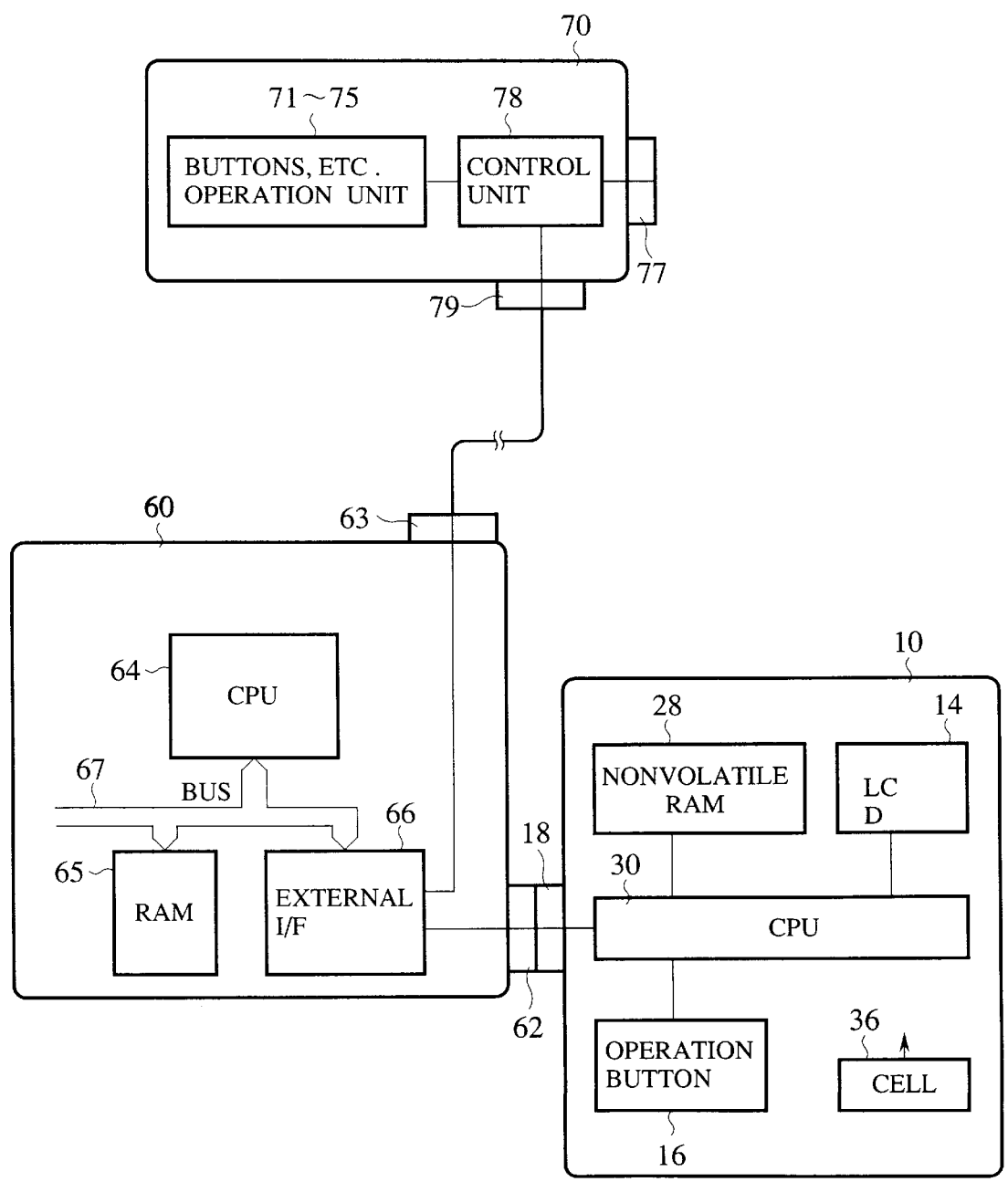
FIG. 28 is a block diagram of the memory card according to the fourth embodiment of the present invention connected to the game apparatus body.

A case that the memory card 10 is loaded in the game apparatus body 60 will be explained with reference to FIGS. 27 and 28. FIG. 27 shows the memory card 10 loaded in the game apparatus body 60. FIG. 28 is a block diagram of the memory card 10 according to the present embodiment loaded in the game apparatus body 60.

As shown in FIG. 27, the game apparatus body 60 is connected to the videomonitor 85 which displays game displays and to the controller 70 by which a game player operates a game. The memory card 10 is loaded in the game apparatus body 60. The memory card 10 may be removed form the game apparatus body 60 to be singly operated.

As shown in FIG. 28, the memory card 10 is connected to the connector for the memory 62 of the game apparatus body 60. The external connection terminal 18 of the memory card 10 is connected to the connector 62 for the memory and connected to the CPU 64, etc. through the bus 67. The rest constitution is the same as that of the block diagram shown in FIG. 10, and its explanation is omitted.

(Data Selecting Operation and Data Saving Operation with Memory Card Loaded in Game Apparatus Body)

Then, a first example of the data selecting operation and the data saving operation is performed by using the keys of the controller 70.

A plurality of data which can be selected are displayed on the entire or a part of the videomonitor 85, and a game player selects one of the data by operating the cursor by the analog direction key 73 or the digital direction key of the controller 70 and deciding the data by a required command button 75. The game player further operates a required command button 75 to save the selected data in the nonvolatile RAM 28 of the memory card 10. It is possible that a plurality of data which can be selected are displayed on the entire of a part of the LCD 14 of the memory card 10 in place of the videomonitor 85.

According to the present example, a game player can perform the data selecting and data saving operations by operating the controller he is used to, which can preclude operational errors.

In a second example of the data selecting operation and the data saving operation the keys of the memory card 10 are used.

A plurality of data which can be selected are displayed on the entire or a part of the videomonitor 85, and a game player operates the cursor by the direction buttons 116N 16W of the memory card 10 and decides one of the data by the decision button 16A. When the game player operates the decision button 16A, the selected data is saved in the nonvolatile RAM 28 of the memory card 10. It is possible that a plurality of data which can be selected are displayed on the entire or a part of the LCD 14 of the memory card 10.

According to the present example, the data selecting operation and the data saving operation can be performed even during advance of a game independently of operations of the keys of the controller 70 and without interrupting the game.

In a third example of the data selecting operation and the data saving operation the data selecting operation can be performed without operating the keys of the controller 70 or the memory card 10.

A plurality of data which can be selected are displayed sequentially in connection with advance of a game. A game player operates a required key of, e.g., the controller 70 or the memory card 10 on a game display related with of the data to be saved to thereby save the data. A game player performing the data saving operation, without determinedly performing the data saving operation, on a specific one of game displays of a game being advanced is the data selecting operation. It is possible that information of data to be saved on a game display is displayed on the videomonitor 85 or the LCD 14.

According to the present example, a game player can perform the data selecting operation and the data saving operation without determinedly performing the operations.

In a fourth example of the data selecting operation and the data saving operation data can be saved without operating the keys of the controller 70 or the memory card 10.

When data to be saved is selected by the above-described examples, with the memory card 10 loaded, the data is automatically saved in the nonvolatile RAM 28 of the memory card 10. It is possible that when the memory card 10 is loaded at the time data is selected, the loading is detected, and the data is automatically saved in the nonvolatile RAM 28 of the memory card 10.

With the controller 70 connected to the game apparatus body 60, data is automatically saved in the nonvolatile RAM 28 of the memory card 10 loaded in the game apparatus body 60. It is possible that when the controller 70 is connected to the game apparatus body 60, the connection is detected, and data is automatically saved in the nonvolatile RAM 28 of the memory card loaded in the game apparatus body 60.

According to the present example, a game player can automatically perform the data saving operation without determinedly performing the data saving operation.

It is possible that the data selecting operations and the data saving operations according to the above-described first to the fourth examples are optionally combined. For example, the data selecting operation of the first example, and the data saving operation of the second example may be combined with each other.

According to the present embodiment, functions of the memory card are expanded, whereby selected data by a game player is transferred from the game apparatus body to the memory card to be saved in the memory card to thereby make it possible to play various sub-games by the use of the memory card.

A Fifth Embodiment

Figure 29:
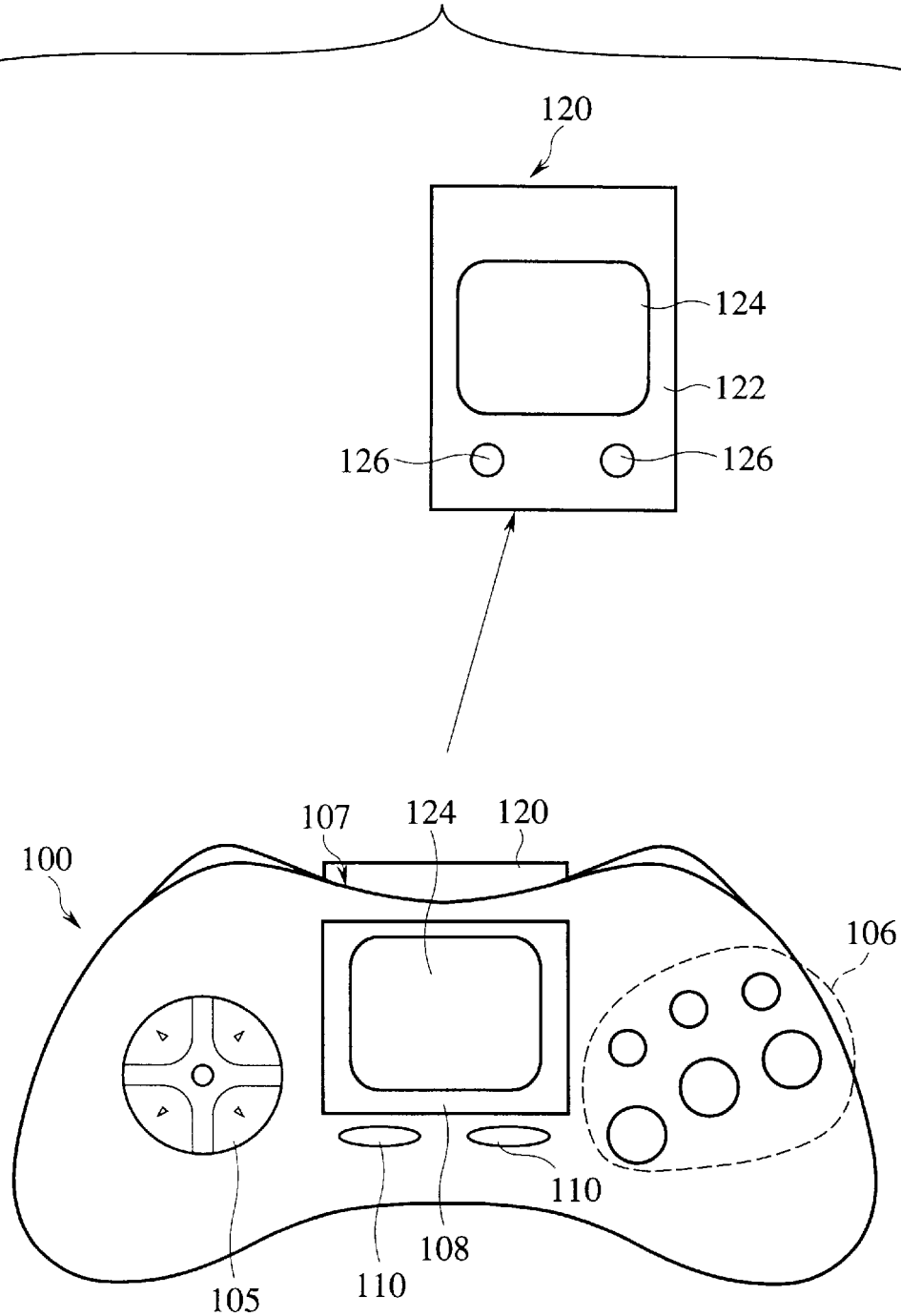
FIG. 29 is a view of the controller according to a fifth embodiment of the present invention loaded in a controller.
Figure 30:
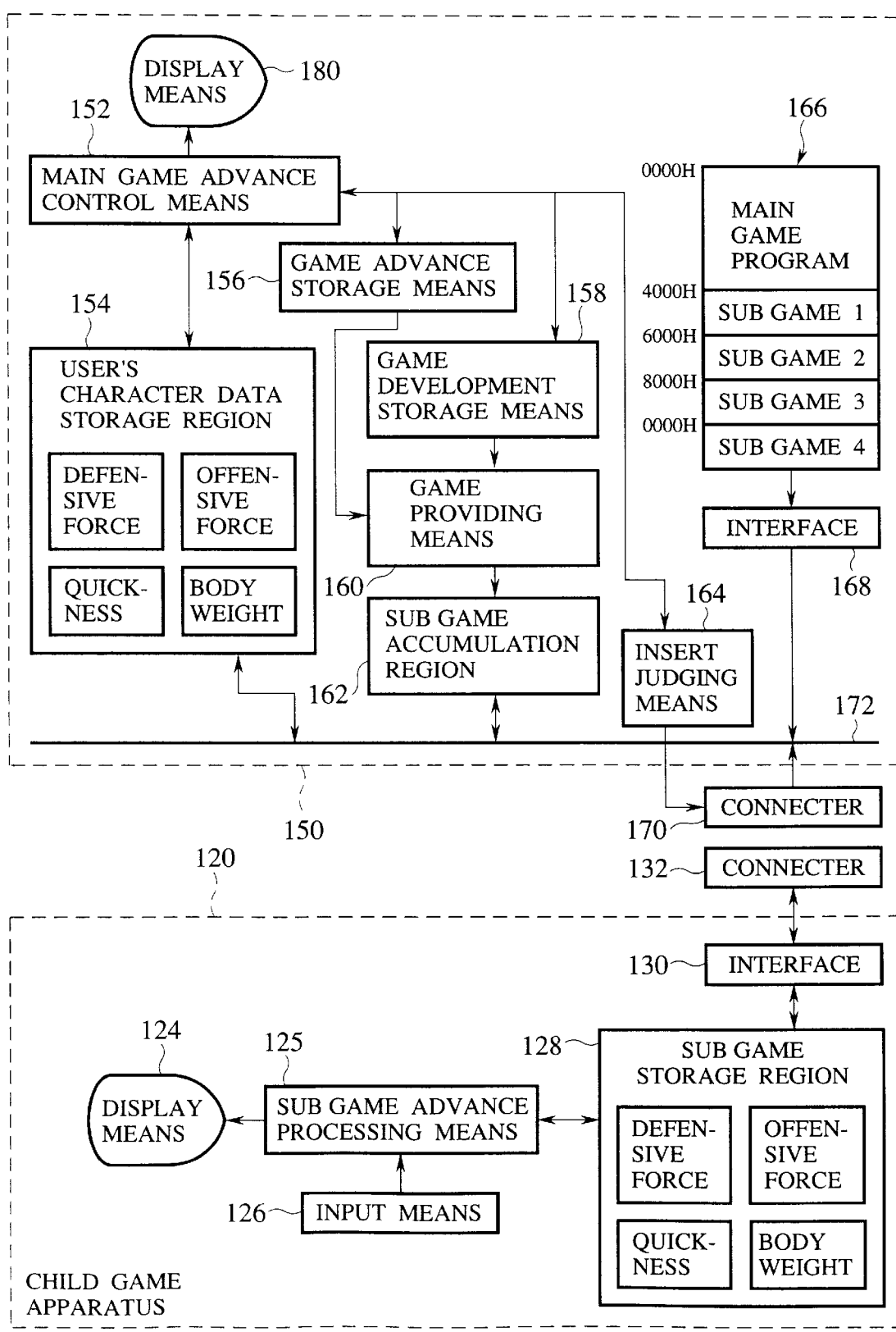
FIG. 30 is a block diagram of the memory card according to the fifth embodiment of the present invention loaded in a controller.

The game system according to a fifth embodiment of the present invention will be explained with reference to FIGS. 29 and 30. FIG. 29 is a view of the controller according to the present embodiment, and FIG. 30 is a block diagram of the game system according to the present embodiment.

In the game system according to the present embodiment a child game apparatus is loaded in a parent game apparatus. The game apparatus body of the fourth embodiment corresponds to the parent game apparatus of the present embodiment, and the memory card of the fourth embodiment corresponds to the child game apparatus of the present embodiment.

As shown in FIG. 29, the controller 100 used in the game system according to the present embodiment has on the left side of the operation panel a cross key 105 which commands a direction, and six command buttons 106 on the right side of the operational panel. A card slot 107 in which the child game apparatus 120 is loaded is provided in the center of the upper side of the operational panel of the controller 100. The card slot 107 has an opening 108 in the center thereof. Two auxiliary buttons 110 are provided below the opening 108.

As shown in FIG. 29, the child game apparatus 120 has a small-sized LCD 124 on an upper part of the front side of a case 122. Operation buttons 125 are disposed below the LCD 124. The operation buttons 126 can have the function of a selection key that arbitrary information is selected out of a plurality of information, and the function of a save key that the information is inputted to be saved in a memory. An external connection terminal (not shown) for connecting with an external apparatus, such as a game apparatus or others is provide on the bottom side of the case 122.

The child game apparatus 120 is loaded in the card slot 107 of the controller 100. When the child game apparatus 230 is loaded in the card slot 107, the LCD 124 of the child game apparatus 120 can be watched through the opening 108 of the controller 100, and the operation buttons 126 can be operated by the auxiliary buttons 110 of the controller 100. The operation of the smaller operation buttons 126 of the child game apparatus 120 is converted to the operation of the larger operation buttons 126 of the controller 100. Thus, secured operations can be quickly made.

To prevent erroneous disconnection of the child game apparatus 120 from the controller it is possible to lock the child game apparatus 120. The locking mechanism is provided preferably on the side of the controller 100. It is preferable to arrange the locking to be made at least during a saving operation.

However, the locking mechanism disposed on the side of the controller 100 is hidden inside, which makes it difficult for a game player to confirm operational states of the locking mechanism. In arranging the locking mechanism to automatically operate during a saving operation the locking mechanism operates even without child game apparatus 120 loaded. In such case there is a risk that loading the child game apparatus 120 may break the locking mechanism. Then it is preferable the operation keys of the child game apparatus function as the operation keys for commanding the saving operation. This is because the saving operation is performed by the operation keys of the child game apparatus 120, whereby there is no risk that the saving operation is performed without the child game apparatus loaded.

According to the present embodiment, the operation keys of the child game apparatus can be operated by the operation keys of the controller of the parent game apparatus.

(Game System)

Then, the game system according to the present embodiment will be explained with reference to FIG. 30.

The game system according to the present embodiment includes the parent game apparatus 150 and the child game apparatus 120. The child game apparatus 120 is loaded, as required, in the parent game apparatus 150 to exchange data of subgames, game results, etc.

The parent game apparatus 150 executes a main game and inputs/outputs game programs and game data between the child game apparatus 120 and itself. A main game advance control means 152 control advance of a main game executed mainly by the parent game apparatus 150, i.e., advance of the main game. The main game advance control means 152 is connected to display means 180 which displays game displays, etc.

A user character data storage region 154 stores defense force and offense force, quickness, body weight, etc. of a user character. A current game advance state of a game advanced by the main game advance control means 152 is stored in the game advance storage means 156, and a game development so far is stored in the game development storage means 158.

The main memory 166 stores a plurality of subgames 1 to 4 in addition to the main game program. The main memory 166 is connected to a bus line 172 through an interface 158.

The game presenting means 160 outputs a preset subgame to a subgame accumulating area 162 when an advance state of the main game becomes a preset advance state, i.e., a game advance state stored in the game advance state storage means 156 becomes a preset advance state. The subgame accumulation area 162 accumulates the outputted subgame.

Insert judging means 164 judges whether or not the child game apparatus 120, which will be explained later, is connected to a connector 170. As will be described later, based on a result of this judgement the operations of saving the subgame in the child game apparatus 120, etc. are performed.

The child game apparatus 120 executes the subgame while inputs/outputs the subgame and game data in and from the parent game apparatus 150. Subgame advance processing means 125 controls advance of a game subordinately executed mainly by the child game apparatus 120, i.e., advance of a subgame. The subgame advance processing means 152 is connected to display means 180 for displaying game displays, etc. and input means 126, such as keys, etc. operated by a game player.

A subgame storage region 128 stores defense force, offense force, quickness, a body weight, etc. of a user character of a subgame. The subgame storage region 128 is connected to a connector 132 through an interface 130.

(Examples of Game Advance)

Then, examples of game advance will be explained.

In a first example, a set subgame is executed corresponding to a state of advance of a main game. The parent game apparatus executes the main game. Corresponding to a state of advance of the main game the parent game apparatus 150 supplies the child game apparatus 120 a preset subgame.

The child game apparatus 120 automatically saves the outputted subgame. A game player enjoys the subgame independently of the main game executed by the parent game apparatus 150.

A subgame to be provided may be any as long as the subgame is related to the main game. Simply a subgame corresponding to a state of advance of the main game, i.e., a stage the main game has arrived at may be provided. If a main game starts, for example, on Stage 1 and sequentially clears Stage 2, Stage 3, Stage 5, subgames 1 to 5 corresponding to current stages are provided.

One subgame may be different in game data, such as characters, easiness, etc. corresponding to developments of the main game so far. For example, easiness of the subgame is made different corresponding to periods of time taken by game player to arrive at a certain stage of the subgame. When a period of time taken by a game player to arrive at the stage is short, easiness of the subgame may be made high corresponding to the ability of the game player. When a period of time taken by a game player to arrive at the stage, easiness of the subgame may be made low corresponding to the ability of the game player. Reversely, when a period of time taken by a game player to arrive at a certain stage is short, easiness of the subgame may be made low as a reward, and easiness may be made high as a penalty when a period of time taken by a game player to arrive at the stage.

It is possible that when a certain stage of a main game has been arrived at, different subgames are provided corresponding to developments of the main game so far, e.g., periods of time taken by game players to arrive at the stage, points, etc. For example, easiness of the subgame is made different corresponding to high and low points obtained on the stage. Low easiness is given to a game player as a reward who has gained a high point, and high easiness may be given to a game player as a penalty who has gained a low point. Oppositely, high easiness is given to a game player having a high point, corresponding to his ability, and low easiness may be given to a game player having a low point, corresponding to his ability.

Subgames related to a main game may be any in addition to games related to a scenario of the main game as described above as long as the subgame uses the same characters as the main game, or the main game is related to the provision of the subgame.

It is possible that after a game player has executed a subgame on the child game apparatus 120, a result of the subgame is transferred to the parent game apparatus 150 to change parameters of a main game, such as developments of the main game, character data, easiness, etc.

A second example will be explained by means of a fighting game.

When a main game is started, a game player decides a character he will operate and register a name of the character, and starts the main game. Initial values of the game are set for parameters of the character, e.g., offensive force, defensive force, quickness, body weight, durability, etc. and are stored in a user character data storage region 154. It is possible that a game player sets in a certain range. For example, with a total set at 100, a game player allocates ability values to respective parameters.

Corresponding to developments of the main game parameters of the character of the game player increases and decreases. That is, parameters of the character of the game player increase and decrease corresponding to results of fights of the main game.

In the fighting game according to the present example, a first stage is a prefectural meeting, and a second stage is a national meeting. If a game player wins in the prefectural meeting of the first stage, he can advances to the national meeting of the second stage.

In the prefectural meeting of the first stage, a tournament of 6 representative of respective areas is executed. A game player plays the main game on the parent game apparatus. He operates the button operations for his character to use various techniques to make the fighting game with an opponent. At this time, the game advance state storage means 156 stores [1] representing the first stage. The game providing means 160 reads a subgame 1 for the first stage from the main memory 166 and stores in advance the subgame in the subgame storage region 120.

At this time, when the child game apparatus 120 is connected to the parent game apparatus 150, the insert judging means 164 detects the child game apparatus being inserted, and the game providing means 160 outputs the subgame 1 stored in the subgame storage region 128 to the child game apparatus 120, and the subgame 1 is stored in the subgame storage region 128.

The subgame 1 is a simple game which, e.g., competes in how may times the operation button has been pressed in 10 seconds. A game player operates the buttons 110 of the controller 100 with the child game apparatus connected to thee parent game apparatus 150. It is possible that thee child game apparatus 120 is disconnected from the parent game apparatus 150 to play the subgame 1 on the child game apparatus 120 alone.

In the subgame 1, for example, a character of a game player is displayed on a background imaging a school yard, and the character performs push-ups in accordance with button operations. Points are given corresponding to, e.g., how many push-ups are made in 10 seconds.

Point data given by the subgame 1 is outputted to the parent game apparatus 150 and is reflected on the main game. For example, a parameter of physical strength of the game player's character of the main game is increased corresponding to a point in the subgame 1. Accordingly, the game player ardently plays the subgame 1 to thereby make parameters of his character of the main game advantageous.

When the main game is advanced to the national meeting of the second stage, [2] of the data stored in the game advance stage storage means 156 which represents the second stage is replaced. The game providing means 160 reads a subgame 2 for the second stage from the main memory 166 and in advance stores the subgame 2 in the subgame storage region 162.

The subgame 2 is for the second stage and is a little higher-graded minigame. For example, the subgame 2 is a food getting game in which food which is necessary to build more physical strength of the character to adjust his physical functions is got. A game player of a character who has failed to build up sufficient retention in the development of the main game so far positively gets in the food getting game food which will build especially retention. When the subgame is returned to the main game, the character of the game player can improve retention by the food get in the subgame 2.

As described above, according to the present embodiment, subgames suitable for developments of a main game are prepared, whereby game players are more inclined to play the main game, and even if the main game is long, the game players are kept interested in the main game. Game results of subgames are reflected on parameters of a main game, whereby the game system can have a wide variety.

A Sixth Embodiment

The game system according to a sixth embodiment of the present invention will be explained with reference to FIGS. 31 to 43. The game system according to the present embodiment is characterized in that a memory card with a display provided is used. The memory card is connected to a controller, disconnected from the controller to be singly used, or connected to another memory card. Then, the game system according to the present embodiment will be detailed.

(Memory Card)

Figure 31:
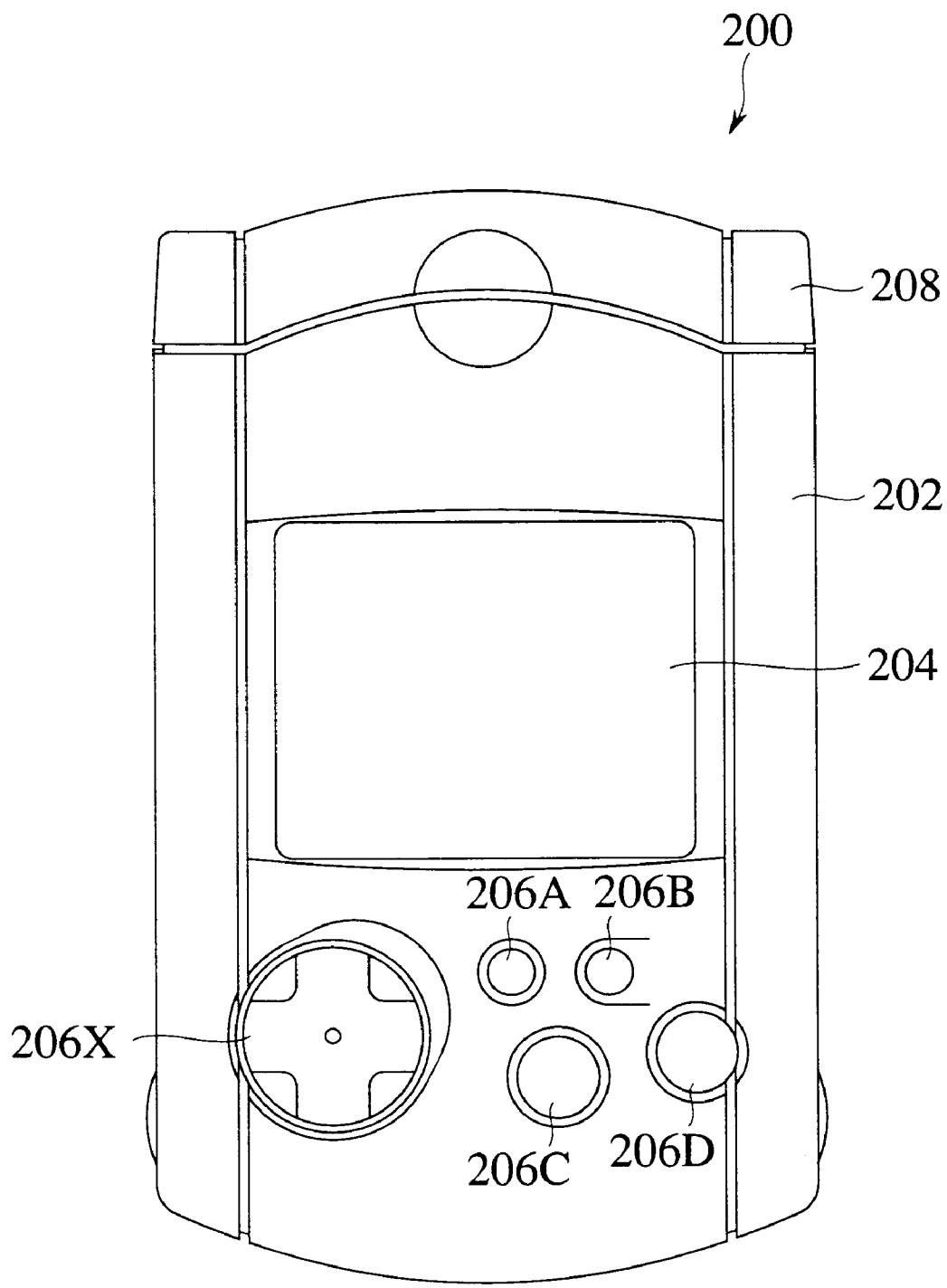
FIG. 31 is a plan view of the memory card according to a sixth embodiment of the present invention.
Figure 32:
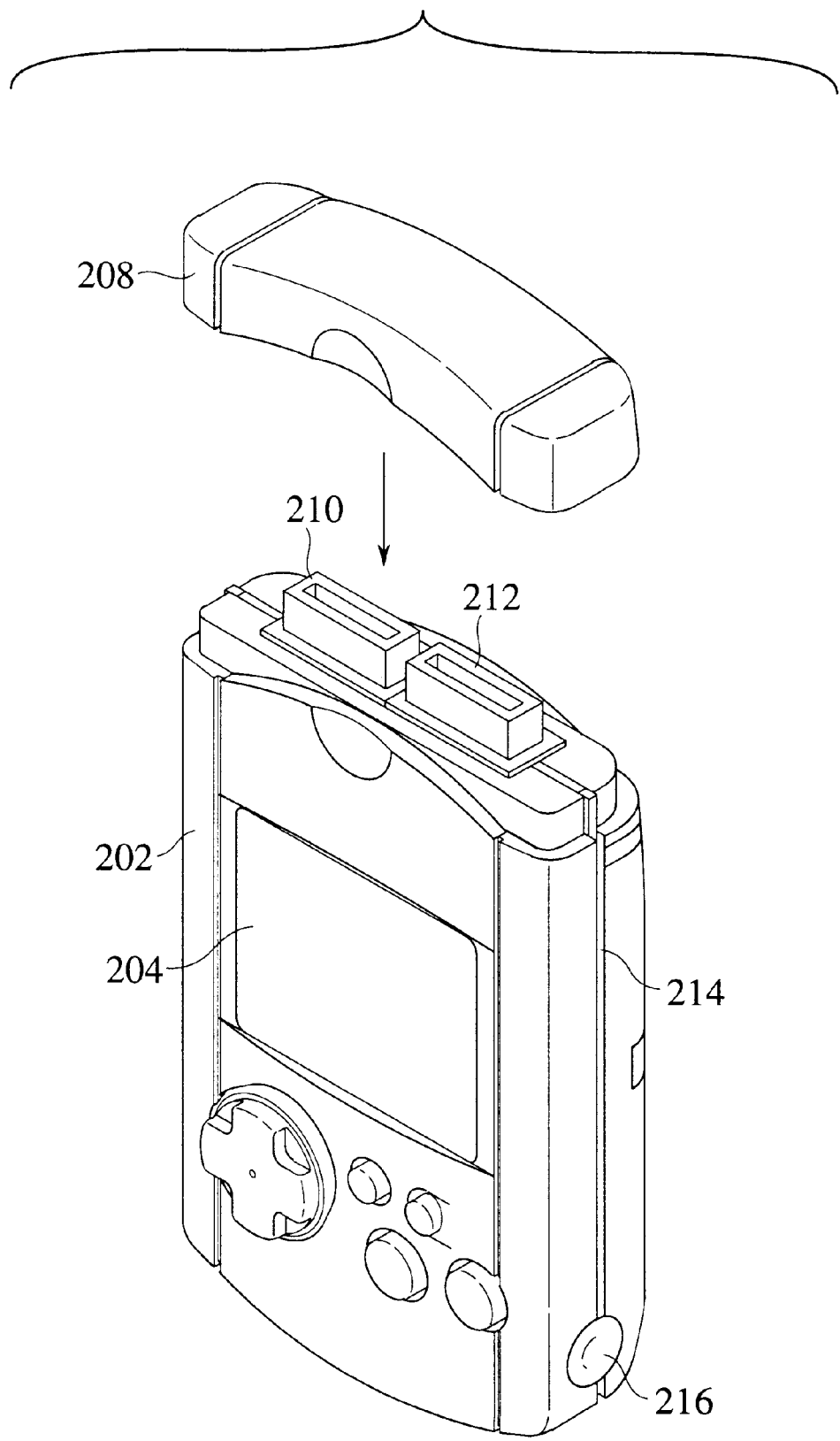
FIG. 32 is a perspective view of the memory card according to the sixth embodiment of the present invention.

The memory card according to the present embodiment will be explained with reference to FIGS. 31 and 32. FIG. 31 is a view of an appearance f the memory card according to the present embodiment. FIG. 32 is a perspective view of the memory card according to the present embodiment, which shows the appearance.

As shown in FIG. 31. The memory card 20 according to the present embodiment has a small-sized LCD (liquid display) 204 at an upper part of the front side of a case 202. Operation buttons 206 are provided below the LCD 204. The operation buttons 206 include a direction key 206X, and command buttons 206A, 206B, 206C, 2206D.

The memory card 200 according to the present embodiment is characterized in that as shown in FIG. 32 connectors 210, 212 are provided on the upper end of the case 202, i.e., upper of the LCD 204. When the memory card is singly used, the connectors 210, 212 are covered with a connector cap 208. As described in the above-described embodiment, the connectors 210, 212 as well are a couple of a male and a female connectors, which enables the memory cards 200 to be connected directly to each other without the use of a connection cord.

Guide grooves 214 are provided in both sides of the case 202 of the memory card 200. The guide grooves 214 facilitate insertion of the memory card 200 into the controller or a game apparatus body. Finger rests 216 are provided on both sides of the case 202 of the memory card 200, and the memory card is held with a hand at the finger rests 216 for easy removal.

(Controller)

Figure 33:
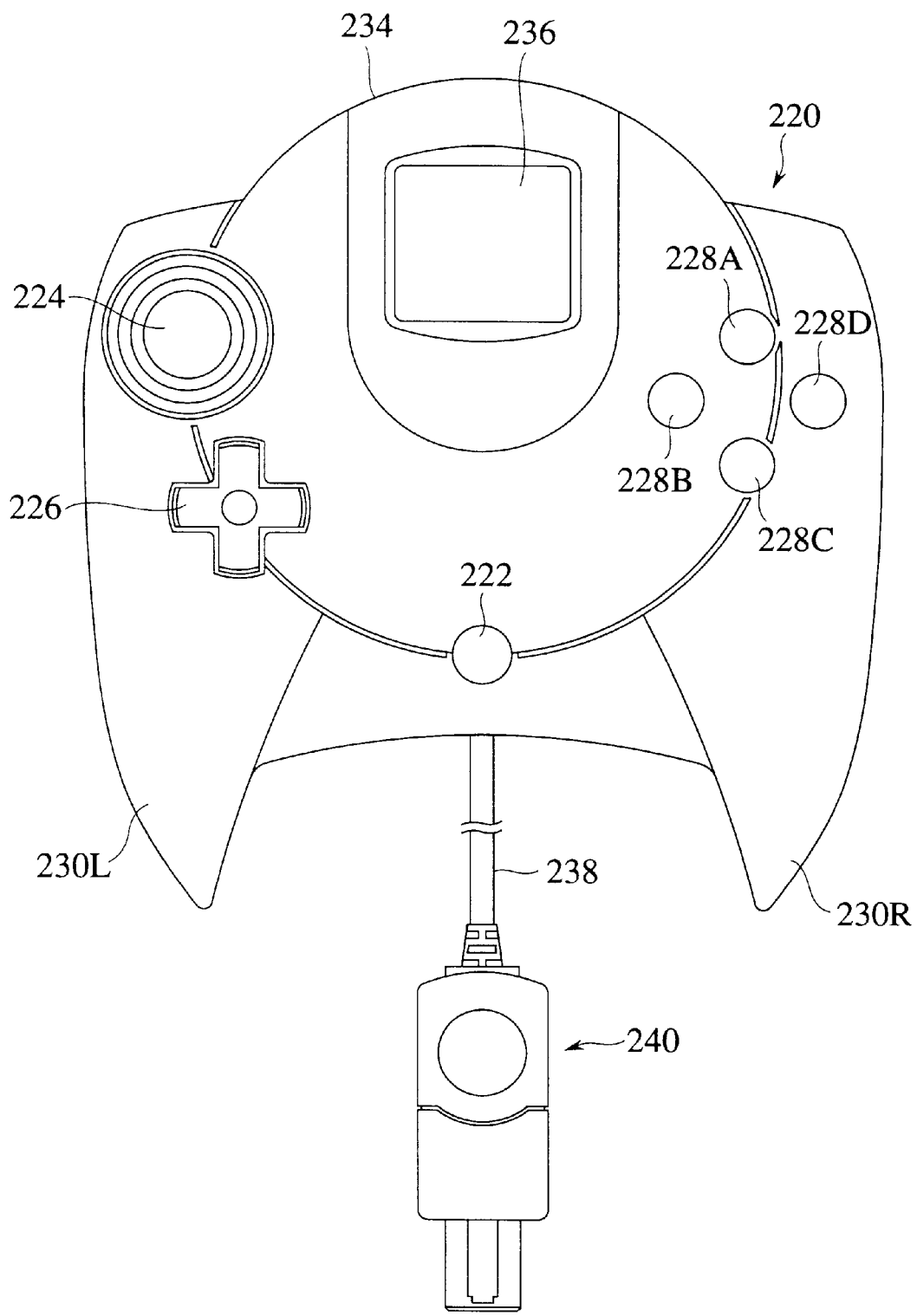
FIG. 33 is a plan view of the controller according to the sixth embodiment of the present invention.
Figure 34:
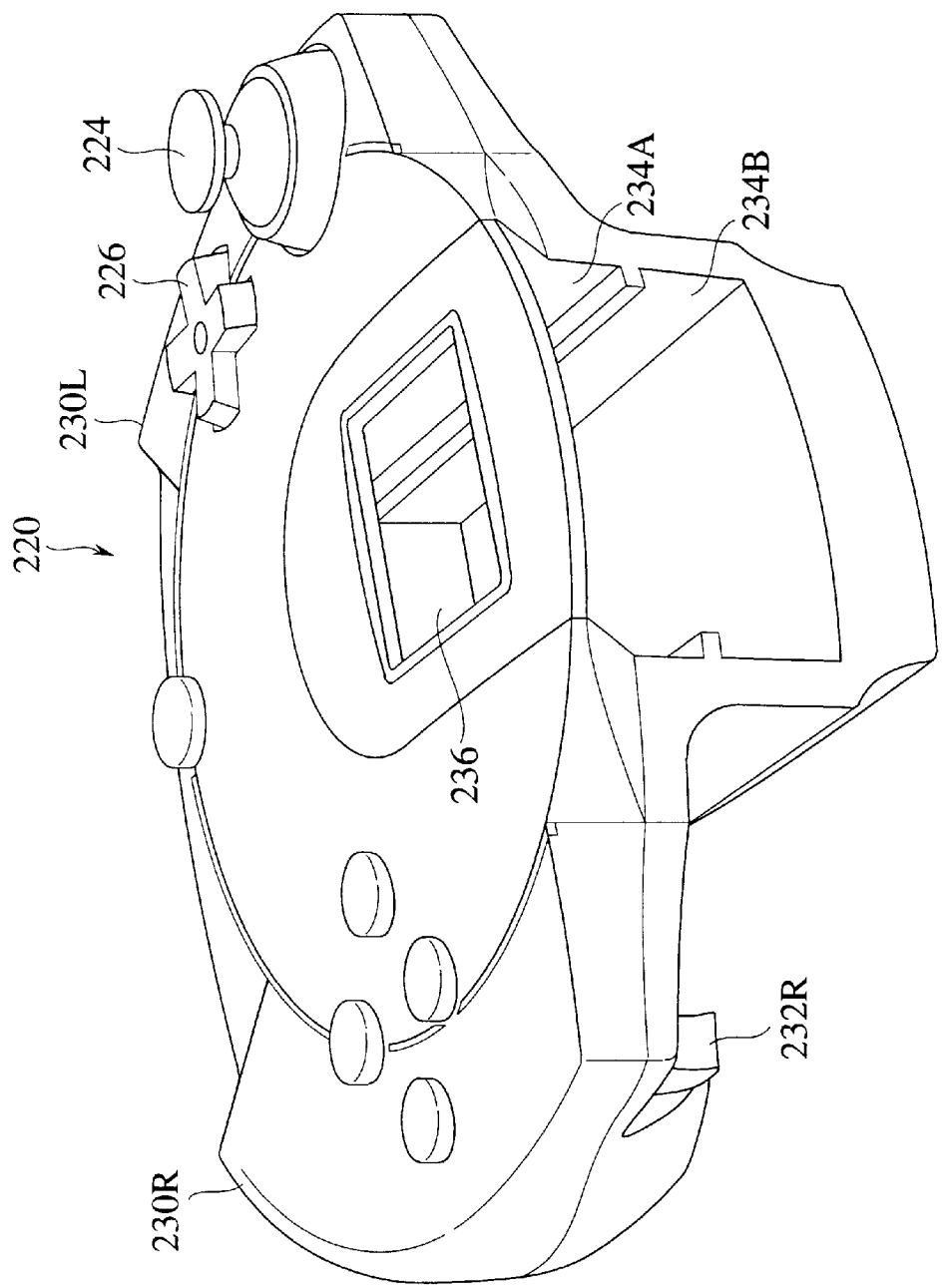
FIG. 34 is a perspective view of the controller according to the sixth embodiment of the present invention.

The controller according to the present embodiment will be explained with reference to FIGS. 33 and 34. FIG. 33 is a plan view of the controller according to the present embodiment, and FIG. 34 is a perspective of the controller according to the present embodiment of the present invention.

A start button 222 is provided at a lower part of the central part of an operation surface on the front side of the controller 220. An analog directional key 224 and a digital direction key 226 are provided on the left side of the front operation surface. Four command buttons 228A, 228B, 228C, 228D are provided on the right side of the front operation surface. A command lever 232L (not shown) is provided on an operation surface on the back side of a handle 230L of the controller 220, and a command lever 232R is provided on an operation surface on the back side of a handle 230R.

As described above, the controller 220 has the analog direction key 224, the digital direction key 226, the start button 222, the command buttons 228A, 228B, 228C, 228D on the front operation surface, and the command lever 232L (not shown) and 232R on the operation surface on the back side of the handle 230L, 230R.

The start button 222 is a command button of the type that one push of the start button 222 can input a single command. The start button 222, which is disposed on the lower part of the central part of the front operation surface, is difficult to frequently press, and is used to command a start of a game, etc. mainly for commands which do not require pressing the start button while a game is being played.

The analog direction key 2224 continuously commands directions of 360°, the so-called analog directions, and the digital direction key 226 commands 8 preset discrete directions, the so-called digital directions. The analog direction key 224 and the digital direction key 226, which are disposed on the left side of the front operation surface, are normally operated by the left thumb of a game player.

The command buttons 228A, 228B, 228C, 228D are command buttons of the type that one press can input a single command. The command buttons 228A, 228B, 228C, 229D, which are disposed on the right side of the front operation surface 220a, are normally operated by the right thumb.

The command levers 232L, 232R are pulled toward a game player to input continuously changed command amounts. The command levers 232L, 232R are pulled toward a game player with fingers other than the thumbs, e.g., the index fingers or the middle fingers when a game player holds the controller by a left and a right hand. The command levers 232L, 232R are operated to rotate the operation lever (not shown), and a command amount which continuously change corresponding to a swing angle of the operation lever can be supplied.

A slot 234 for the memory card 200 to be loaded in is formed in an upper end of the controller 220. As shown in FIG. 34, the slot 234 has two slots, an upper and a lower slots. The memory card 200 can be loaded in the respective slots.

A window 236 is opened in an upper part of the front operation surface of the controller 220, and through the window a part of the memory card loaded in the upper slot is visible. How to use the window 236 will be explained later.

The connection cable 238 of the controller 220 is projected, as shown in FIG. 33, toward a game player from between the left and the right handles 230L, 230R. A connector 240 for connection to the game apparatus body is provided on the forward end of the connector cable 238. As described above, according to the present embodiment the connection cable 238 for connection to the game apparatus body is disposed, projected toward a game player from the center of the rear side of the controller 220, which permits the controller 220 to generally have a good weight balance. Even when a game player operates the controller, moving around the same, the game player does not feel the controller 220 obstructively heavy.

(Game Apparatus Body)

Figure 35:
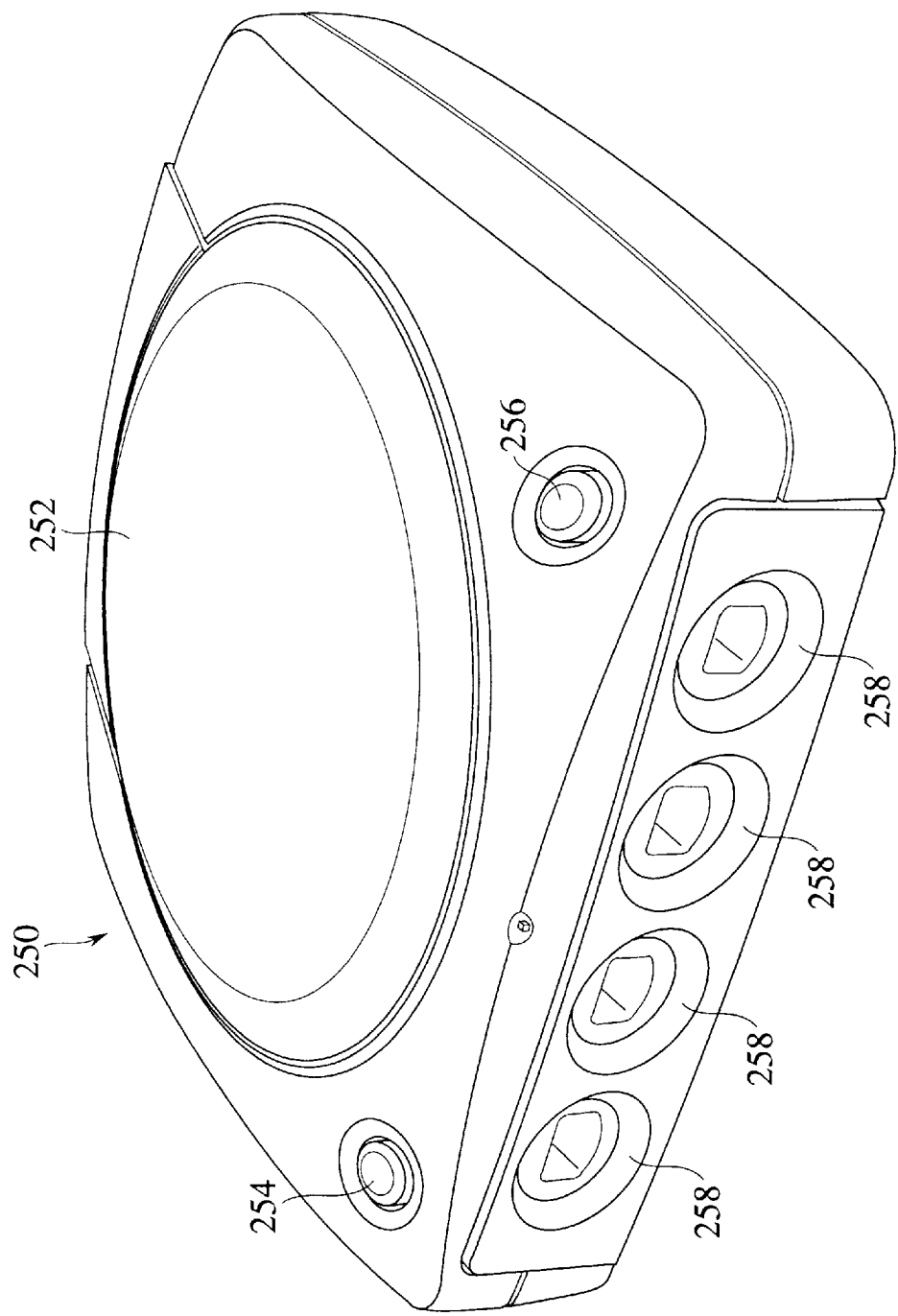
FIG. 35 is a perspective view of the game apparatus body according to a sixth embodiment of the present invention.

The game apparatus body according to the present embodiment will be explained with reference to FIG. 35. FIG. 35 is a perspective view of the game apparatus body according to the present embodiment.

A circular cover 252 which is openable and closable is provided at the center of the upper side of the game apparatus body 250. An electric power source switch 254 and an opening/closing switch 256 are disposed on the left and the right side of the upper side of the game apparatus body 250. The opening/closing switch 256 is pushed down to open the cover 252. The cover 252 is opened to permit a CD-ROM or others storing a game program to be loaded into the game apparatus body 250.

Four connectors 258 are provided on the side of the game apparatus body 250 to be opposed to a game player. The connector 240 of the controller 220 is connected to one of the connectors 258.

(Memory Cards Connected to Each Other)

Figure 36:
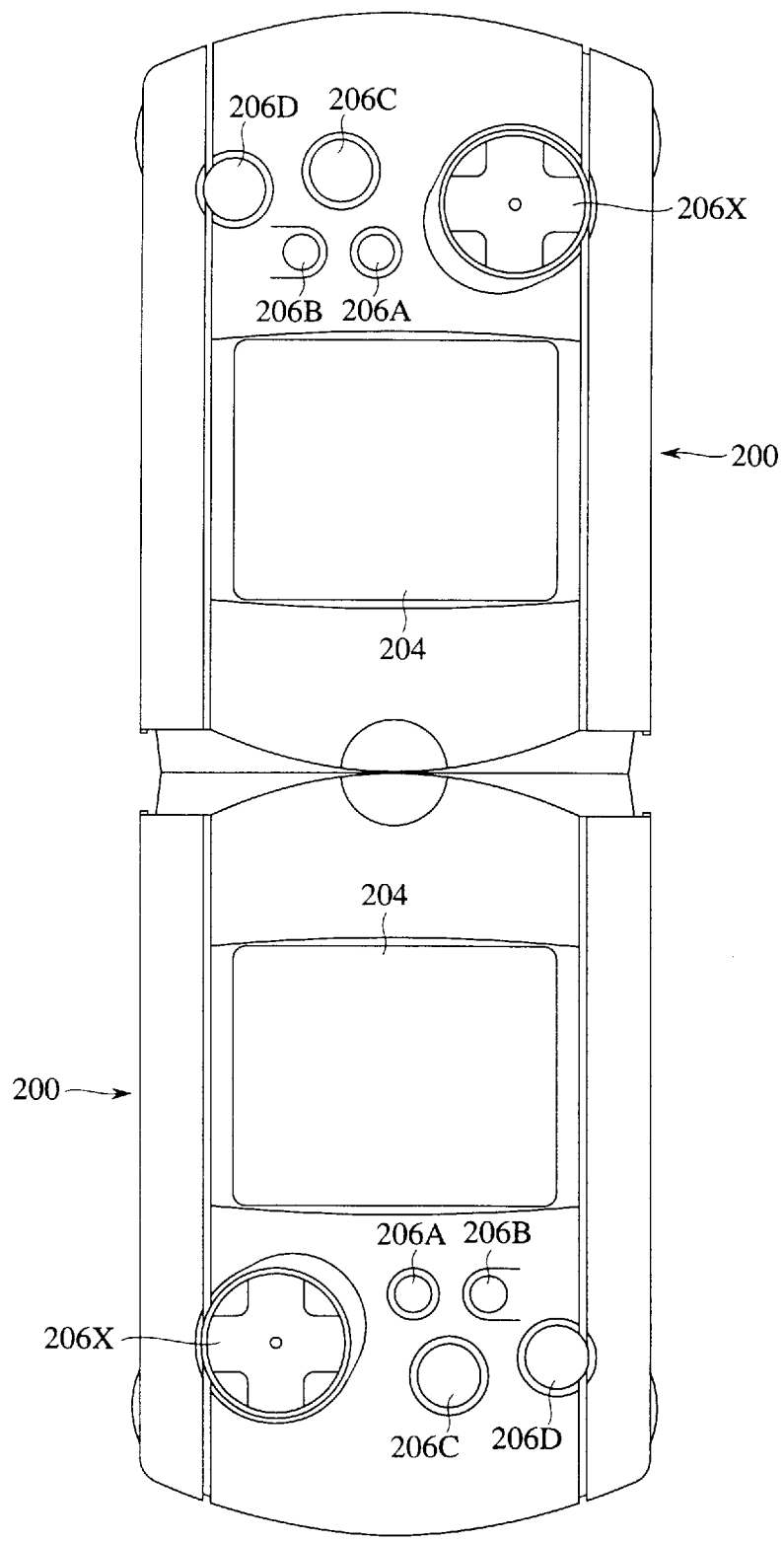
FIG. 36 is a view of the memory cards according to the sixth embodiment connected to each other.

Connection of the memory cards to each other will be explained with reference to FIG. 36.

As described above, the memory card 200 according to the present embodiment has a couple of a male and a female connectors 210, 212 is disposed on the upper end surface of the case 202, i.e., upper of the LCD 204. Accordingly, the memory cards 200 can be connected to each other directly without the use of a connection cord and, as shown in FIG. 36, with the LCDs 204 opposed to each other.

This allows game players of the respective memory cards 200 to operate, with the memory cards connected to each other, the operation buttons 206 of their own memory cards 200, i.e., the direction keys 206X, the command buttons 206A, 206B, 206C, 206D of their own memory cards 200. Accordingly, with the memory cards 200 connected directly to each other data can be exchanged between the memory cards 200. Furthermore, with the memory cards connected directly to each other games can be played. Games of a category which has not been found can be realized.

(Memory Card connected to the Controller)

Figure 38:
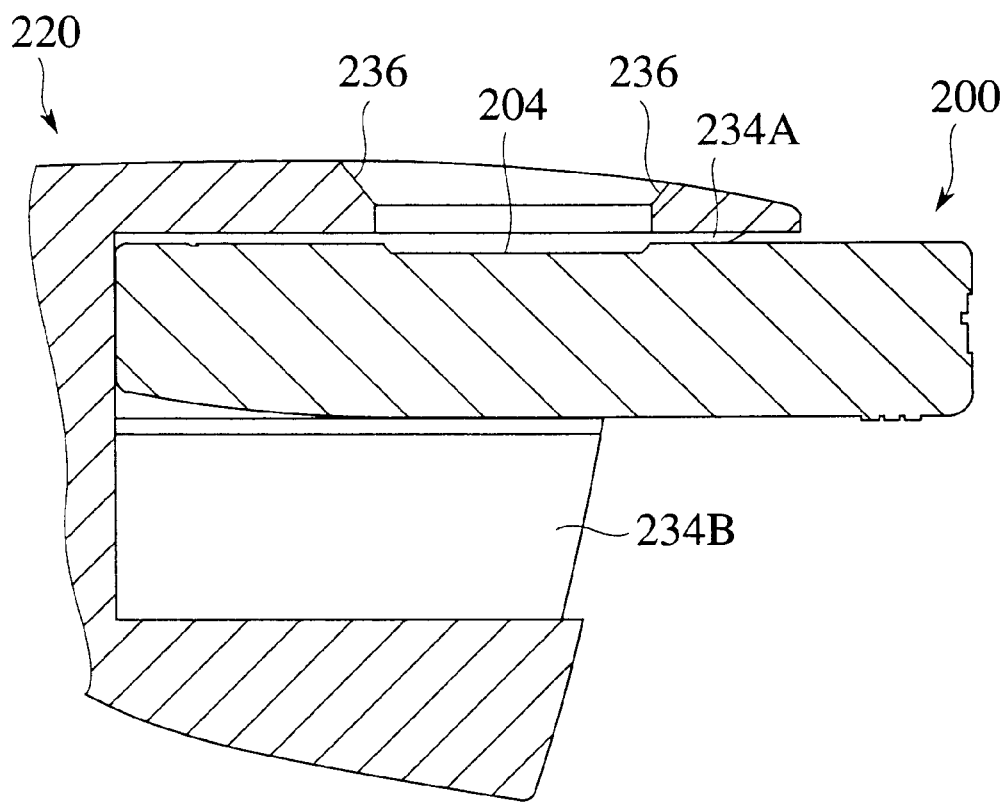
FIG. 38 is a sectional view of a major part of the memory card according to the sixth embodiment of the present invention loaded in the controller.
Figure 39:
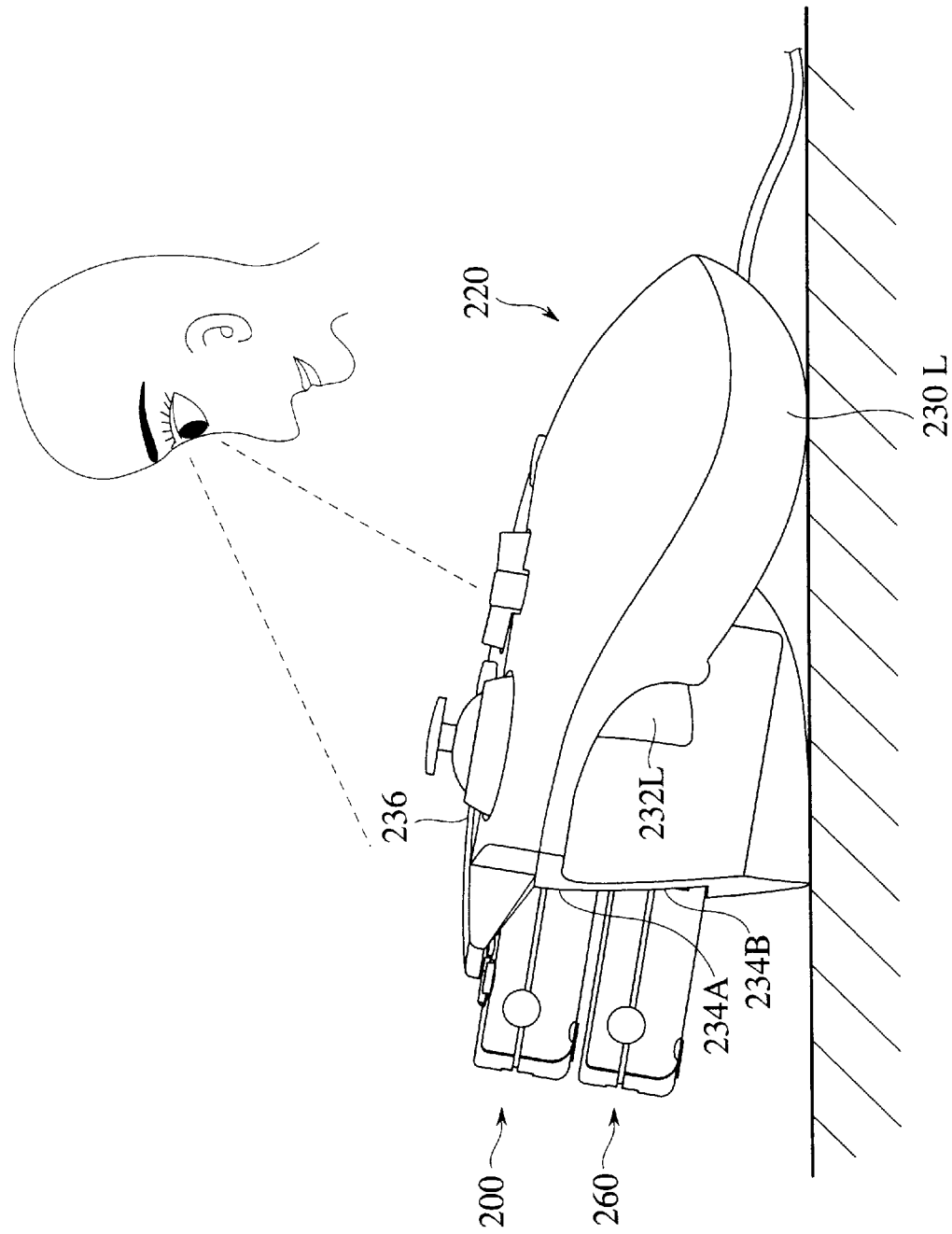
FIG. 39 is a view of the memory card according to the sixth embodiment of the present invention loaded in the controller.

The memory card connected to the controller will be explained with reference FIGS. 37 to 39.

Figure 37:
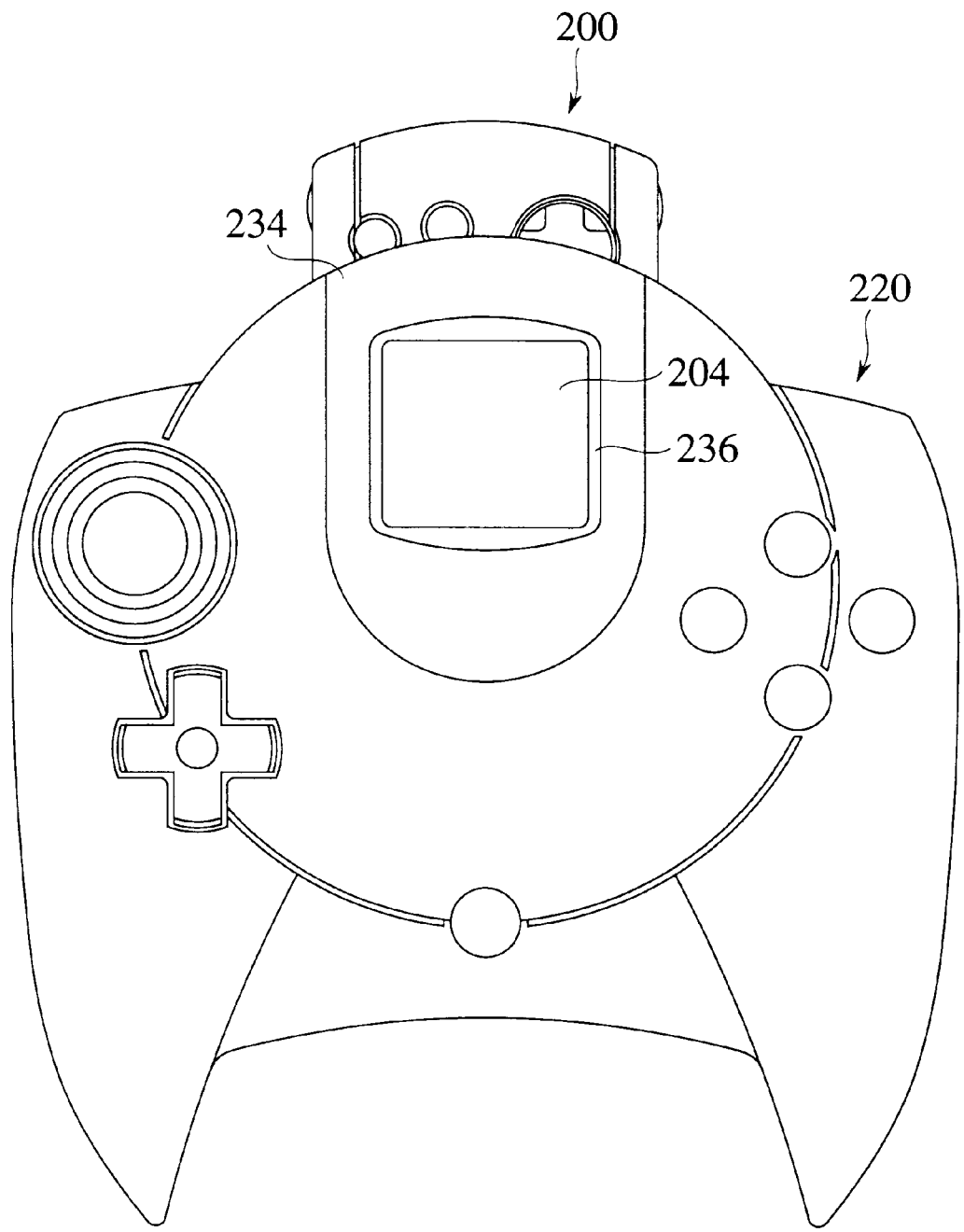
FIG. 37 is a view of the memory card according to the sixth embodiment of the present invention loaded in the controller.

FIG. 37 shows the memory card 200 connected to the controller 220. The memory card is the one having the LCD 200 shown in FIG. 31. The memory cap 208 is removed from the memory card 200, and the connector 210, 212 are faced downward and inserted into the upper slot 234 of the controller 220. The LCD 204 of the memory card 200 is visible through the window 236 of the controller 200.

The controller 200 according to the present embodiment is contrived in shape so that the LCD 204 of the inserted memory card 200 can be easily watched through the window 236 of the controller 200.

A first contrivance is a sectional shape of the window 236. The front side of the LCD 204 of the memory card 200 is located inside the window 236, and a shadow of the frame of the window 236 is reflected in the front side of the LCD 204, which makes the LCD 204 less visible. As a countermeasure to this, as shown in the sectional view of FIG. 38 the frame of the window 236 of the controller 220 is beveled to thereby prevent, as much as possible, the reflection of the frame in the LCD 204.

A second contrivance is the general shape of the controller 200. The controller 200 according to the present embodiment can be operated in the hands but, in many cases, is placed on a desk to be operated. The controller 200 is held at the central convexity below the slot 234 and the left and the right handles 232L, 232R. According to the present embodiment, the controller 200 has a general shape which, when the controller is placed on a desk, allows the plane of the window 236 of the controller 200 to be opposed slant to a game player at an angle which facilitates the game player watching the LCD 204.

(Other Memory Cards)

According to the present embodiment, memory cards of kinds other than the memory card with the LCD 200 shown in FIG. 31 can be used. Examples of the other memory cards will be explained with reference to drawings.

A first example will be explained with reference to FIG. 39. The memory card according to the present example is one 260 including no LCD, operation buttons, etc. but only a memory built in. The controller 220 according to the present embodiment has two slots, an upper and a lower slots 234A, 234B. As shown in FIG. 39, the memory card with the LCD 200 is loaded in the upper slot 234A, and the memory card with the memory alone built in 260 is loaded in the lower slot 234B. Thus, an increased memory capacity becomes available.

Figure 40:
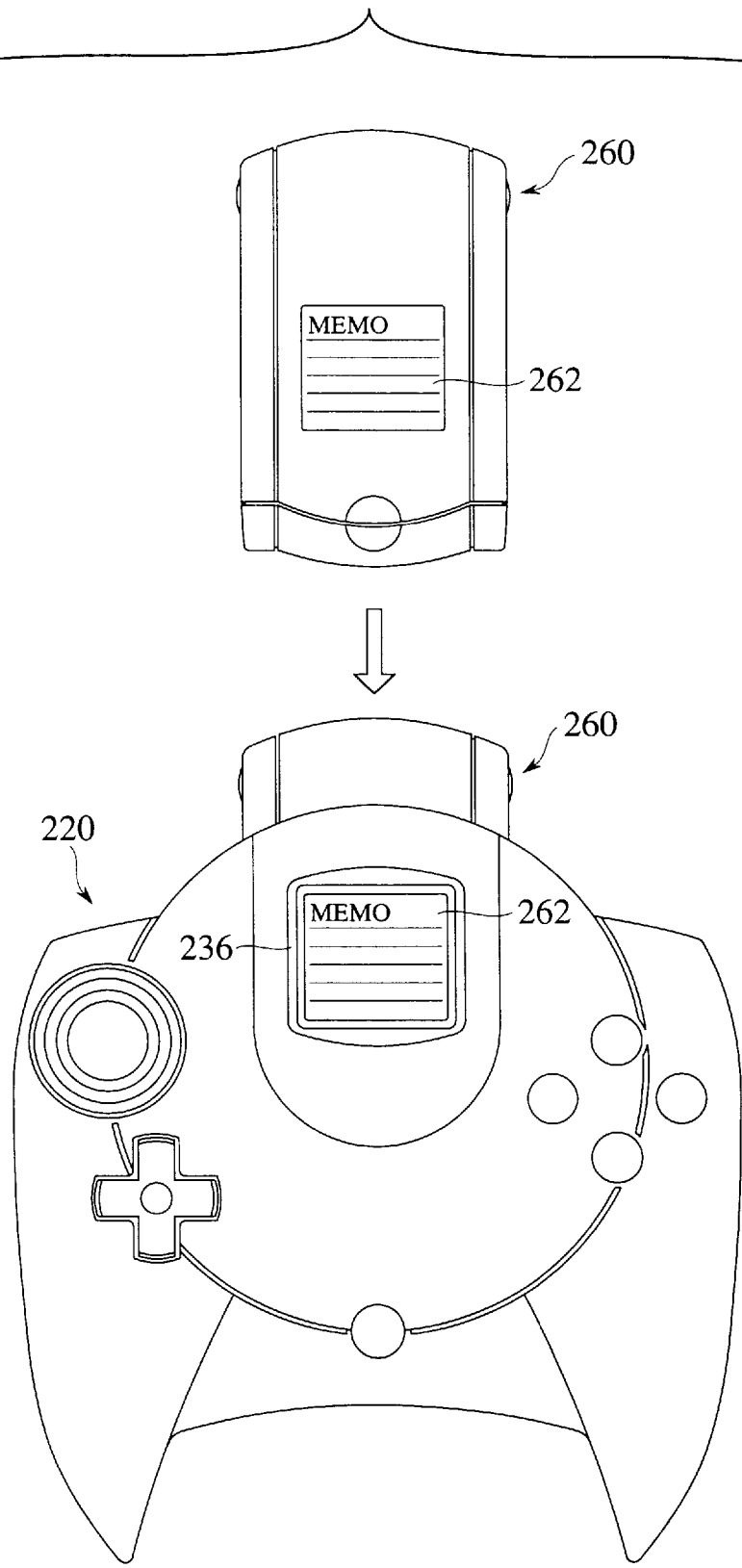
FIG. 40 is a view of a first example of the memory card according to the sixth embodiment of the present invention loaded in the controller.

A second example will be explained with reference to FIG. 40. The memory card according to the present example is one 260 having no LCD, operation buttons, etc. but a memory alone built in. Considering that the memory card 260 is loaded in the upper slot 234A of the controller 220, the memory card 260 has a memorandum label 262 provided at a position where the label 262 of the loaded memory card 260 is visible through the window 236 of the controller 220. A game player can confirm contents of the loaded memory card 260, operating the controller 220, or can write a memorandum on the label 262 of the memory card loaded in the controller 220.

Figure 41:
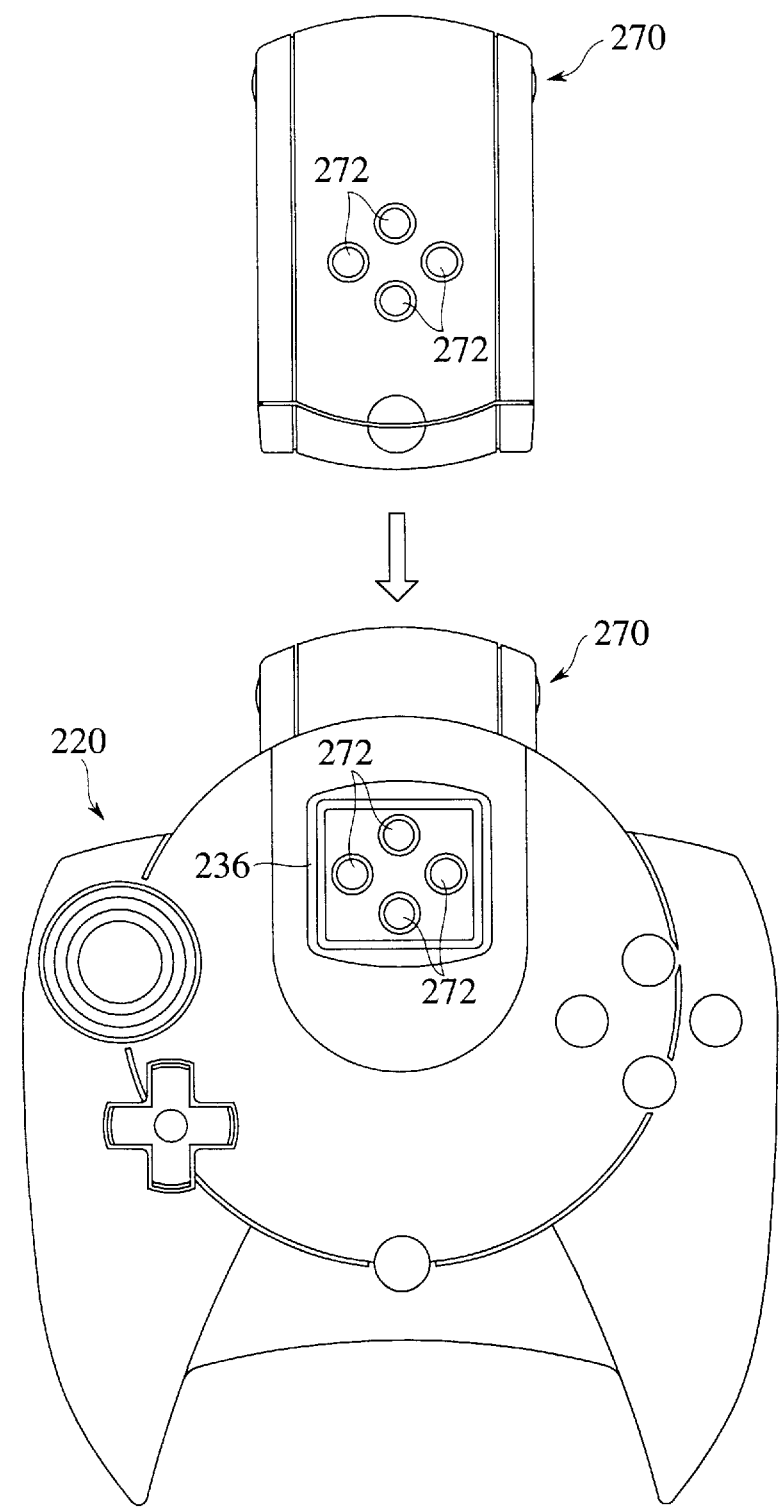
FIG. 41 is a view of a second example of the memory card according to the sixth embodiment of the present invention loaded in the controller.

A third example will be explained with reference to FIG. 41. The memory card according to the present example is one 270 including operation buttons 272. The operation buttons 272 are disposed so that when the memory card 270 is loaded in the upper slot 234A of the controller 220, as shown in FIG. 41 the operation buttons 272 are located inside the window 236. A game player uses the operation buttons 270 to make commands to the memory card 270 or make assistant operations of a game which are separate from operations made by the controller 220.

Figure 42:
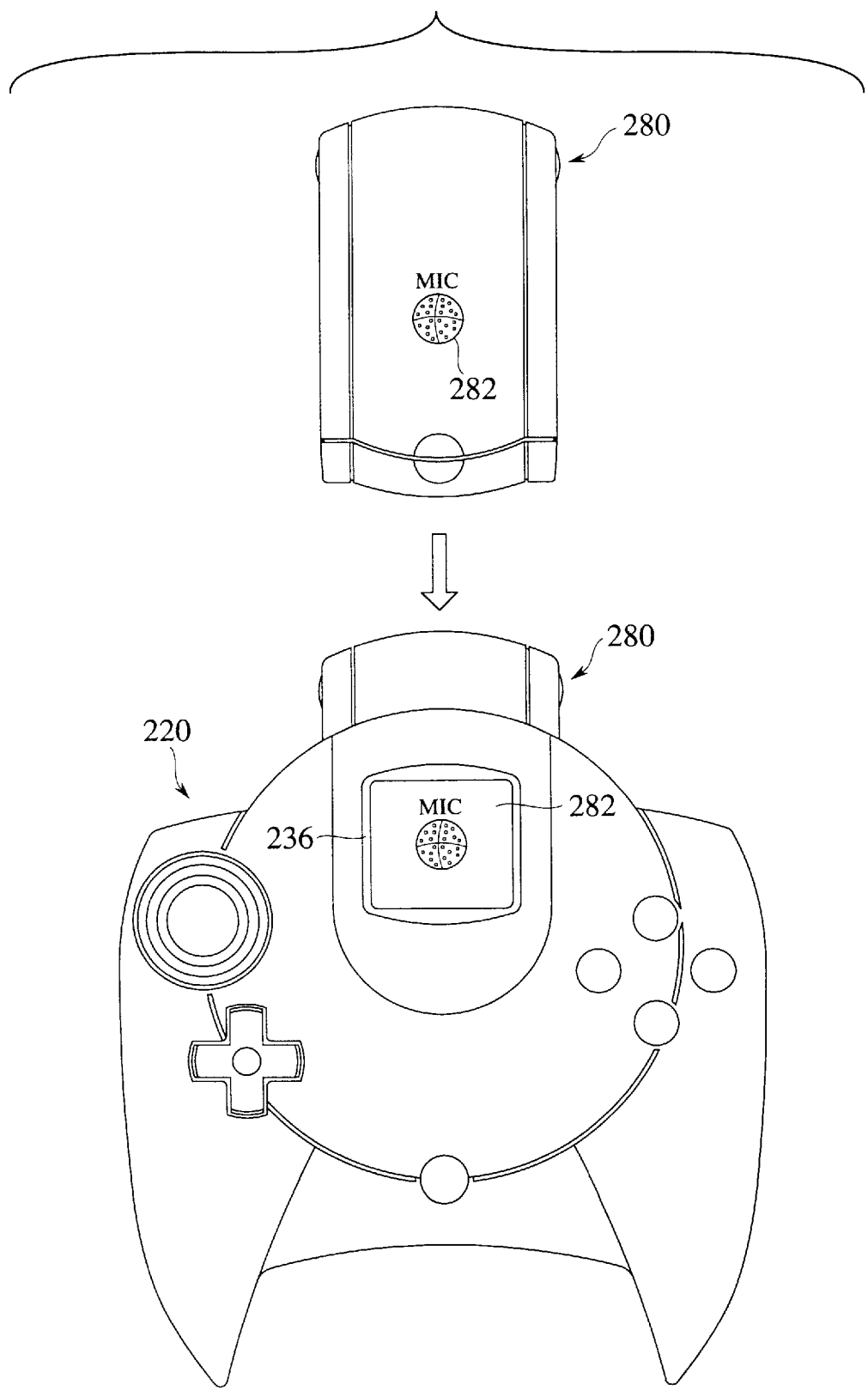
FIG. 42 is a view of a third example of the memory card according to the sixth embodiment of the present invention.

A fourth example will be explained with reference to FIG. 42. The memory card according to the present example is one 280 including a microphone 282. The microphone 282 is disposed so that when the memory card 280 is loaded in the upper slot 234A of the controller 220, as shown in FIG. 42 the microphone 282 is located inside the window 236. A game player speaks to the microphone 282 of the memory card 280 to make commands to the memory card 270 or make assistant operations of a game which are separate from operations made by the controller 220.

Figure 43:
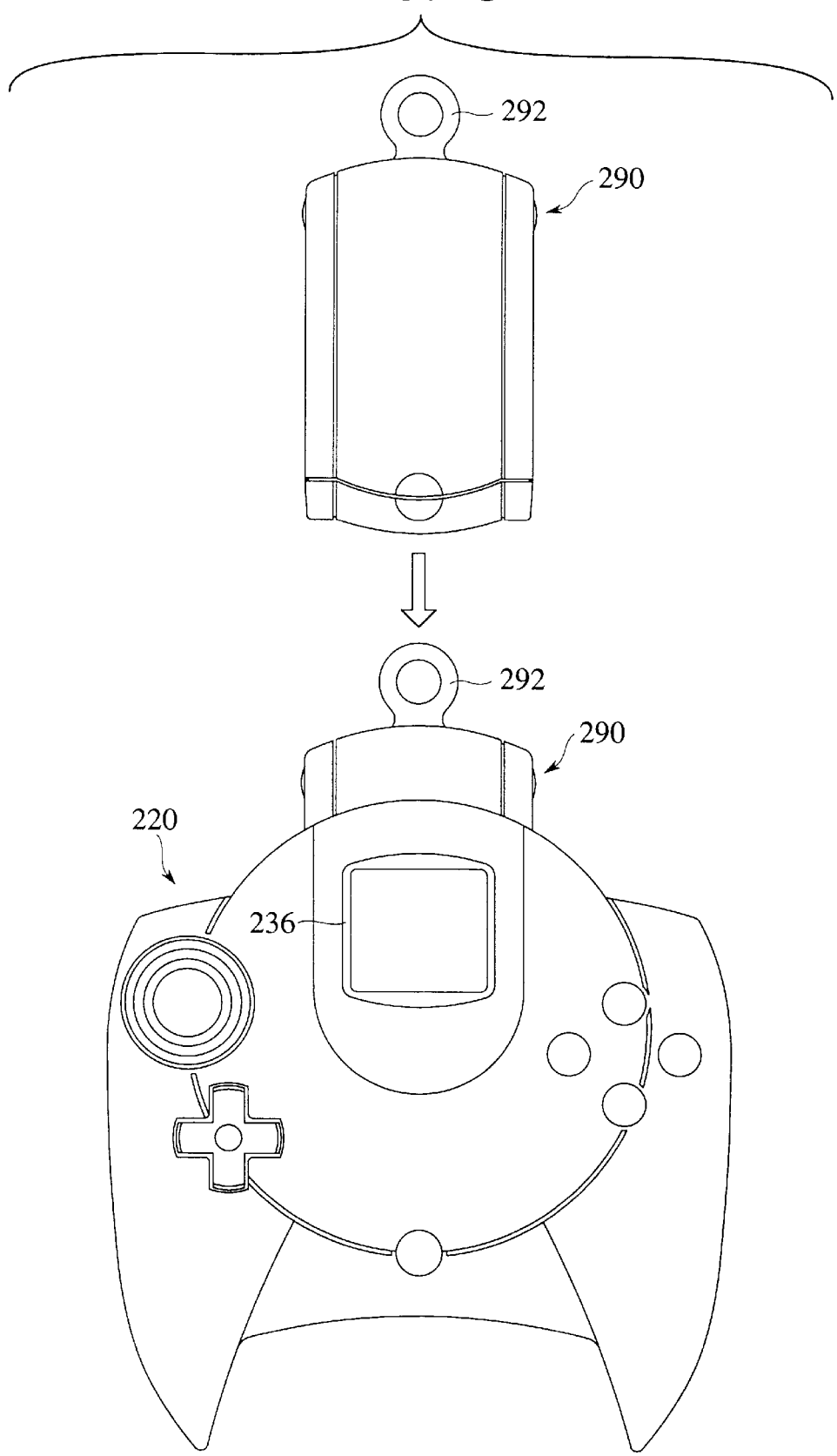
FIG. 43 is a view of a fourth example of the memory card according to the sixth embodiment of the present invention.
Figure 44:
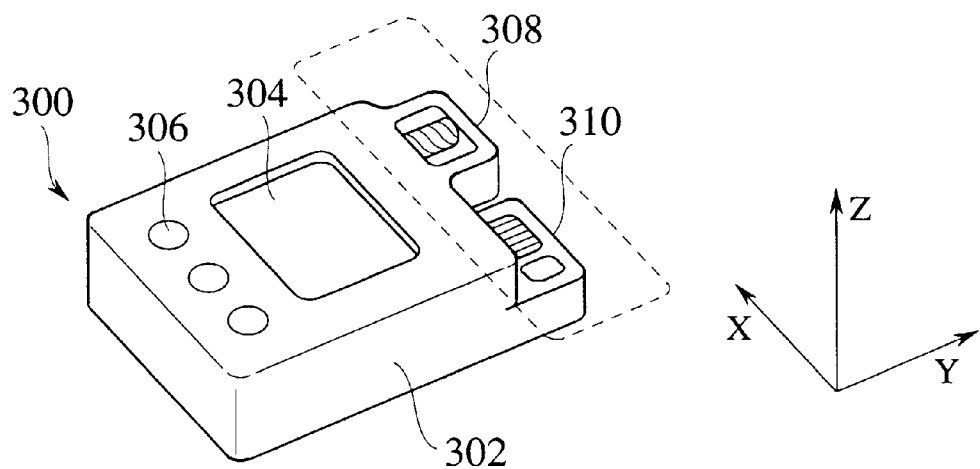
FIG. 44 is a view of the memory card according to a seventh embodiment of the present invention, which shows an appearance thereof.
Figure 45:
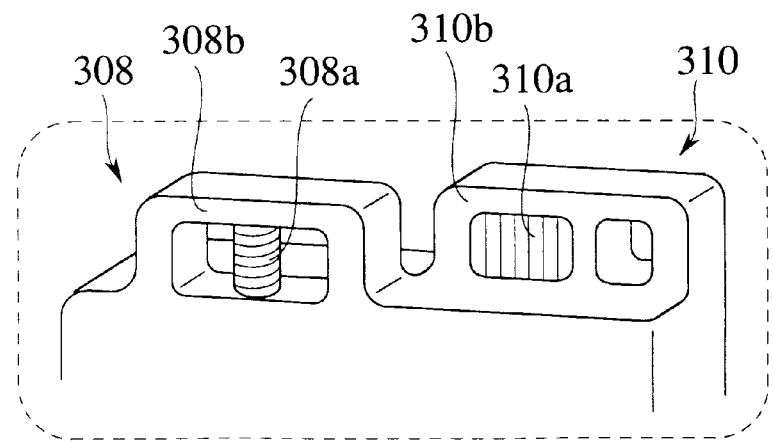
FIG. 45 is a view of a major part of the memory card according to the seventh embodiment of the present invention.
Figure 46:
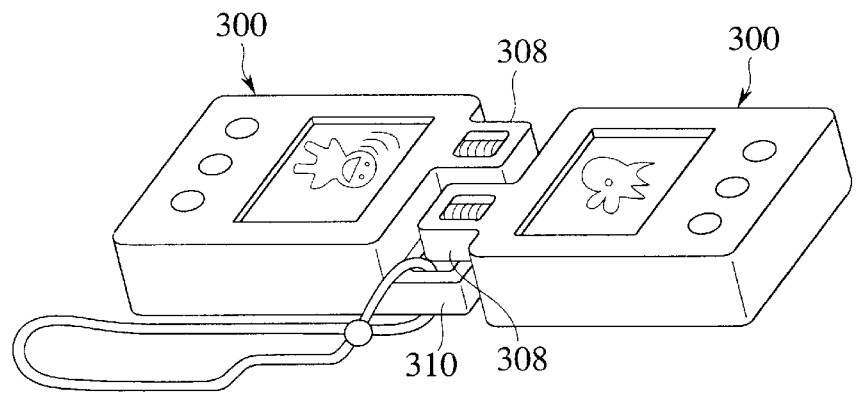
FIG. 46 is a view of the memory cars according to the seventh embodiment of the present invention in communication state.
Figure 47:
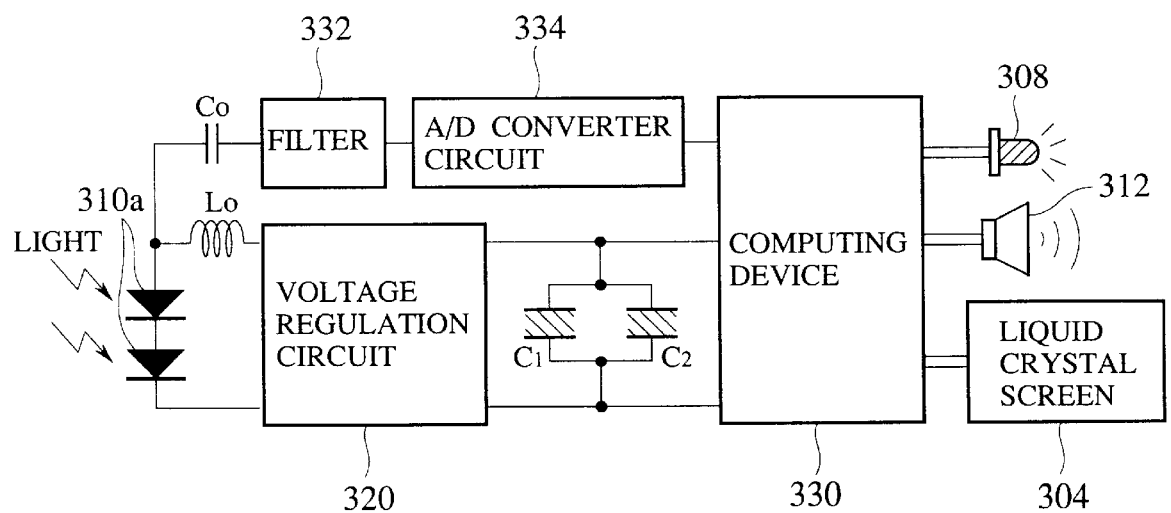
FIG. 47 is a block diagram of a major part of the memory card according to the seventh embodiment of the present invention.

A fifth example will be explained with reference to FIG. 43. The memory card according to the fifth example is one 290 including a small-sized camera 292. The small-sized camera 292 is disposed on the side opposite to a connector of the memory card 290. The small sized camera 292 is projected out of the upper end of the controller 220 as shown in FIG. 43 when the memory card 290 is loaded in the upper slot 234A or the lower slot 234B of the controller 220. The small-sized camera 292 can take pictures, loaded in the controller 220, A Seventh Embodiment The memory card according to a seventh embodiment of the present invention will be explained with reference to FIGS. 44 to 47. FIG. 44 is a view of an appearance of the memory card according to the present embodiment. FIG. 45 is a view of a major part of the memory card according to the present embodiment. FIG. 46 shows the memory card according to the present embodiment in communication. FIG. 47 is a block diagram of the major part of the memory card according to the present embodiment.

The memory card 300 according to the present embodiment has a liquid crystal display 304 and operation buttons 306 provided on a body 302 thereof. A game player plays a game by operating the operation buttons, watching the liquid crystal display 304. The body 302 has a light emitting unit 308 and a light detecting unit 310 further provided on the body 302.

As shown in FIG. 45, the light emitting unit 308 has a light emitting diode 308a as a light emitting device, and an enclosure 308b for protecting the light emitting diode 308a. On the other hand, as show in FIG. 45, the light detecting unit 310 has a photo-diode 310a as a light emitting device, and a holder 308b for protecting the photodiode 310a.

The light detecting unit 310 detects light from a light source, such as the sun, a fluorescent lamp or others and functions as electric source power supply means for storing the light as electric energy. The light detecting unit 310 has the function of a solar cell, and energy obtained here is used as electric source power for the memory card 300.

The light detecting unit 308 functions as receiver means used in communication with the outside. For example, the light detecting unit 310 detects a photo-signal from the light emitting unit 308 of another memory card 300 and converts the photo-signal to an electric signal to thereby transmit/receive data.

As shown in FIG. 45, the light emitting unit 308 and the light detecting unit 310 are positioned, offset from each other in the X direction and the Z direction of the body 302 of the memory card 300 so as not to overlap each other.

In such structure, for data communication between the memory cards 300, as shown in FIG. 46 the enclosure 308b of the light emitting unit 308 of one memory card 300 and the holder 310b of the light detecting unit 310 of the other memory card 300 are opposed to each other, and the holder 310b of the light detecting unit 310 of one memory card 300 and the enclosure 308b of the light emitting unit 308 of the other memory card 300 are opposed to each other.

This arrangement opposes the light emitting diode 308a of one memory card 300 to the photodiode 310a of the memory card 300, and opposes the light emitting diode 308a of the other memory card 300 to the photodiode 310a of the other memory card 300, whereby data communication is made possible between the memory cards 300.

The light emitting unit 308 and the light detecting unit 310 are disposed upper of the liquid crystal display 304, which allows respective game players to operate the operation buttons 306, watching the liquid crystal display 304. In addition, the respective game players can confirm light emitting states and positional offset of the light emitting units 308 of the other game player, and can play a game, monitoring data communication states.

Then, the light emitting unit 308 and the light detecting unit 310 of the memory card 300 according to the present embodiment will be detailed with reference to FIG. 47.

When the photodiode 310a detects light, a charge is generated. The generated charge flows as a current through the circuit and is divided into a direct current component and an alternate current component by a coil LO and a condenser CO.

While no data communication is not being made, the photodiode 310a detects light of the sun, etc. to thereby generate a charge, and the charge passes through a constant-voltage circuit as a current to be stored as electric energy in condensers C1, C2. Thus, the light detecting unit 310 functions as a solar cell, and the electric energy stored therein operates a computing device 330.

The computing device 330 includes a CPU, RAM, ROM, etc. A game program is stored in, e.g., the ROM, and the CPU executes the program. The CPU of the computing device 330 controls operations of the liquid crystal display 304, the light emitting diode 308a of the light emitting unit 308, speaker 312, etc.

While data communication is being made between the tow memory cards 300, an on/off photo-signal or a photo-intensity signal of a prescribed frequency from the light emitting diode 308a of the light emitting unit 308 of one memory card 300 is converted to an alternate current by the photodiode 310a of the other memory card 300. The alternate current signal has a prescribed noise component of the frequency of the fluorescent lamp, etc. removed by a filter 332 and is supplied to an A/D conversion circuit 334. The electric signal is inputted to the computing device 330 as a digital signal to execute required control.

As described above, according to the present embodiment, electric source power can be obtained from light energy and requires no electric cell, which makes it possible to make the body 302 smaller and lighter. No electric cell is used, and children are protected from accidentally swallowing the electric cell. No electric cell has to be replaced, which allows the body 302 to have a closed structure, and the structure can be sufficiently water-proof.

According to the present embodiment, data communication with the outside is possible, whereby in an artificial pet growing game, for example, data of characters grown in respective memory cards are exchanged, the characters are mated with each other, genetic information is exchanged, etc. Highly sophisticated artificial pet growing game can be realized. The data exchange with a game apparatus installed on a street, whereby growing data can be printed, and the data exchange with a plurality of unspecific game players can be made.

The present embodiment has a function of measuring a charge stored inside, and it is possible that when a charge stored in the condensers C1, C2 has decreased, a sign that, e.g., a game character is hungry is displayed on the liquid crystal display 304 to notify a game player that charging is necessary. At this time, the game player exposes the memory card 300 to sun light or fluorescent lamp light for the charging. This makes the game player feel that the game character is fed by the light, and the game player can charge the memory card as if he were keeping the character.

In the description of the present embodiment so far made, the memory card 300 receives data in photo-signals from the light emitting unit 308 of another memory card 300 or another game playing apparatus, but it is possible that without using another means a game player simply covers the light detecting unit 310 of the memory card 300 by fingers or an object to thereby turn on and off light, whereby data are inputted in an unsophisticated mode, as of Morse signals.

(Modifications of the Embodiments)

The present invention is not limited to the above-described embodiments and covers other various modifications.

For example, the above-described embodiments are applied to memory cards but may be applied to portable game apparatuses.

In the above-described embodiments the present invention is applied to the memory cards in the form of cards, but the memory cards are not essentially card-shaped. The present invention may be applied to the generally used memory means in other forms.

In the above-described embodiments the present invention is applied to the game apparatus and their controllers but may be applied to electronic apparatuses other than game apparatuses, and controllers as input means for controlling the game apparatuses.

INDUSTRIAL APPLICABILITY

The present invention is suitable for game system using memory cards, and is especially useful for memory cards, and game systems including controllers and game apparatus bodies using the memory cards,

What is claimed is:

1. A controller including an operation key and transmitting a command signal, comprising:
   a control unit; and
   a loading portion, coupled to the control unit, for loading a memory device;
   wherein the memory device further comprises,
      a case;
      a display disposed on one side of the case for displaying information;
      at least one operation button, for selecting or saving information, to be operated by an operator;
      a memory circuit disposed in the case for storing information; and
   at least two connection terminals including a first male connection terminal and a first female connection terminal each disposed on one end of the case for transferring information.

2. An electronic device connected to a controller which transmits a command signal, comprising:
   a control unit; and
   a memory device loading portion, coupled to the control unit, for loading a memory device;
   wherein the memory device further comprises,
      a case,
      a display disposed on one side of the case and displaying information;
      at least one operation button, for selecting or saving information, to be operated by an operator;
      a memory circuit disposed in the case for storing information, and
   at least two connection terminals including a first male connection terminal and a first female connection terminal each disposed on one end of the case for transferring information.

3. A game system comprising:
   a game apparatus body;
   a display device connected to the game apparatus body; and
   a controller connected to the game apparatus body;
   a memory device loaded in a loading portion of the controller, said memory device further comprising,
      a case;
      a memory device display disposed on one side of the case and displaying different information than said display device;
      at least one operation button, for selecting or saving information, to be operated by an operator;
      a memory circuit disposed in the case for storing information; and
   at least two connection terminals including a first male connection terminal and a first female connection terminal each disposed on one end of the case, for transferring information.

4. A game system comprising,
   a game apparatus body;
   display means connected to the game apparatus body;
   a controller connected to the game apparatus body; and
   a memory device loaded in a loading portion of the controller for transferring information between the game apparatus body and the memory device;
   wherein the memory device further comprises,
      a case;
      a display disposed on one side of the case and displaying information;
      at least one operation button for selecting or saving information;
      a memory circuit disposed in the case for storing information;
   and a connection terminal disposed on one end of the case for transferring information.

5. A game system comprising:
   a game apparatus body;
   display means connected to the game apparatus body;
   a controller connected to the game apparatus body; and
   a loading portion for a memory device, wherein information may be transferred between the memory device and the game apparatus body;
   wherein the memory device further comprises,
      a case,
      at least one operation button, for selecting or saving information, to be operated by an operator;
      a memory circuit disposed in the case for storing information, and
   a connection terminal disposed on one end of the case and transferring information.

6. A controller including a prescribed operation key, and outputting a prescribed command signal to an electronic device, comprising:
   a control unit; and
   a loading portion for a memory device to be loaded in, coupled to the control unit,
   wherein the memory device further comprises,
      a case;
      a memory circuit disposed in the case and storing information;
   a connection terminal disposed on one end of the case for transferring information;
   a display disposed on one side of the case for displaying transferred information;
   a save key inputting information through the connection terminal to save the information in the memory and
   a selection key arbitrarily selecting one of a plurality of information.

7. A controller comprising:
   a loading portion for a memory device to be loaded in; and
   a selection key arbitrarily selecting one of a plurality of information,
   wherein the memory device further comprises,
      a case;
      a memory circuit disposed in the case and storing information;

a connection terminal disposed on one end of the case for transferring information between the memory circuit and the controller;

a display disposed on one side of the case for displaying transferred information;

a save key inputting information through the connection terminal to save the information in the memory circuit; and a selection key selecting arbitrary one of a plurality of information.

8. A controller comprising:

a loading portion for a memory device, wherein said memory device further comprises,
  a case;
  a memory circuit disposed in the case and storing information;

a connection terminal disposed on one end of the case for transferring information;
  a display disposed on one side of the case for displaying information;
  a selection key selecting arbitrary one of a plurality of information; and a save key inputting information through the connection terminal and saving the information in the memory circuit.

9. An electronic device connected to a controller outputting a required command signal, comprising:

a control unit; and a loading portion for loading a memory device, coupled to the control unit;

wherein the memory device further comprises,
  a case;
  a memory circuit disposed in the case for storing information;

a connection terminal disposed on one end of the case for transferring information;

a display disposed on one side of the case for displaying transferred information;

a save key inputting information through the connection terminal to save the information in the memory circuit; and a selection key arbitrarily selecting arbitrary one of a plurality of information.

10. An electronic device connected to a controller outputting a required command signal, comprising:

a control unit;

a loading portion for loading a memory device, coupled to the control unit;

a selection key for arbitrarily selecting information;

a save key for inputting information through the connection terminal and saving the information in the memory wherein the memory device further comprises,
  a case;
  a memory circuit disposed in the case for storing information;

a connection terminal disposed on one end of the case for transferring information;

a display disposed on one side of the case for displaying transferred information;

a save key inputting information through the connection terminal to save the information in the memory circuit and/or;
  a selection key selecting arbitrary one of a plurality of information.

11. An electronic device connected to a controller outputting a required command signal, comprising:

selection means for arbitrarily selecting one of a plurality of information;

save means for saving information to the memory device; and a loading portion for a memory device, coupled to the selection means and the save means;

wherein the memory device further comprises,
  a case;

a memory circuit disposed in the case for storing information;

a connection terminal disposed on one end of the case for transferring information;

a display disposed on one side of the case for displaying the information;

a save key inputting information through the connection terminal to save the information in the memory circuit; and a selection key arbitrarily selecting one of a plurality of information.

12. An electronic device connected to a controller outputting a required command signal, comprising:

a loading portion for a memory device to be loaded in; and a saving means; wherein
  the memory device further comprises,
    a case,
    a memory circuit disposed in the case and storing information, a connection terminal disposed on one end of the case for transferring information, and a display disposed on one side of the case for displaying information; and the saving means saves information in the memory circuit by transferring the information through the connection terminal.

13. An electronic device connected to a controller outputting a required command signal, the controller comprising, a selecting means for arbitrarily selecting one of a plurality of information;

a saving means for saving information;

a loading portion for a memory device to be loaded in, coupled to the control unit; and a control unit;

wherein the memory device further comprises,
  a case;
  a memory circuit disposed in the case for storing information;
  a connection terminal disposed on one end of the case; and
  a display for displaying information;

a selecting means arbitrarily selecting one of a plurality of information.

14. A controller including a required key and outputting required command signal to an electronic device comprising:

a control unit coupled to the loading portion; and a loading portion for a memory device to be loaded in, said loading portion being coupled to the control unit, said loading portion further comprising a window; and wherein a required region of the memory device is exposed in the window when the memory device is loaded in the loading position.

15. A controller according to claim 14, further comprising:
   an additional loading portion in which another memory device may be loaded.

16. A memory device to be loaded in a controller the memory device including a required key and which outputs a required command signal to an electronic device, the controller also having a loading portion with a window therein for the memory device to be loaded in such that a required region of the memory device is exposed in the window when the memory device is loaded in the loading portion, the memory device comprising,
   a display for displaying information wherein the display is disposed at a position so that the display is exposed in the window when the memory device is loaded in the loading portion of the controller.

17. A memory device to be loaded in a controller, the memory device including a required key and which outputs a required command signal to an electronic device, the controller also having a loading portion with a window therein for the memory device to be loaded in such that a required region of the memory device is exposed in the window when the memory device is loaded in the loading portion, the memory device comprising:
   a memorandum portion on which a memorandum can be written down;
   wherein the memorandum portion is disposed at a position where the memorandum portion is exposed in the window when the memory device is loaded in the loading portion of the controller.

18. A memory device to be loaded in a controller, the memory device including a required key and outputting a required command signal to an electronic device, the controller also having a loading portion with a window therein for a memory device to be loaded in such that a required region of the memory device is exposed in the window when the memory device is loaded in the loading portion, the memory device comprising,
   an operation button operated by an operator,
   wherein the operation button is disposed at a position where the operation button is exposed in the window when the memory device is loaded in the loading portion of the controller.

19. A memory device to be loaded in a controller, the memory device including a required key and outputting required command signal to an electronic device, the controller also having a loading portion with a window therein for a memory device to be loaded in such that a required region of the memory device is exposed in the window when the memory device is loaded in the loading portion, the memory device comprising,
   a microphone inputting sounds,
   wherein the microphone is provided at a position where the microphone is exposed in the window when the memory device is loaded in the loading portion of the controller.

20. A memory card comprising:
   a processor;
   a display coupled to said processor;
   a memory coupled to said processor and having an address range between a low address and a high address, for storing information, wherein the information comprises at least one of a program and a data;
   a connection terminal coupled to said processor for connecting the memory card to an external device, the connection terminal being used to transfer information from the memory card to the external device and for receiving information from the external device;
   a plurality of buttons, coupled to said processor;
   wherein portions of the information which are programs are stored starting at a first address and portions of the information which are data are stored starting at a second address, said first and second address being different and chosen from a set consisting of the low address and the high address.

21. A game system comprising:
   a console, said console further comprising,
      a control unit;
      a primary display coupled to the control unit for displaying a primary image; and
   at least one controller, each of said controllers coupled to the control unit;
   wherein each of said controllers is capable of accepting a memory card, each of said memory card further comprising,
      a processor;
      a secondary display coupled to the processor for displaying a secondary image;
      a memory coupled to the processor and having an address range between a low address and a high address, for storing information, wherein the information comprises at least one of a program and a data;
      a connection terminal coupled to the processor for interfacing with an external device chosen from the set consisting of the controller and another memory card;
      a plurality of buttons, coupled to the processor;
      wherein portions of the information which are programs are stored starting at a first address and portions of the information which are data are stored starting at a second address, said first and second address being different and chosen from a set consisting of the low address and the high address.

* * * * *